United States Patent
Yu et al.

(10) Patent No.: US 12,554,080 B2
(45) Date of Patent: Feb. 17, 2026

(54) OPTICAL CONNECTION STRUCTURES FOR A PHOTONIC ASSEMBLY AND METHODS FOR FORMING THE SAME

(71) Applicant: Taiwan Semiconductor Manufacturing Company Limited, Hsinchu (TW)

(72) Inventors: Chen-Hua Yu, Hsinchu (TW); Hsing-Kuo Hsia, Jhubei (TW); Chih-Wei Tseng, Hsinchu (TW); Jiun Yi Wu, Zhongli (TW); Szu-Wei Lu, Hsinchu (TW); Jui Lin Chao, New Taipei (TW)

(73) Assignee: Taiwan Semiconductor Manufacturing Company Limited, Hsinchu (TW)

( * ) Notice: Subject to any disclaimer, the term of this patent is extended or adjusted under 35 U.S.C. 154(b) by 282 days.

(21) Appl. No.: 18/507,071

(22) Filed: Nov. 12, 2023

(65) Prior Publication Data

US 2024/0427091 A1    Dec. 26, 2024

Related U.S. Application Data

(60) Provisional application No. 63/517,394, filed on Aug. 3, 2023, provisional application No. 63/509,095, filed on Jun. 20, 2023.

(51) Int. Cl.
*G02B 6/42* (2006.01)

(52) U.S. Cl.
CPC ......... *G02B 6/4214* (2013.01); *G02B 6/4239* (2013.01); *G02B 6/424* (2013.01); *G02B 6/4253* (2013.01); *G02B 6/4269* (2013.01)

(58) Field of Classification Search
CPC .... G02B 6/4214; G02B 6/4239; G02B 6/424; G02B 6/4253; G02B 6/4269; G02B 6/305; G02B 6/4274
See application file for complete search history.

(56) References Cited

U.S. PATENT DOCUMENTS

| | | | |
|---|---|---|---|
| 10,031,292 B2 * | 7/2018 | Chen | G02B 6/14 |
| 10,976,495 B2 * | 4/2021 | Cardenas | G02B 6/305 |

(Continued)

FOREIGN PATENT DOCUMENTS

| | | |
|---|---|---|
| CN | 113933941 A | 1/2022 |
| JP | 2017054132 A | 3/2017 |

(Continued)

OTHER PUBLICATIONS

TW Patent and Trademark Office; TW Application No. 112151472; Office Action mailed Apr. 2, 2025; 10 pages.

*Primary Examiner* — John Bedtelyon
(74) *Attorney, Agent, or Firm* — The Marbury Law Group, PLLC

(57) ABSTRACT

A photonic assembly includes: a composite die including a photonic integrated circuits (PIC) die and an electronic integrated circuits (EIC) die, the PIC die including waveguides and photonic devices therein, and the EIC die including semiconductor devices therein; an optical connector unit including a first connector-side mirror reflector and a first transition edge coupler and attached to a top surface of the composite die, wherein the first connector-side mirror reflector is configured to change a beam direction between a vertically-extending beam path through the composite die and a horizontally-extending beam path through the first transition edge coupler; and a fiber array units assembly attached to a sidewall of the optical connector unit.

20 Claims, 91 Drawing Sheets

(56) References Cited

U.S. PATENT DOCUMENTS

| | | | | |
|---|---|---|---|---|
| 11,417,698 B2* | 8/2022 | Chang | ............... | H10F 39/806 |
| 11,715,728 B2* | 8/2023 | Yu | ............... | H10F 71/00 |
| | | | | 257/431 |
| 11,719,898 B2* | 8/2023 | Nagarajan | ............ | G02B 6/4214 |
| | | | | 398/164 |
| 11,762,155 B2* | 9/2023 | Patel | ............... | G02B 6/423 |
| | | | | 385/14 |
| 11,973,074 B2* | 4/2024 | Yu | ............... | G02B 6/428 |
| 12,092,861 B2* | 9/2024 | Yu | ............... | G02B 6/4274 |
| 12,243,843 B2* | 3/2025 | Wu | ............... | H01L 24/26 |
| 2022/0155539 A1 | 5/2022 | Pietambaram et al. | | |
| 2023/0418002 A1* | 12/2023 | Tseng | ............... | G02B 6/30 |

FOREIGN PATENT DOCUMENTS

| | | | |
|---|---|---|---|
| TW | 202242463 A | 11/2022 | |
| TW | 202246824 A | 12/2022 | |
| TW | 202322229 A | 6/2023 | |

\* cited by examiner

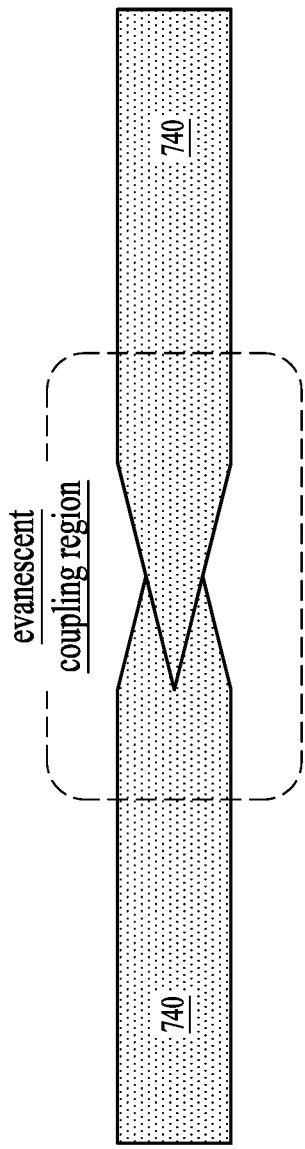
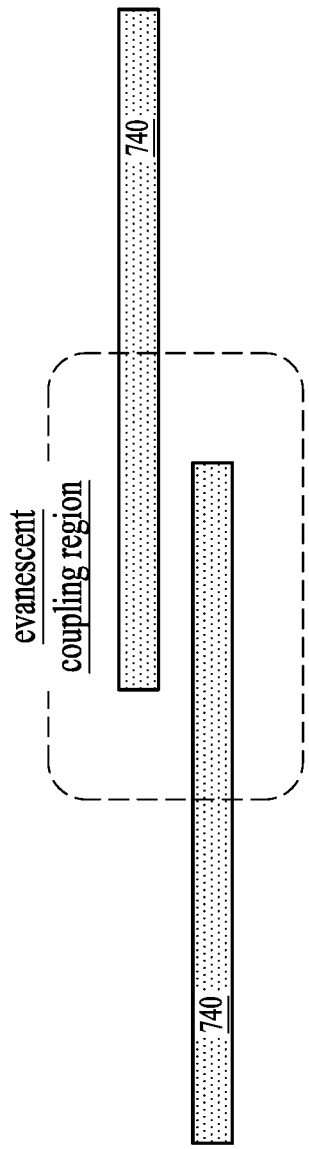
FIG. 3A
FIG. 3B

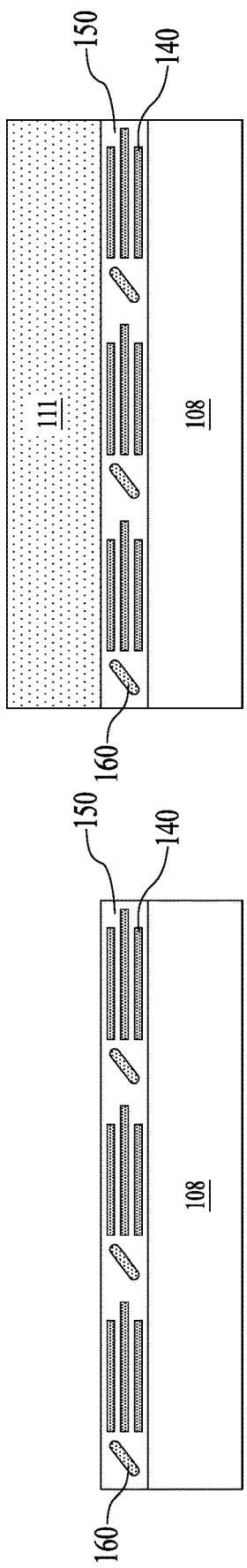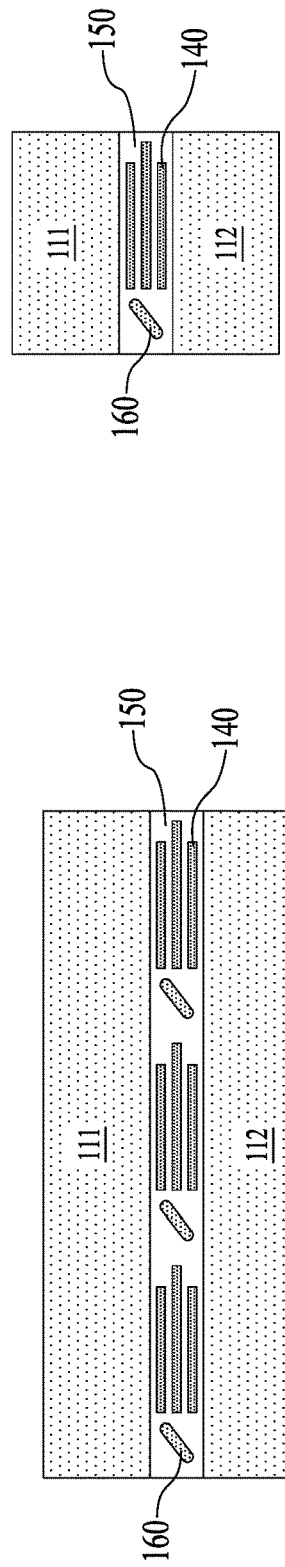
FIG. 5A
FIG. 5B
FIG. 5C
FIG. 5D

OPTICAL CONNECTION STRUCTURES FOR A PHOTONIC ASSEMBLY AND METHODS FOR FORMING THE SAME

RELATED APPLICATIONS

This application claims priority from U.S. Provisional Application Ser. No. 63/509,095 entitled "COUPE (COUPE 2.0) Structure for Compatibility with uBump Fabrication, Facilitated by Exterior Light Coupling Module and Installation of Fiber Array Unit"," filed on Jun. 20, 2023 and U.S. Provisional Application Ser. No. 63/517,394 entitled "Package Structure," filed on Aug. 3, 2023, the entire contents of both of which are incorporated herein by reference for all purposes.

BACKGROUND

Photonic integrated circuits (PICs) and electronic integrated circuits (EICs) are extensively used in modern electronics. PICs include photonic components formed in a photonic die, and electronic integrated circuits include semiconductor devices formed in a semiconductor die. PICs rely on light energy, and are supported by laser sources that enhance integration, speed, and heat reduction. The fabrication of PICS may use monolithic photonic integration or hybrid photonic integration. The utility of PICs spans across applications such as automotive sensors, healthcare systems, and data communication. PICs offer advantages such as energy efficiency, high speed, and integration compatibility with electronic integrated circuits.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3A illustrates a top-down view of a pair of waveguides that are coupled to each other through evanescent coupling. FIG. 3B is a side view of the pair of waveguides illustrated in FIG. 3A.

FIGS. 5A-5D are sequential vertical cross-sectional views of an exemplary structure during formation of an optical connector die.

DETAILED DESCRIPTION

Figure 1A:
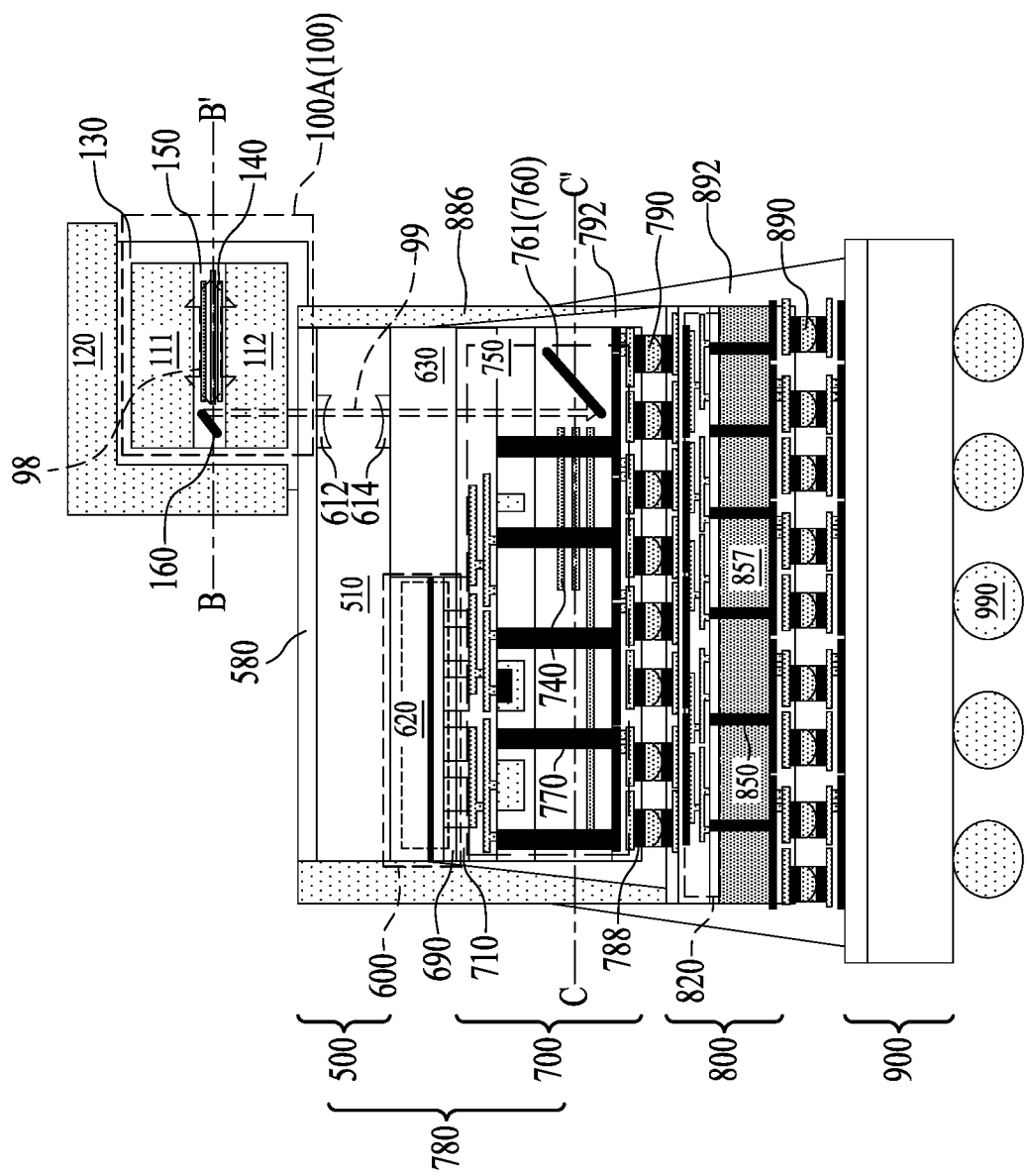
FIG. 1A is a vertical cross-sectional view of a first embodiment structure of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. Elements with the same reference numerals are presumed to be the same element or similar elements, and are presumed to have the same material composition and provide the same function, unless expressly described otherwise.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. Elements with the same reference numerals refer to the same element, and are presumed to have the same material composition and the same thickness range unless expressly indicated otherwise. As used herein, an element or a system "configured for" a function or an operation or "configured to" provide or perform a function or an operation refers to an element or a system that is provided with hardware, and with software as applicable, to provide such a function or such an operation as described in the present disclosure, and as known in the art in the event any details of such hardware or such software are not expressly described herein.

A compact universal photonic engine (COUPE) includes a combination of PICs and EICs that provides optical-electrical transmission. A COUPE allows for the processing of optical signals using an electronic signal transmission system. A COUPE integrates various optical components, electro-optics transition devices, and optical fibers. In optical-electrical devices, laser light plays a pivotal role. Optical fibers may be used to feed laser light to a COUPE. The laser light may pass through a supporting silicon substrate. The laser light may be re-focused and re-concentrated through optical lenses to reduce spatial light divergence. According to an aspect of the present disclosure, bump bonding may be provided between photonic integrated circuits (PIC) and a packaging substrate through various integration schemes to enable low cost manufacturing.

Embodiments of the present disclosure provide transmission of optical signal without the use of dies that are bonded using metal-to-metal bonding, which is also referred to as SoIC bonding. Metal-to-metal bonding is costly and benefits from precise alignment among components. In one embodiment, microbump bonding may be used to provide a photonic assembly including various types of dies attached to a common packaging substrate. Embodiments of the present disclosure enable optical connection between modules and external fibers without relying on the waveguides provided within an interposer. In one embodiment, a silicon interposer for connecting waveguides may be replaced with optical components that are interconnected to one another for direct optical signal transmission thereamongst. The various embodiment methods may increase flexibility for manufacture of advanced optical systems while reducing the total manufacturing cost. Various embodiment methods of the present disclosure may be applicable to photonic integrated circuits, silicon photonics, three-dimensional integrated circuits for photonic applications, and COUPE structures.

According to an aspect of the present disclosure, the COUPE may include optical elements for effectively channeling of the laser light (also referred simply as light) to optical devices in a die. Specifically, an optical deflector may be provided in a COUPE die to couple vertically-propagating laser light to horizontally-extending waveguides within the COUPE die. Specifically, the COUPE die of the various embodiments may include a COUPE-based optical-electrical transmission systems that includes an optical connector module that is attached to, or integrated into, a COUPE die, an optical deflector formed within the COUPE die, and a vertical light path between the optical connector module and the optical connector module.

Various embodiments disclosed herein may provide a versatile optical connector located on, or within, a COUPE die. The optical connector may function as a self-aligned optical conduit between external optical fibers or light coupler apparatus and the waveguides within co-packaged optics (CPO) in the COUPE die. Further, the optical path may be extended subsequent to emission from focusing lenses located on the support semiconductor substrate. The optical deflector of the various embodiments may provide flexible channeling of the light between photonic integrated circuits (PICs) and the fibers or light coupler apparatus. Various embodiments of the present disclosure may provide diverse coupling modes for optical fibers or light coupler apparatus, encompassing both vertical and horizontal coupling styles.

According to an aspect of the present disclosure, a fiber array units assembly may be provided, which comprises a proximal support plate; a distal support plate overlying the proximal support plate; and optical fibers located between the proximal support plate and the distal support plate; and a fiber array matrix comprising fiber sheaths laterally surrounding the optical fibers and laterally spaced from the proximal support plate and the distal support plate. According to another aspect of the present disclosure, a heat sink is provided, which is attached to a support semiconductor substrate, an optical connector unit, and/or a fiber array units assembly to provide structural support and to dissipate heat that is generated from a COUPE die. According to still another aspect of the present disclosure, an optical bridge die may be used across two composite dies to provide an optical path that optically connects the two composite dies. Embodiments of the present disclosure may be used in such fields as photonic integrated circuits, silicon photonics, three-dimensional integrated chips with photonics applications, and/or the COUPE technology in general.

Figure 1B:
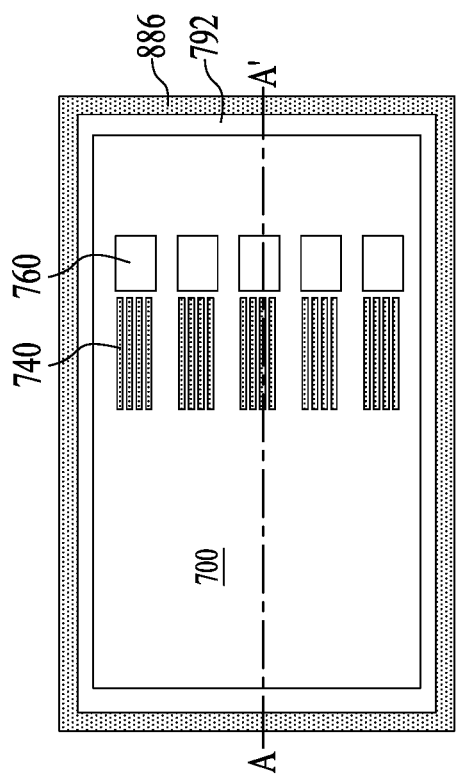
FIG. 1B is a horizontal cross-sectional view along the horizontal plane B-B' of the first embodiment structure of FIG. 1A.
Figure 1C:
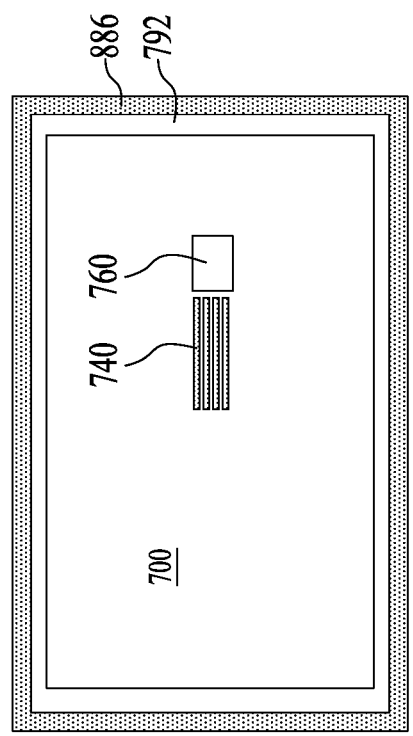
FIG. 1C is a horizontal cross-sectional view along the horizontal plane C-C' of the first embodiment structure of FIG. 1A.
Figure 1D:
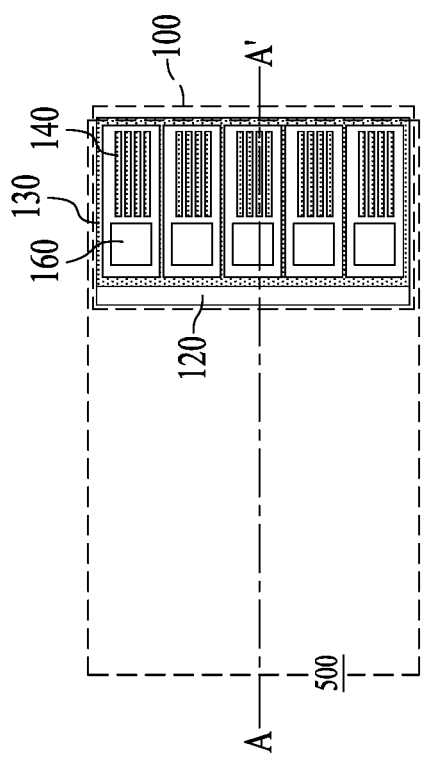
FIG. 1D is a horizontal cross-sectional view of an alternative configuration of the first embodiment structure of FIGS. 1A-1C along a horizontal plane that corresponds to the horizontal plane B-B' in FIG. 1A.
Figure 1E:
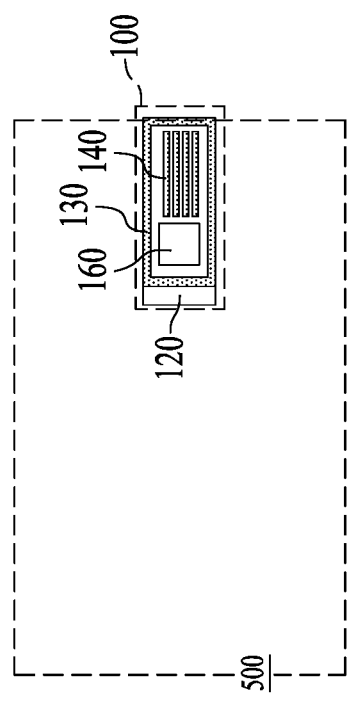
FIG. 1E is a horizontal cross-sectional view of the alternative configuration of the first embodiment structure of FIGS. 1A-1C along a horizontal plane that corresponds to the horizontal plane C-C' in FIG. 1A.

FIG. 1A is a vertical cross-sectional view of a first embodiment structure of the present disclosure. FIG. 1B is a horizontal cross-sectional view along the horizontal plane B-B' of the first embodiment structure of FIG. 1A. FIG. 1C is a horizontal cross-sectional view along the horizontal plane C-C' of the first embodiment structure of FIG. 1A. FIG. 1D is a horizontal cross-sectional view of an alternative configuration of the first embodiment structure of FIGS. 1A-1C along a horizontal plane that corresponds to the horizontal plane B-B' in FIG. 1A. FIG. 1E is a horizontal cross-sectional view of the alternative configuration of the first embodiment structure of FIGS. 1A-1C along a horizontal plane that corresponds to the horizontal plane C-C' in FIG. 1A. FIGS. 1B and 1C illustrates a configuration in which a plurality of optical connector units 100 are attached to a top surface of a composite die 780. FIGS. 1D and 1E illustrate a configuration in which a single optical connector unit 100 is attached to a top surface of a composite die 780. The vertical plane A-A' in FIGS. 1B-1E is the cut plane of the vertical cross-sectional view of FIG. 1A. While the first embodiment structure is hereafter described using an embodiment including an optical connector unit 100, it should be understood that additional optical connector units 100 may be present in addition to the optical connector unit 100 that is described herein. Likewise, a plurality of optical deflectors 760 may be provided in a photonic integrated circuits (PIC) die 700. In one embodiment, the total number of the optical deflectors 760 may be the same as the total number of the optical connector units 100.

Referring collectively to FIGS. 1A-1E, the first embodiment structure comprises an optical assembly including a composite die 780. The composite die 780 comprises a compact universal photonic engine (COUPE) (600, 700), which includes a combination of photonic integrated circuits provided in a photonic integrated circuits (PIC) die 700 and electronic integrated circuits provided in an electronic integrated circuits (EIC) die 600. The optical assembly generally include electro-optics transition devices and optical fibers (not shown) that provide light. The area of a substrate 500 is illustrated in FIGS. 1B and 1D by a dotted rectangle.

The composite die 780 may be formed by providing a PIC die 700 and an EIC die 600. The PIC die 700 comprises various types of photonic devices 750 known in the art, an optical deflector 760 configured to change the direction of an optical beam, waveguides 740 providing optical paths between optical nodes of the various photonic devices 750 and between the optical deflector 760 and a subset of the waveguides 740, and metal interconnect structures 770 configured to provide electrical signals to the various electrical nodes of the photonic devices 750. In one embodiment, the optical deflector 760 may comprise an in-die mirror 761 having a tilt angle of 45 degrees relative to a vertical direction.

A top side of the PIC die 700 may comprise metallic bonding pads configured for metal-to-metal bonding (such as copper-to-copper bonding), which are herein referred to as PIC metallic bonding pads 710. A bottom side of the PIC die 700 may comprise on-die bump structures 788, i.e., bump structures that are formed on a die. The on-die bump structures 788 may comprise microbump structures (i.e. C2 bump structures) or C4 bump structures. The metal interconnect structures 770 within the PIC die 700 provide electrical connection between the PIC metallic bonding pads 710 and the on-die bump structures 788. In some embodiments, the PIC die 700 may be made from a semiconductor-on-insulator (SOI) wafer. Generally, an array of PIC dies 700 may be provided as a two-dimensional periodic array of PIC dies 700 within a wafer.

The EIC die 600 comprises semiconductor devices 620 that form the electronic integrated circuits. The semiconductor devices 620 may comprise field effect transistors, diodes, resistors, capacitors, inductors, or various other types of semiconductor devices that may be manufactured on a semiconductor substrate. Further, metal interconnect structures (not expressly shown) embedded within dielectric material layers including interlayer dielectric (ILD) materials) may be provided in the EIC die 600. In addition, the EIC die may comprise metallic bonding pads configured for metal-to-metal bonding, which are herein referred to as EIC metallic bonding pads 690. The EIC metallic bonding pads 690 may be arranged in a mirror image pattern of the pattern of the PIC metallic bonding pads 710. According to an aspect of the present disclosure, the EIC die 600 may have a smaller lateral extent than the PIC die 700. Thus, the EIC die 600 may fit within the area of the PIC die 700 in a plan view upon aligning the EIC die 600 with the PIC die 700 for metal-to-metal bonding between the PIC metallic bonding pads 710 and the EIC metallic bonding pads 690.

The EIC die 600 may be attached to the PIC die 700, for example, by bonding the EIC metallic bonding pads 690 to the PIC metallic bonding pads 710 through metal-to-metal bonding, such as copper-to-copper bonding). In embodiments in which a wafer including a two-dimensional array of PIC dies 700 is provided, a plurality of EIC dies 600 may be bonded to a respective PIC die 700 within the two-dimensional array of PIC dies 700. A dielectric fill material such as a molding compound material, a polymer material, or a silicon oxide material (such as flowable oxide) may be deposited in the gaps between neighboring pairs of EIC dies 600 over the wafer including the two-dimensional array of PIC dies 700. A planarization process such as a chemical mechanical polishing process may be performed to remove portions of the dielectric fill material from above the horizontal plane including the top surfaces of the EIC dies 600. The remaining portion of the dielectric fill material comprises a dielectric matrix 630.

A semiconductor layer including optical lenses (612, 614) may be attached to the top surface of a reconstituted wafer including a two-dimensional array of PIC dies 700, a two-dimensional array of EIC dies 600, and the dielectric matrices 630. The semiconductor layer is used as a support structure, and is herein referred to as a support semiconductor substrate 510. The optical lenses (612, 614) may be formed, for example, by forming recess cavities including non-planar surfaces (such as convex surfaces) in the path of an optical beam, such as a vertically-extending beam path 99, and by filing the recess cavities by an optically transparent material such as silicon oxide. The optical lenses (612, 614) may comprise distal substrate lenses 612 that are formed on a distal side of the support semiconductor substrate 510 (i.e., a side that is distal from the PIC die 700), and proximal substrate lenses 614 that are formed on a proximal side of the support semiconductor substrate 510 (i.e., a side that is proximal to the PIC die 700). The optical lenses (612, 614) may be used to focus a light beam that travels through the support semiconductor substrate 510.

Through-substrate via structures (not shown) may be optically formed through the support semiconductor substrate 510 to provide vertically-extending electrically conductive paths, which may be used to provide additional electrical connections to the electrical nodes of the semiconductor devices 620. The support semiconductor substrate 510 may be bonded to the combination of the array of EIC dies 600 and the dielectric matrices 630 by semiconductor-to-insulator bonding (such as silicon-to-oxide bonding or silicon-to-polymer bonding), or a thin layer of semiconductor oxide layer (not shown) may be formed on a bottom surface of the support semiconductor substrate 510, for example, by oxidation, and oxide-to-insulator bonding may be used. A suitable thermal anneal at an elevated temperature may be used to bond the support semiconductor substrate 510 to the combination of the array of EIC dies 600 and the dielectric matrices 630. The thickness of the support semiconductor substrate 510 may be in a range from 5 microns to 30 microns, although lesser and greater thicknesses may also be used.

An optically transparent dielectric layer 580 may be deposited on a top surface of the support semiconductor substrate 510. The optically transparent dielectric layer 580 may include a polymer or silicon oxide. The thickness of the optically transparent dielectric layer 580 may be in a range from 1 micron to 10 microns, although lesser and greater thicknesses may also be used. The combination of the support semiconductor substrate 510 and the optically transparent dielectric layer 580 constitutes a substrate 500. As used herein, an optically transparent element refers to an element having an optical extinction coefficient (i.e., an imaginary part of a refractive index) less than 0.0001 within the wavelength range of the light used in optical communication, such as a wavelength range from 500 nm to 2,000 nm.

The reconstituted wafer including the two-dimensional array of PIC dies 700, the two-dimensional array of EIC dies 600, the dielectric matrices 630, and the substrate 500 may be diced along dicing channels to form a plurality of composite dies 780. Thus, each composite die 780 comprises a respective PIC die 700, a respective EIC die 600, a respective dielectric matrix 630, a respective support semiconductor substrate 510, and a respective optically transparent dielectric layer 580. Within each composite die 780, sidewalls of the PIC die 700 may be vertically coincident with sidewalls of the dielectric matrix 630, sidewalls of the support semiconductor substrate 510, and sidewalls of the optically transparent dielectric layer 580, and may be vertically coincident with a sidewall of the EIC die 600. As used herein, a first surface is vertically coincident with a second surface in instances in which the second surface overlies or underlies the first surface and in instances in which there exists a vertical plane including the first surface and the second surface.

The composite die 780 may be bonded to an interposer wafer including a two-dimensional array of interposers 800. Each interposer 800 may comprise, for example, through-interposer via structures 850 vertically extending through an interposer matrix 857, metal interconnect wing 820 providing electrically conductive paths, die-side bump structures having a mirror image pattern of the on-die bump structures 788 and facing the composite die 780, and substrate-side bump structures located on an opposite side of the die-side bump structures. In some embodiments, the substrate-side bump structures may comprise C4 bonding pads.

Composite dies 780 may be bonded to a respective one of the interposers 800 in the interposer wafer using arrays of first solder material portions 790. A first underfill material portion 792 may be applied around each array of first solder material portions 790 between a respective bonded pair of a composite die 780 and an interposer 800. A molding compound material may be applied to the gaps between neighboring pairs of composite dies 780. Excess portions of the molding compound material may be removed from above the horizontal plane including top surfaces of the composite dies 780 by a planarization process such as a chemical mechanical polishing process. The remaining portion of molding compound material constitutes a molding compound matrix. A reconstituted wafer including the interposer wafer, the array of composite dies 780, and the molding compound matrix may be diced along dicing channels to form a bonded assembly (780, 800, 886) including a composite die 780, and interposer 800, and a molding compound die frame 886. Sidewalls of the molding compound die frame 886 may be vertically coincident with sidewall of the packaging substrate 900.

The bonded assembly (780, 800, 886) may be bonded to a packaging substrate 900 through an array of second solder material portions 890. The second solder material portions 890 may comprise microbump solder balls or C4 solder balls. A second underfill material portion 892 may be formed around the second solder material portions 890 between the interposer 800 and the packaging substrate 900. The optical connector unit 100 may be attached to the composite die 780 prior to, or after, attaching solder joints 990 to the packaging substrate 900.

The bonded assembly (780, 800, 886) may comprise a photonic assembly (i.e., an assembly including photonic devices therein) including the composite die 780. The composite die 780 comprises at least one optical path that includes a vertically-extending beam path 99 that extends from an optical deflector 760 embedded within the PIC die 700 through the dielectric matrix 630, through the support semiconductor substrate 510 and at least one optical lens (612, 614) thereupon, and into the optically transparent dielectric layer 580. According to an aspect of the present disclosure, an optical connector unit 100 may be mounted to a location at an extension of the vertically-extending beam path 99. In some embodiments, the optical connector unit 100 may comprise a first connector-side mirror reflector 160 and a first transition edge coupler 140, and may be mounted on the composite die 780 such that the vertically-extending beam path intersects the first connector-side mirror reflector 160. The first connector-side mirror reflector 160 changes the beam propagation direction of a beam traveling along the vertically-extending beam path 99 to a horizontal direction. The path of an optical beam that traves along the horizontal direction is herein referred to a horizontally-extending beam path 98, which extends through the first transition edge coupler 140. In an alternative embodiment to be subsequently described, the optical connector unit 100 may be formed within the composite die 780, for example, in the optically transparent dielectric layer 580.

Generally, a composite die 780 including a photonic integrated circuits (PIC) die 700 and an electronic integrated circuits (EIC) die 600 may be formed. The PIC die 700 comprising waveguides 740 and photonic devices 750 therein, and the EIC die 600 comprising semiconductor devices 620 therein. An optical connector unit 100 comprising a first connector-side mirror reflector 160 and a first transition edge coupler 140 within, or on, the composite die 780, wherein the first connector-side mirror reflector 160 is configured to change a beam direction between a vertically-extending beam path 99 through the composite die 780 and a horizontally-extending beam path 98 through the first transition edge coupler 140.

In an embodiment illustrated in FIGS. 1A-1E, the optical connector unit 100 comprises an optical connector die 100A that is attached to a top surface of the composite die 780 using an optical glue portion 130. The optical glue portion 130 may comprise an optical glue material known in the art. In an illustrative example, the optical glue portion 130 may comprise an epoxy material composition containing components that provide curing when exposed to visible light or a reaction accelerant liquid. Typically, more than 50% in weight percentage of the optical glue material may comprise small particles. In embodiments in which the optical glue composition is cured through exposure to light, the optical glue composition may comprise an initiator or a sensitizer, and the particles in the optical glue composition may have two different sizes. Once the optical glue composition is set, optical characteristics of the optical glue portion 130 may be changed. For example, the optical glue composition may change the way light bends through it and how it responds to temperature changes. In an alternative embodiment, the optical glue composition may comprise epoxy material at a weight percentage in a range from 5% to 49.9%, a small amount of the liquid, and a light-reacting system. The liquid also includes a small amount of an initiator and a sensitizer. Small particles make up more than half of the weight of the optical glue composition.

In one embodiment, an encapsulation cover 120 may be attached to the optical connector die 100A. The encapsulation cover 120 provides enhanced structural strength to the region in which the optical connector die 100A is attached to the composite die 780. In one embodiment, the encapsulation cover 120 has a horizontally-extending portion overlying the optical connector die 100A and a vertically-extending portion that is attached to a sidewall of the optical connector die 100A through the optical glue portion 130.

Generally, the first connector-side mirror reflector 160 may be configured to change a beam direction between the vertically-extending beam path 99 through the composite die 780 and the horizontally-extending beam path 98 through the first transition edge coupler 140. In one embodiment, the first connector-side mirror reflector 160 may comprise a tilted mirror facing downward and sideways such that a reflection plane of the tilted mirror is tilted by 45 degrees relative to a vertical direction.

The optical glue portion 130 bonds a bottom surface of the optical connector die 100A to the top surface of the composite die 780, and also bonds the encapsulation cover 120 to the optical connector die 100A and to the composite die 780. In one embodiment, the composite die 780 comprises a support semiconductor substrate 510 interposed between the PIC die 700 and the optical connector unit 100, the vertically-extending beam path 99 vertically extends through the support semiconductor substrate 510. In one embodiment, the optically transparent dielectric layer 580 overlies a top surface of the support semiconductor substrate 510, and the optical connector unit 100 is located over the optically transparent dielectric layer 580.

In one embodiment, the optical connector unit 100 comprises a dielectric matrix layer 150 embedding the first connector-side mirror reflector 160 and the first transition edge coupler 140, a second spacer plate 112 interposed between the composite die 780 and the dielectric matrix layer 150, and a first spacer plate 111 located over the first connector-side mirror reflector 160 and more distal from the composite die 780 than the first connector-side mirror reflector 160.

In one embodiment, the PIC die 700 comprises an optical deflector 760, and the first connector-side mirror reflector 160 is configured to change a beam direction between a vertically-extending beam path 99 extending between the optical deflector 760 and the first connector-side mirror reflector 160 and through the support semiconductor substrate 510 and a first horizontally-extending beam path 98 through the first transition edge coupler 140. In one embodiment, the PIC die 700 comprises waveguides 740 that laterally extend along a horizontal direction, the optical deflector 760 comprises an in-die mirror 761 configured to change the beam direction between a second horizontally-extending beam path 98 through a subset of the waveguides 740 and the vertically-extending beam path 99.

According to an aspect of the present disclosure, the first connector-side mirror reflector 160 changes the optical path from the vertically-extending beam path 99 to the horizontally-extending beam path 98 for beams that exit the composite die 780, and changes the optical path from the horizontally-extending beam path 98 to the vertically-extending beam path 99 for beams that enter the first transition edge coupler 140. The first transition edge coupler 140 is optically coupled to an external optical module (not illustrated) or an external optical component (not illustrated). For example, the external optical module may comprise a fiber array units assembly that includes optical fibers. In one embodiment, light exiting the first transition edge coupler 140 enters the optical fibers, and vice versa. In this embodiment, the optical fibers may be aligned to the first transition edge coupler 140 to maximize optical transmission therebetween. The at least one optical lens (612, 614) embedded in the support semiconductor substrate 510 refocuses the light that travels along the vertically-extending beam path 99. Thus, the optical connector unit 100 (such as the optical connector die 100A) of the present disclosure changes a beam direction between a vertical direction and a horizontal direction. Embodiments of the present disclosure provide redirection of an optical output/input between a vertical direction and a horizontal direction, and optical coupling between the composite die 780 and an external optical module.

Figure 2A:
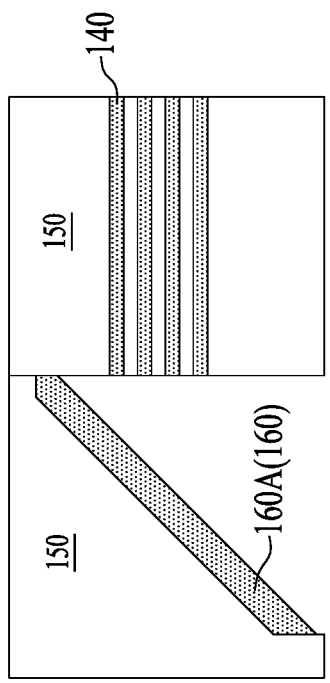
FIG. 2A is a vertical cross-sectional view of a first embodiment of a mirror reflector and a transition edge coupler in an optical connector die according to an aspect of the present disclosure.
Figure 2B:
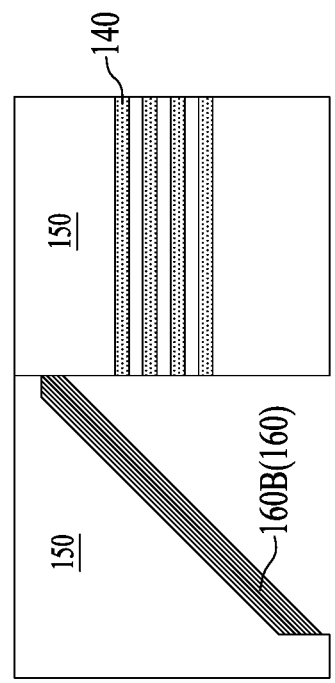
FIG. 2B is a vertical cross-sectional view of a second embodiment of a mirror reflector and a transition edge coupler in an optical connector die according to an aspect of the present disclosure.
Figure 2C:
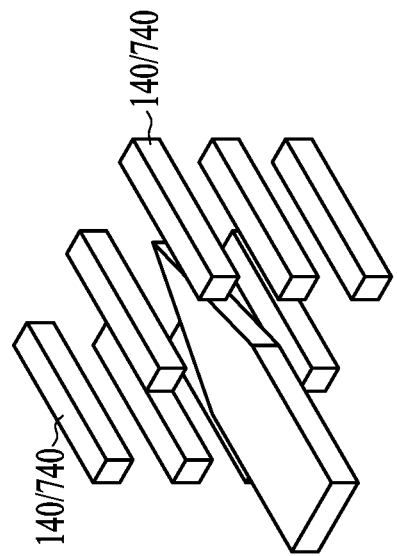
FIG. 2C is a perspective view of a transition edge coupler according to an aspect of the present disclosure.

FIG. 2A is a vertical cross-sectional view of a first embodiment of a mirror reflector 160 and a transition edge coupler 140 in an optical connector die 100A according to an aspect of the present disclosure. FIG. 2B is a vertical cross-sectional view of a second embodiment of a mirror reflector 160 and a transition edge coupler 140 in an optical connector die 100A according to an aspect of the present disclosure. FIG. 2C is a perspective view of the first transition edge coupler 140 or waveguides 740 having a configuration of a transition edge coupler according to an aspect of the present disclosure.

Referring to FIG. 2A, a first configuration for the first connector-side mirror reflector 160 is illustrated. In one embodiment, the first connector-side mirror reflector 160 may comprise a metal-coated mirror 160A including a coating of a metal such as a layer stack of Cu/Al/Ta, an Al—Cu compound, an Al—Cu—Si compound, etc.

Referring to FIG. 2B, a second configuration for the first connector-side mirror reflector 160 is illustrated. In one embodiment, the first connector-side mirror reflector 160 may comprise a superlattice 160B of dielectric material layers in which a repetition unit including at least two dielectric material layers is repeated with a periodicity to maximize the reflectivity at the wavelength of the optical beam. The total number of repetitions of the repetition unit may be in a range from 2 to 20, although a greater number may also be used.

Referring to FIG. 2C, the first transition edge coupler 140 and/or a subset of the waveguides 740 that are proximal to the optical deflector 760 may have a configuration of a transition edge coupler. A Transition Edge Coupler (TEC) provide efficient optical signal transfer between optical components. The TEC functions as a resonator that optimally bridges the impedance mismatch between proximal end portions of two optical components. This resonance facilitates photon exchange between the two optical components. Additionally, the TEC's nonlinear signal coupling characteristics provide suppression of noise during transmission of an optical signal between two optical components. In an illustrative example, the first transition edge coupler 140 and/or a subset of the waveguides 740 that are proximal to the optical deflector 760 may comprise a plurality of waveguides laterally surrounding a central waveguide including a gradually increasing lateral dimension.

FIG. 3A illustrates a top-down view of a pair of waveguides 740 that are coupled to each other through evanescent coupling. FIG. 3B is a side view of the pair of waveguides 740 illustrated in FIG. 3A. Generally, optical coupling between the waveguides 740 in the PIC die 700 may be provided by evanescent coupling. In this embodiment, an end of a first waveguide 740 located at a first level (i.e., a vertical distance from an underlying reference horizontal plane such as a bottom surface of the PIC die 700) may have a lateral taper such that the first waveguide 740 terminates over, or under, a portion of a second waveguide 740 having a full width, and an end portion of the second waveguide 740 may have a lateral taper such that that the second waveguide 740 terminates under, or over, a portion of the first waveguide having a full width. The second waveguide 740 is located at a second level that is different from the first level.

Figure 4A:
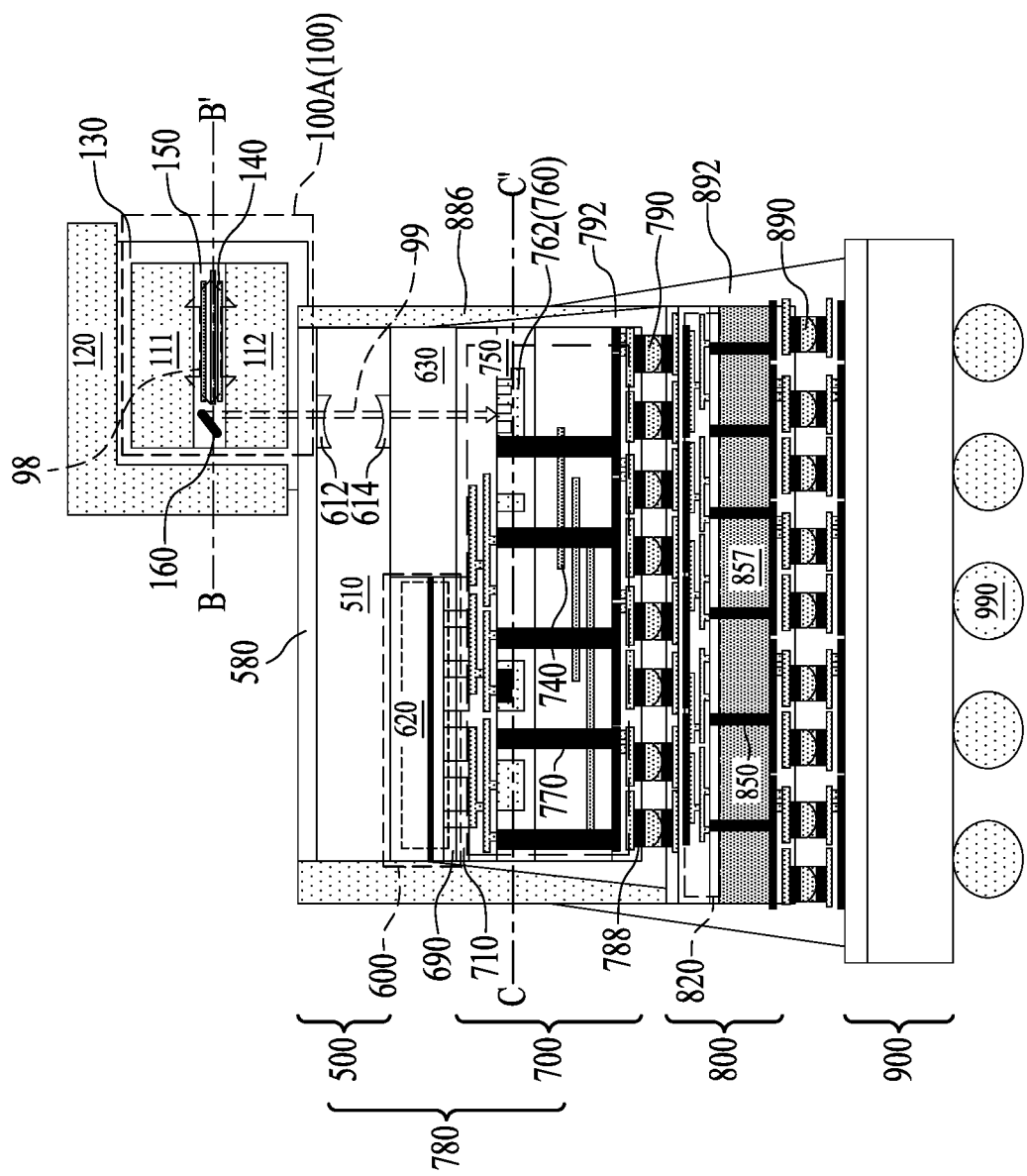
FIG. 4A is a vertical cross-sectional view of a second embodiment structure of the present disclosure.
Figure 4C:
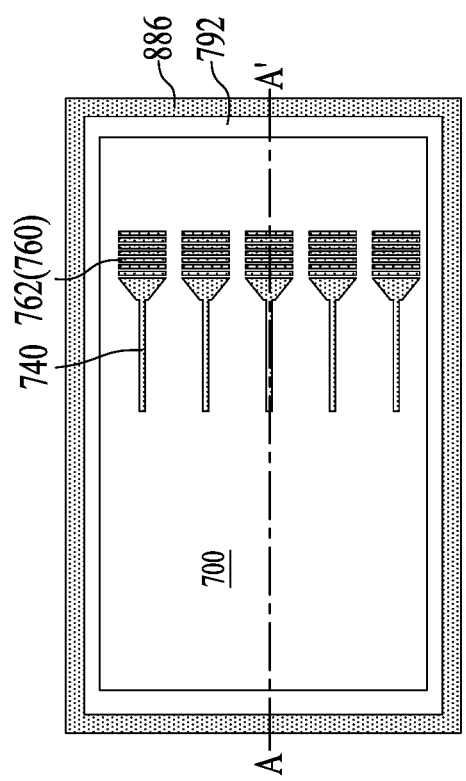
FIG. 4C is a horizontal cross-sectional view along the horizontal plane C-C' of the second embodiment structure of FIG. 4A.
Figure 4E:
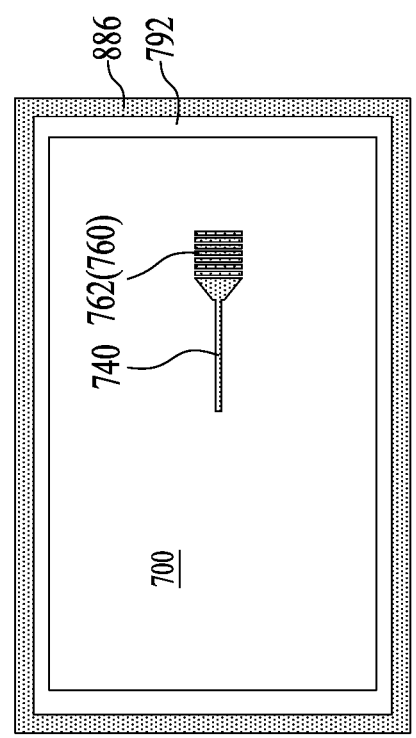
FIG. 4E is a horizontal cross-sectional view of the alternative configuration of the second embodiment structure of FIGS. 4A-4C along a horizontal plane that corresponds to the horizontal plane C-C' in FIG. 4A.
Figure 4B:
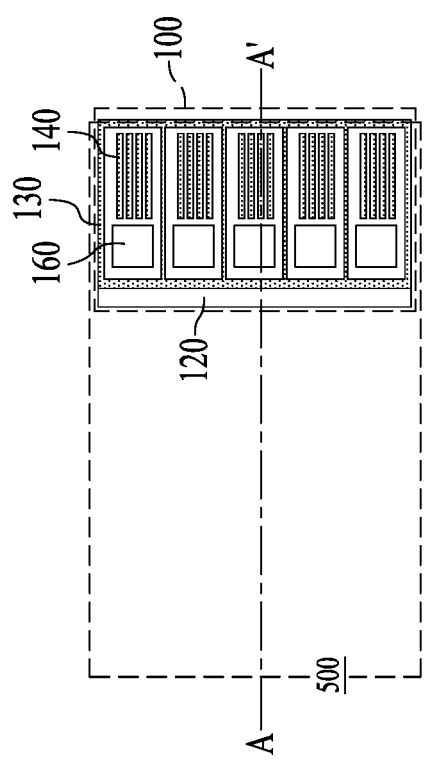
FIG. 4B is a horizontal cross-sectional view along the horizontal plane B-B' of the second embodiment structure of FIG. 4A.
Figure 4D:
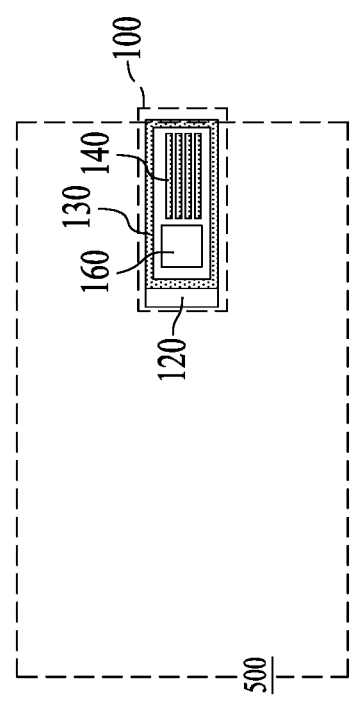
FIG. 4D is a horizontal cross-sectional view of an alternative configuration of the second embodiment structure of FIGS. 4A-4C along a horizontal plane that corresponds to the horizontal plane B-B' in FIG. 4A.

FIG. 4A is a vertical cross-sectional view of a second embodiment structure of the present disclosure. FIG. 4B is a horizontal cross-sectional view along the horizontal plane B-B' of the second embodiment structure of FIG. 4A. FIG. 4C is a horizontal cross-sectional view along the horizontal plane C-C' of the second embodiment structure of FIG. 4A. FIG. 4D is a horizontal cross-sectional view of an alternative configuration of the second embodiment structure of FIGS. 4A-4C along a horizontal plane that corresponds to the horizontal plane B-B' in FIG. 4A. FIG. 4E is a horizontal cross-sectional view of the alternative configuration of the second embodiment structure of FIGS. 4A-4C along a horizontal plane that corresponds to the horizontal plane C-C' in FIG. 4A. The vertical plane A-A' in FIGS. 4B-4E is the cut plane of the vertical cross-sectional view of FIG. 4A. While the first embodiment structure is hereafter described using an embodiment including an optical connector unit 100, it should be understood that additional optical connector units 100 may be present in addition to the optical connector unit 100 that is described herein. Likewise, a plurality of optical deflectors 760 may be provided in a photonic integrated circuits (PIC) die 700. In one embodiment, the total number of the optical deflectors 760 may be the same as the total number of the optical connector units 100. The optical connector unit 100 may be attached to the composite die 780 prior to, or after, attaching solder joints 990 to the packaging substrate 900.

In the second embodiment structure, a grating coupler 762 may be used in lieu of an in-die mirror 761 as the optical deflector 760 in the PIC die 700 of FIGS. 1A-1E. One end of the grating coupler 762 may comprise a waveguide 740, which may be optically connected to at least one additional waveguide 740, for example, by evanescent coupling. The grating coupler 762 comprises an optical grating having a periodicity along a horizontal direction. Generally, the grating coupler 762 may be used to efficiently couple light between a waveguide 740 in the PIC die 700 and a vertically-propagating beam that propagates through an upper portion of the PIC die 700, the dielectric matrix 630, the support semiconductor substrate 510, and the optically transparent dielectric layer 580. The grating coupler 762 may comprise a periodic pattern of alternating transparent and opaque sections. The periodicity of the periodic pattern is selected to maximize optical coupling at the wavelength of the light to be used for photonic signal transmission. As light encounters the grating of the grating coupler 762 from a vertical direction, the light undergoes scattering. The dimensions of the grating may be selected such that the light constructively interferes only along the direction of a waveguide 740. The same principle applies for the light exiting the waveguide 740 and impinging the grating coupler 762, and causes constructive interference only along the vertical direction, which is the exit direction of the light.

FIGS. 5A-5D are sequential vertical cross-sectional views of an exemplary structure during formation of an optical connector die 100A.

Referring to FIG. 5A, an array of unit devices embedded in a dielectric matrix layer 150 may be formed on a carrier wafer 108. Each unit device may comprise at least one connector-side mirror reflector 160 and at least one transition edge coupler 140. The dielectric matrix layer 150 comprises an optically transparent material such as silicon oxide or a transparent polymer material, and may have a thickness in a range from 10 microns to 300 microns, such as from 20 microns to 150 microns, although lesser and greater thicknesses may also be used. In some embodiments, each unit device may comprise a plurality of connector-side mirror reflectors 160 and a plurality of transition edge couplers 140 arranged along a horizontal direction that is perpendicular to the view plane, i.e., the cut plane, of FIG. 5A. In this embodiment, a resulting optical connector die may provide the function of a plurality of optical connector dies 100A illustrated in FIG. 1B or in FIG. 4B. Each connector-side mirror reflector 160 may have a reflection surface that faces downward at a tilt angle of 45 degrees relative to the vertical direction. The carrier wafer 108 may be any wafer that may be detached at a later processing step.

Referring to FIG. 5B, a first spacer plate 111 may be attached to a top surface of the array of unit devices. The first spacer plate 111 may have the same area as the carrier wafer 108 at this processing step. In one embodiment, the first spacer plate 111 may comprise a dielectric material such as silicon oxide or a transparent polymer material. The thickness of the first spacer plate 111 may be in a range from 10 microns to 300 microns, such as from 20 microns to 150 microns, although lesser and greater thicknesses may also be used.

Referring to FIG. 5C, the carrier wafer 108 may be detached from the array of unit devices. A second spacer plate 112 may be attached to a bottom surface of the array of unit devices. The second spacer plate 112 may have the same area as the first spacer plate 111 at this processing step. In one embodiment, the second spacer plate 112 may comprise a dielectric material such as silicon oxide or a transparent polymer material. The thickness of the second spacer plate 112 may be in a range from 10 microns to 300 microns, such as from 20 microns to 150 microns, although lesser and greater thicknesses may also be used.

Referring to FIG. 5D, the assembly of the array of unit devices, the first spacer plate 111, and the second spacer plate 112 may be diced along dicing channels into a plurality of optical connector dies 100A, which comprise optical connector units 100. Each optical connector die 100A comprises a respective dielectric matrix layer 150 (which is a portion of the dielectric matrix layer 150 formed at the processing steps of FIG. 5A), a respective first spacer plate 111 (which is a portion of the first spacer plate 111 formed at the processing steps of FIG. 5B), and a respective second spacer plate 112 (which is a portion of the second spacer plate 112 formed at the processing steps of FIG. 5C). Each optical connector die 100A comprises at least one connector-side mirror reflector 160 and at least one transition edge coupler 140, and may be used in the embodiment structures of the present disclosure, such as first and second embodiment structures illustrated in FIGS. 1A-1E and 4A-4E, or in embodiment structures to be subsequently described.

Figure 6A:
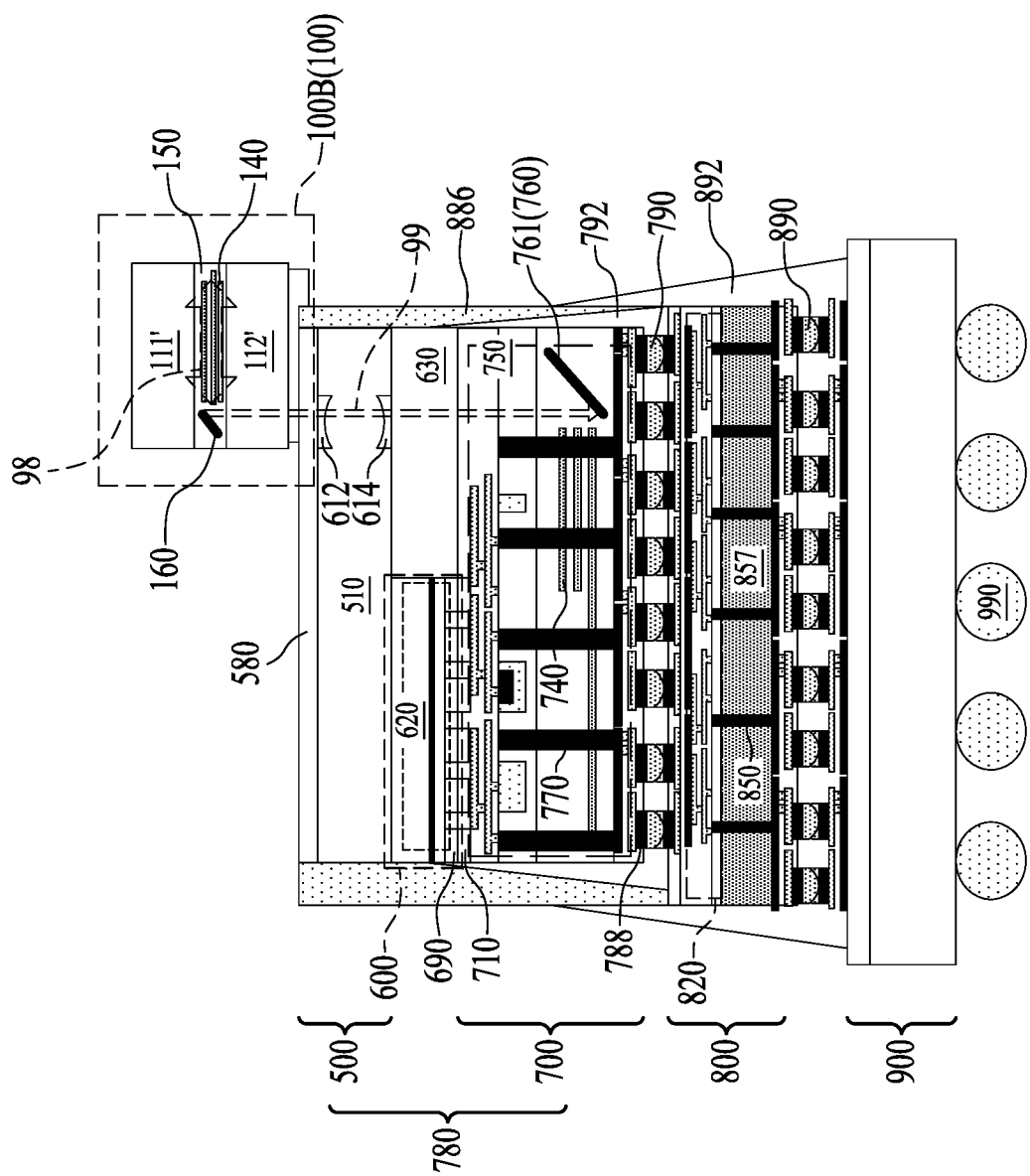
FIG. 6A is a vertical cross-sectional view of a third embodiment structure according to an aspect of the present disclosure.
Figure 6B:
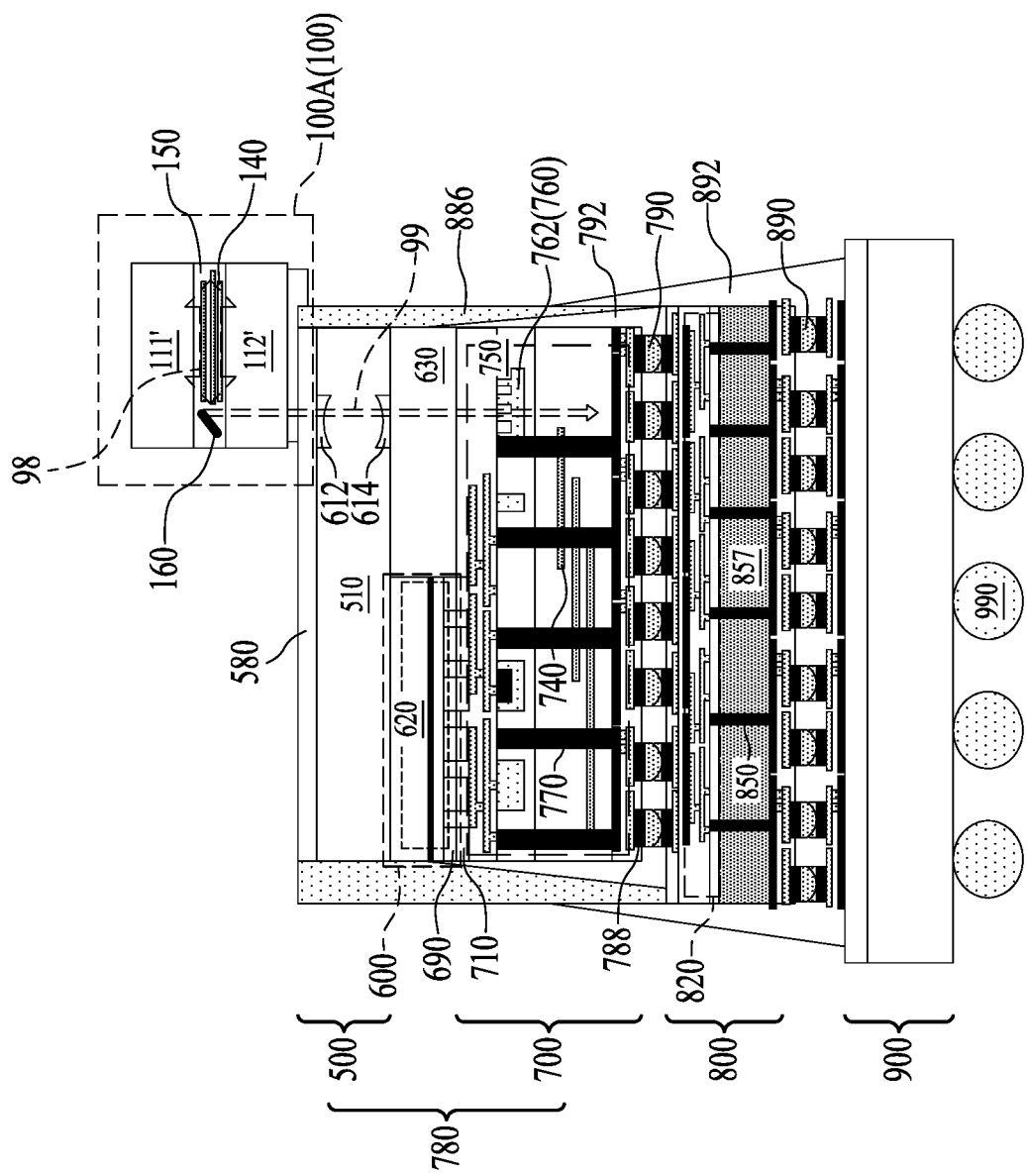
FIG. 6B is a vertical cross-sectional view of an alternative configuration of the third embodiment structure according to an aspect of the present disclosure.

FIG. 6A is a vertical cross-sectional view of a third embodiment structure according to an aspect of the present disclosure. FIG. 6B is a vertical cross-sectional view of an alternative configuration of the third embodiment structure according to an aspect of the present disclosure.

The third embodiment structures illustrated in FIGS. 6A and 6B may be derived from the first embodiment structures illustrated in FIGS. 1A-1E or second embodiments structures illustrated in FIGS. 4A-4E and described above by using an optical connector die 100B (in lieu of optical connector die 100A) using a semiconductor material plate for at least one of the first spacer plate 111 and the second spacer plate 112 illustrated in FIG. 5D. For example, the optical connector die 100B illustrated in FIGS. 6A and 6B may comprise a first spacer plate 111' comprising, and/or consisting essentially of, a semiconductor material such as silicon, and/or may comprise a second spacer plate 112' comprising, and/or consisting essentially of, a semiconductor material such as silicon. The thickness of each of the first spacer plate 111' and the second spacer plate 112' may be in a range from 10 microns to 300 microns, such as from 20 microns to 150 microns, although lesser and greater thicknesses may also be used. Generally, an encapsulation cover 120 may, or may not, be used over the optical connector die 100B.

Figure 7A:
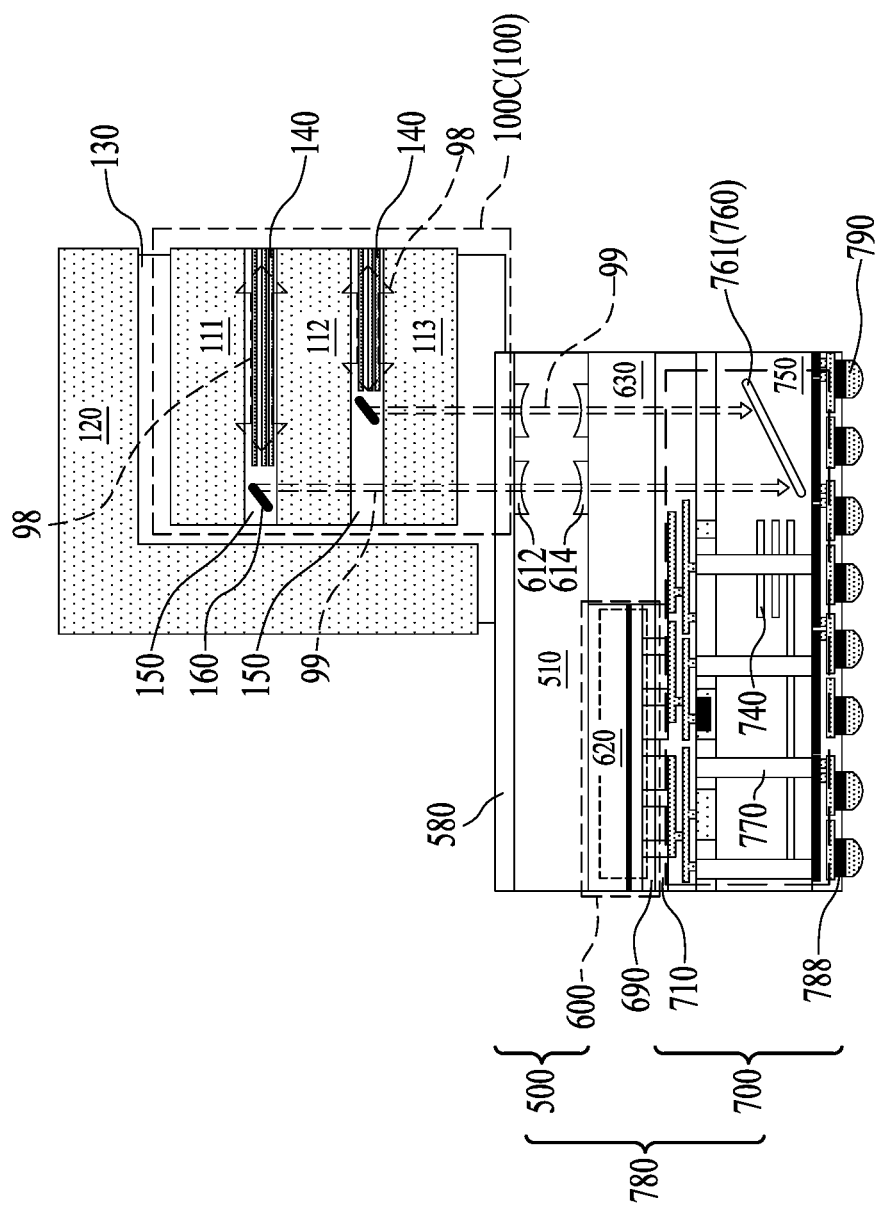
FIG. 7A is a vertical cross-sectional view of a fourth embodiment structure according to an aspect of the present disclosure.
Figure 7B:
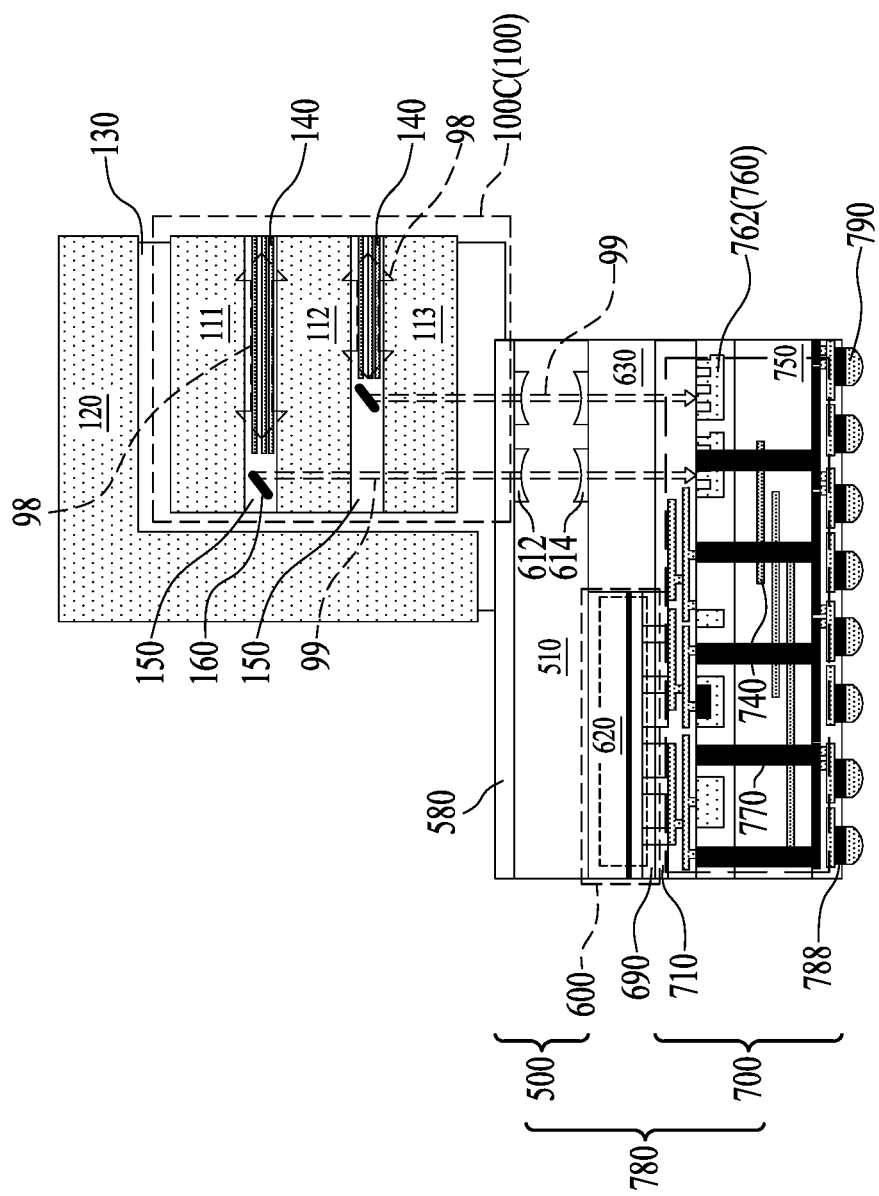
FIG. 7B is a vertical cross-sectional view of an alternative configuration of the fourth embodiment structure according to an aspect of the present disclosure.

FIG. 7A is a vertical cross-sectional view of a fourth embodiment structure according to an aspect of the present disclosure. FIG. 7B is a vertical cross-sectional view of an alternative configuration of the fourth embodiment structure according to an aspect of the present disclosure.

The fourth embodiment structure illustrated in FIGS. 7A and 7B may be derived from any of the first, second, and third embodiment structures (including any alternative configurations) by using an optical connector die 100C including multiple connector-side mirror reflectors 160 formed at different levels, i.e., at different distances from the top surface of the composite die 780. In this embodiment, a first connector-side mirror reflector 160 and a first transition edge coupler 140 may be embedded within a first dielectric matrix layer 150, and may be located between, and may be contacted by, a first spacer plate (111, 111') and a second spacer plate (112, 112'). A second connector-side mirror reflector 160 and a second transition edge coupler 140 may be embedded within a second dielectric matrix layer 150, and may be located between, and may be contacted by, the second spacer plate (112, 112') and a third spacer plate 113. The third spacer plate 113 may have the same material composition and the same thickness range as a first spacer plate (111, 111').

In one embodiment, the optical connector die 100C may comprise a first connector-side mirror reflector 160 and a first transition edge coupler 140 embedded within a first dielectric matrix layer 150, and a second connector-side mirror reflector 160 and a second transition edge coupler 140 embedded in a second dielectric matrix layer 150 and located at a different vertical distance from the composite die 780 than the first connector-side mirror reflector 160 and the first transition edge coupler 140 are from the composite die 780. In this embodiment, the first connector-side mirror reflector 160 may be located at a top end of a first vertically-extending beam path 99, and the second connector-side mirror reflector 160 may be located at a top end of a second vertically-extending beam path 99 that is laterally offset from the first vertically-extending beam path 99. Thus, the second connector-side mirror reflector 160 is laterally offset from the first connector-side mirror reflector 160. A first horizontally-extending beam path 98 extends through the first transition edge coupler 140, and a second horizontally-extending beam path 98 extends through the second transition edge coupler 140. Thus, the second horizontally-extending beam path 98 is vertically offset from the first horizontally-extending beam path 98. Generally, an encapsulation cover 120 may, or may not, be used over the optical connector die 100C.

Figure 8A:
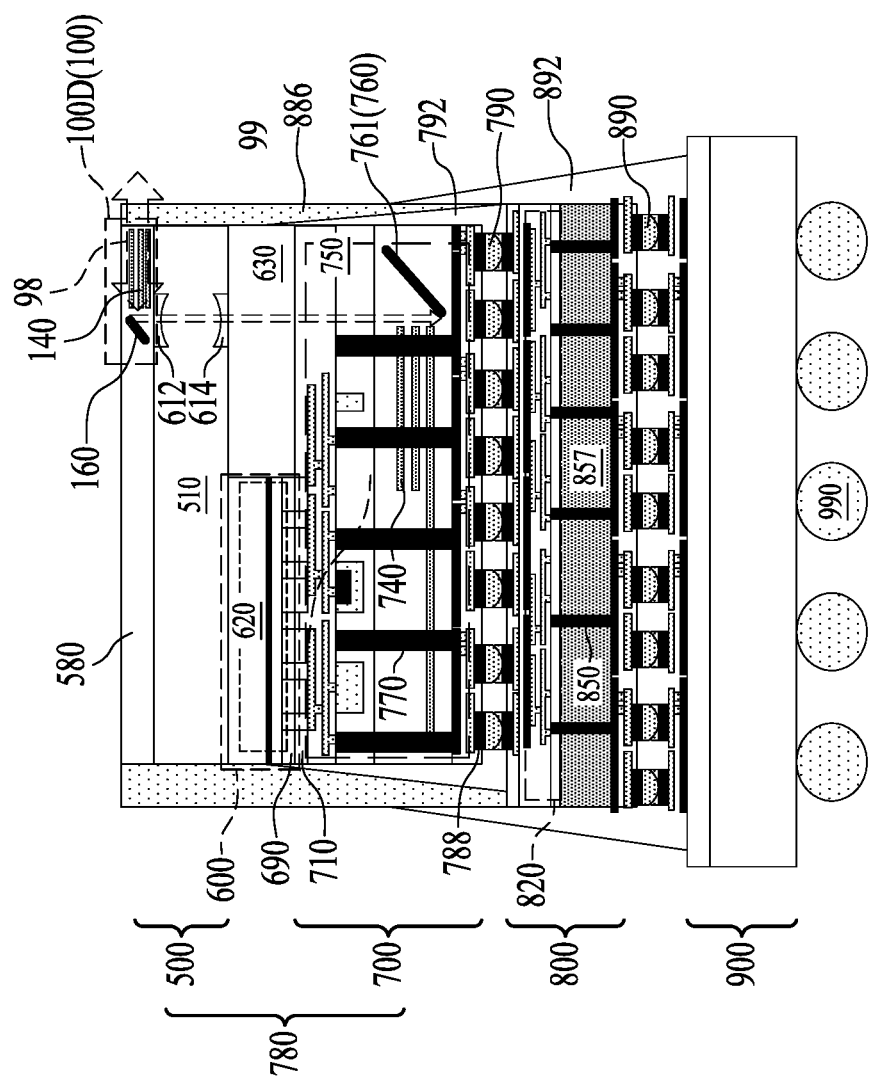
FIG. 8A is a vertical cross-sectional view of a fifth embodiment structure according to an aspect of the present disclosure.
Figure 8B:
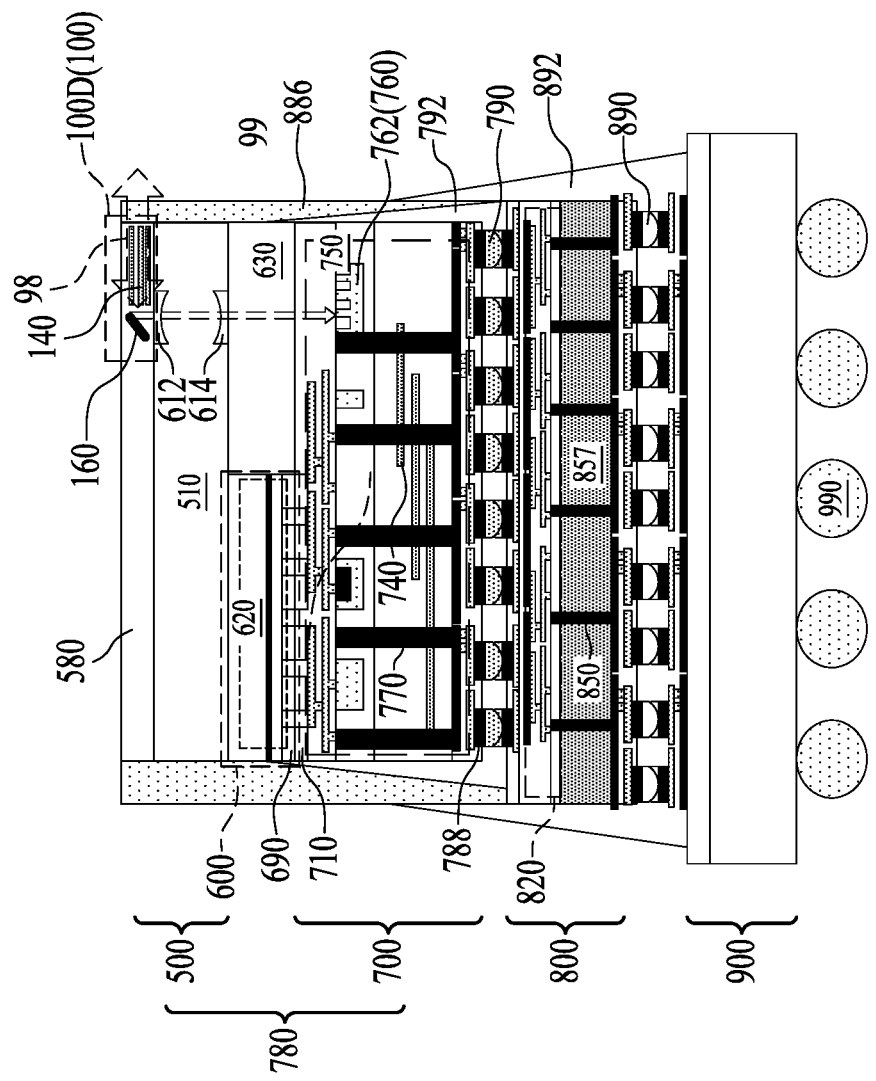
FIG. 8B is a vertical cross-sectional view of an alternative configuration of the fifth embodiment structure according to an aspect of the present disclosure.

FIG. 8A is a vertical cross-sectional view of a fifth embodiment structure according to an aspect of the present disclosure. FIG. 8B is a vertical cross-sectional view of an alternative configuration of the fifth embodiment structure according to an aspect of the present disclosure.

Referring to FIGS. 8A and 8B, the fifth embodiment structure comprises an embedded optical connector unit 100D as an optical connector unit 100. The embedded optical connector unit 100D is formed within a portion of the optically transparent dielectric layer 580. The embedded optical connector unit 100D comprises a first connector-side mirror reflector 160 and a first transition edge coupler 140 that are embedded within the optically transparent dielectric layer 580. The first connector-side mirror reflector 160 and the first transition edge coupler 140 are formed within the optically transparent dielectric layer 580 over the support semiconductor substrate 510. Thus, the embedded optical connector unit 100D is formed within the composite die 780. The first connector-side mirror reflector 160 is configured to change a beam direction between a vertically-extending beam path 99 through the composite die 780 and a horizontally-extending beam path 98 through the first transition edge coupler 140. Generally, the composite die 780 comprises a dielectric layer (such as the optically transparent dielectric layer 580) overlying a top surface of the support semiconductor substrate 510, and the optical connector unit 100 (comprising the embedded optical connector unit 100D) may be formed within the optically transparent dielectric layer 580.

Figure 9A:
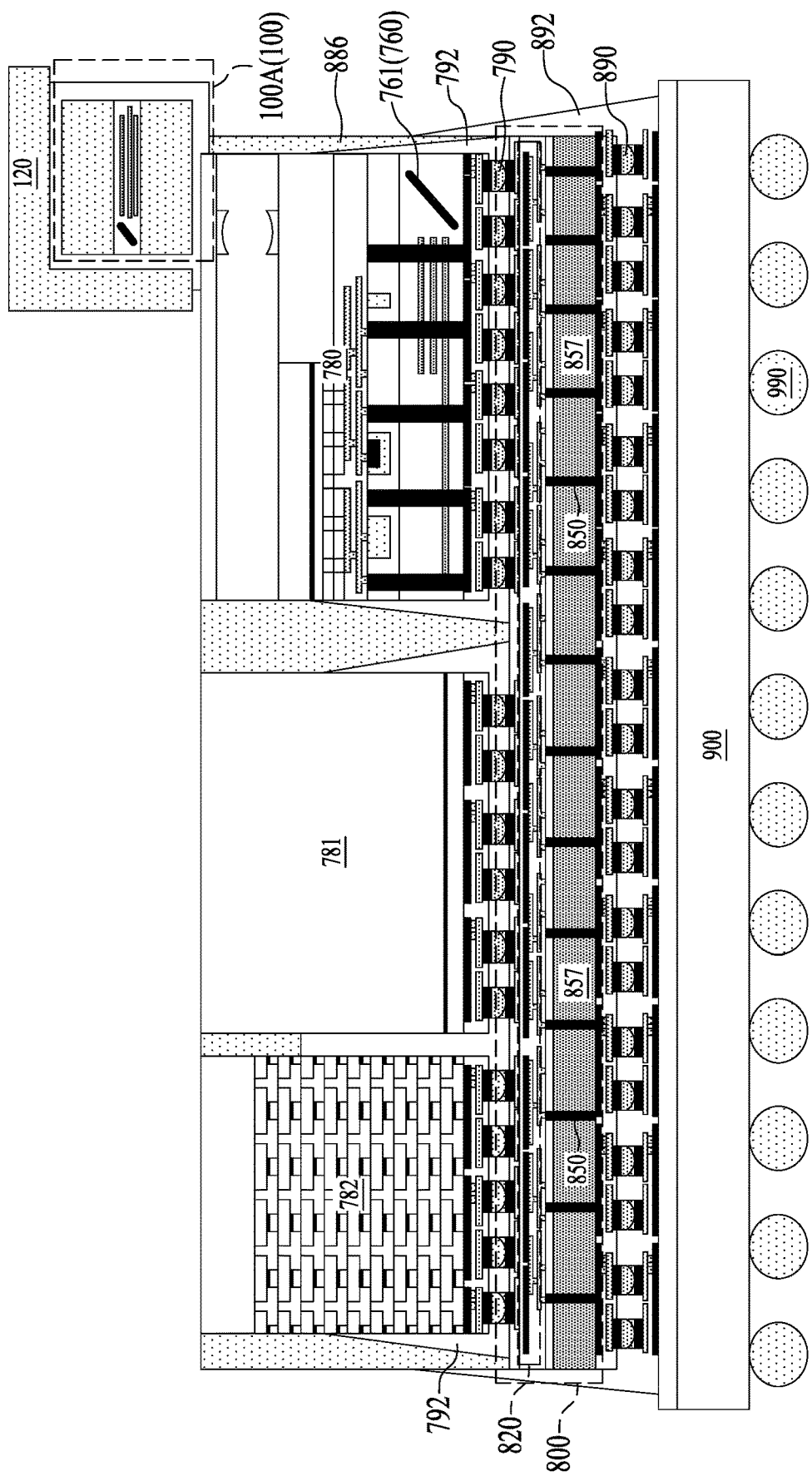
FIGS. 9A-9X are vertical cross-sectional views of various configurations of a sixth embodiment structure according to an aspect of the present disclosure.
Figure 9B:
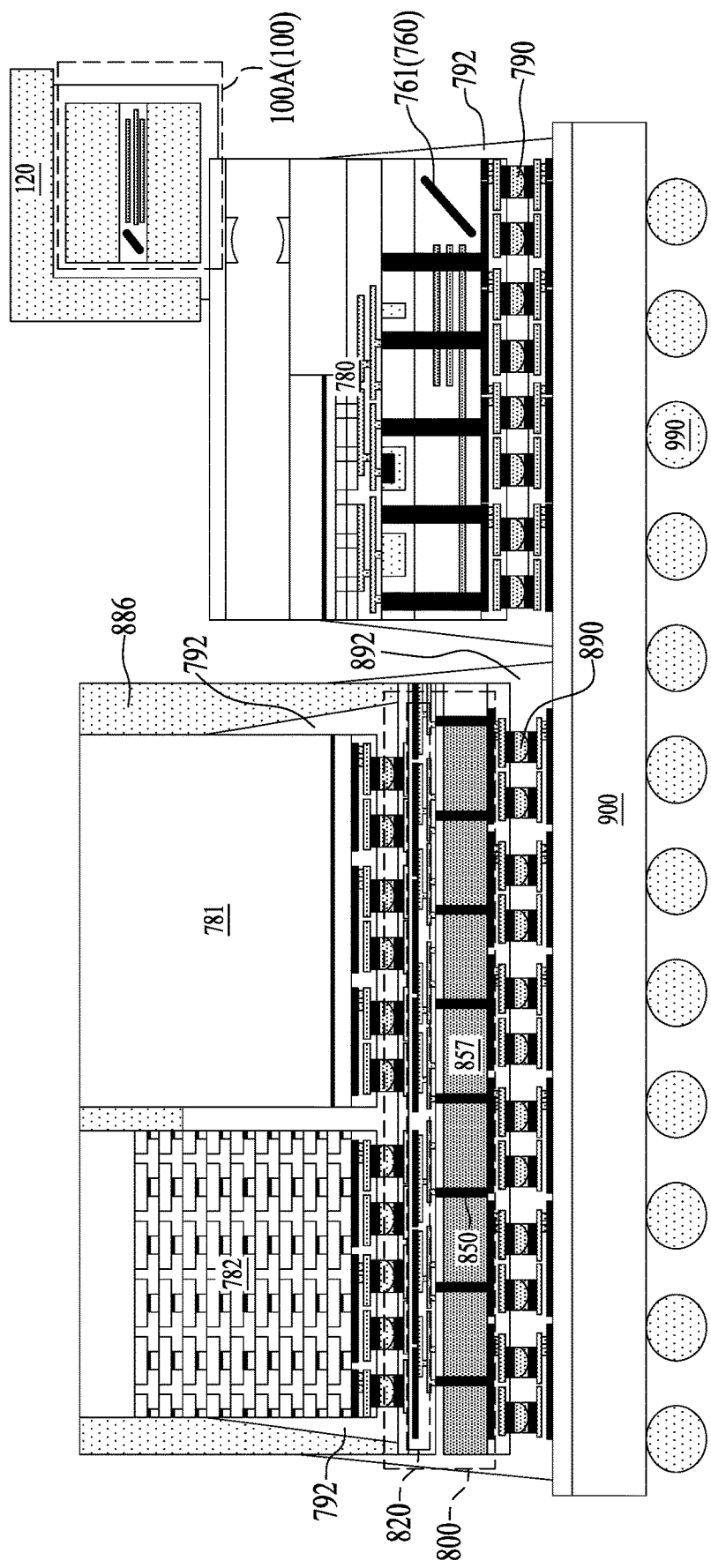
Figure 9C:
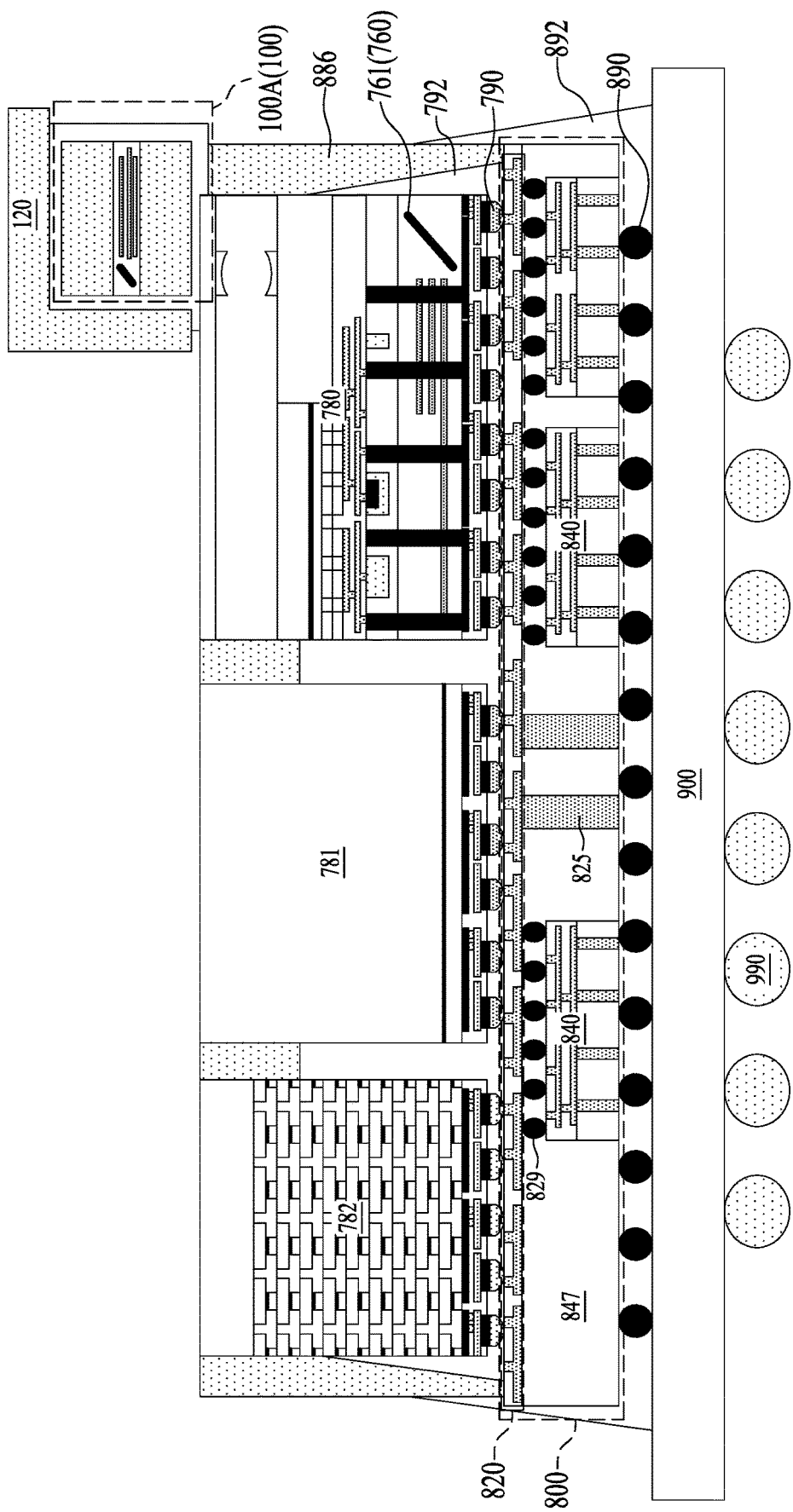
Figure 9D:
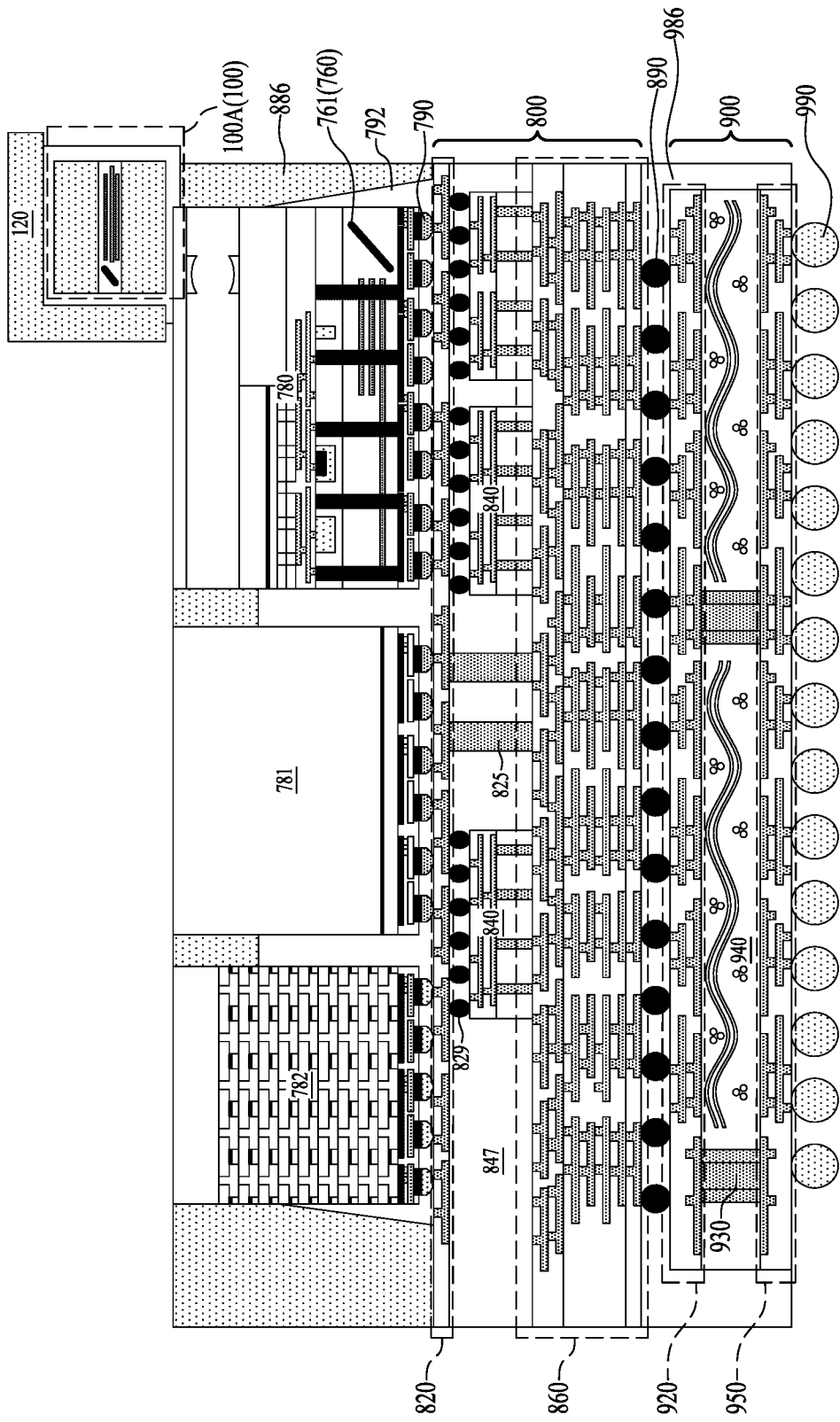
Figure 9E:
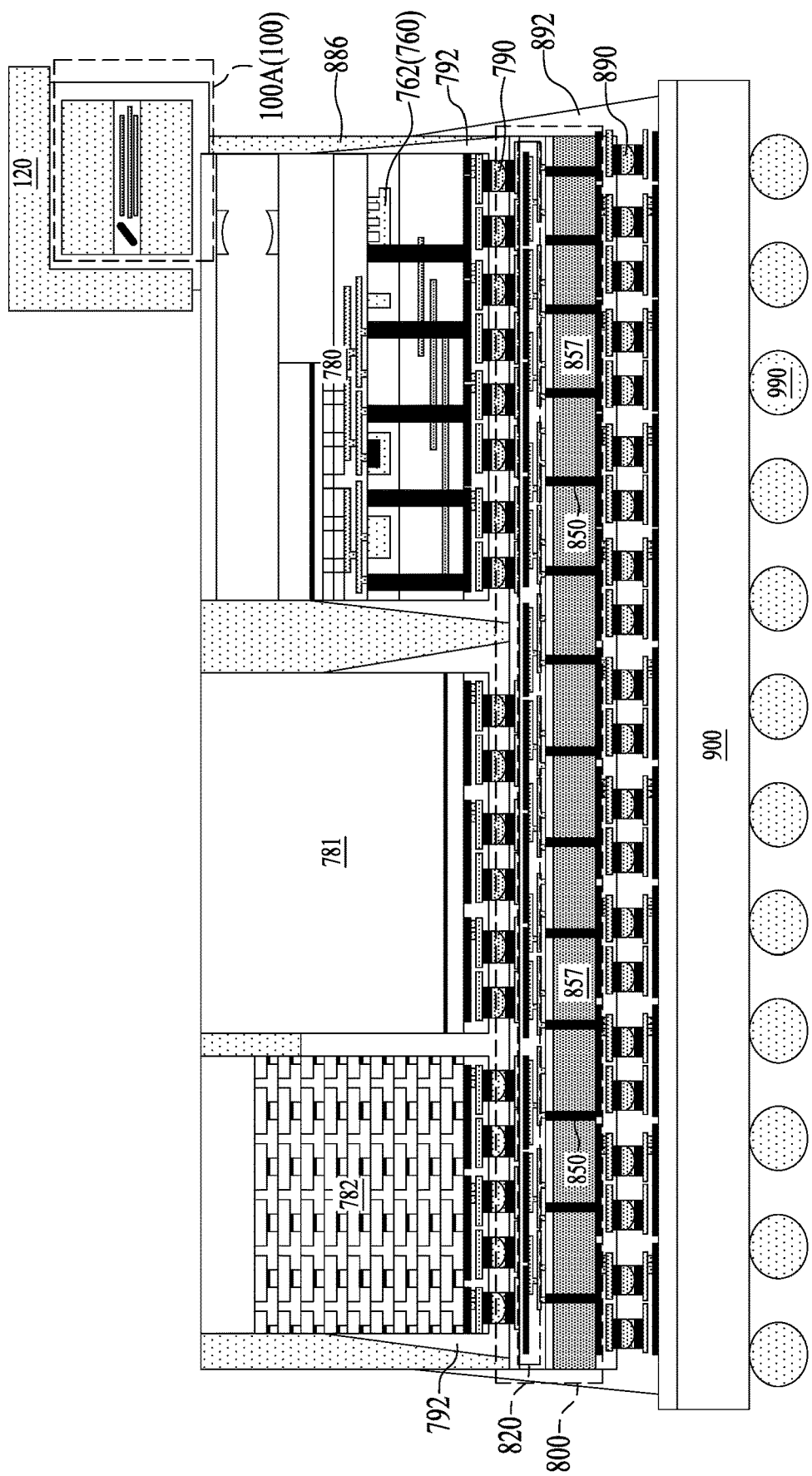
Figure 9F:
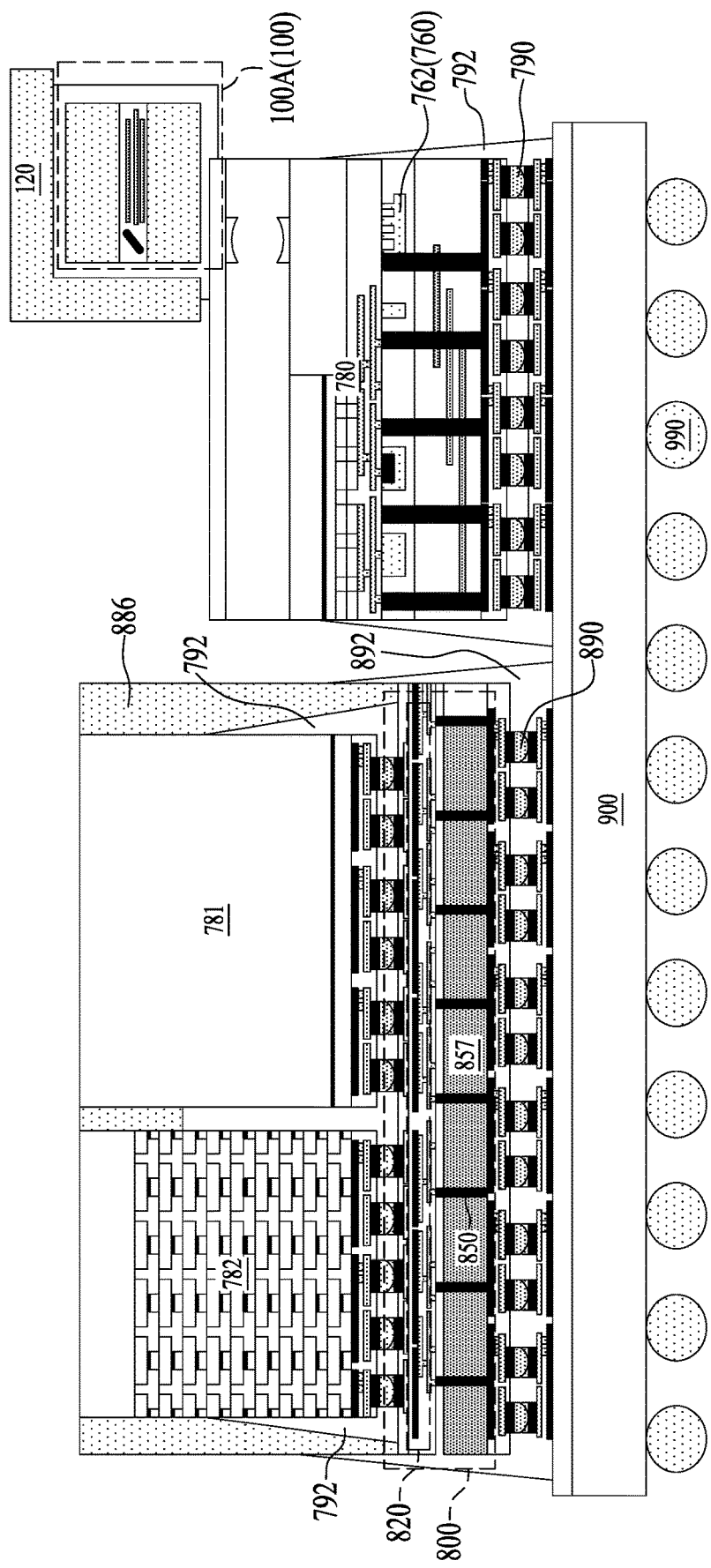
Figure 9G:
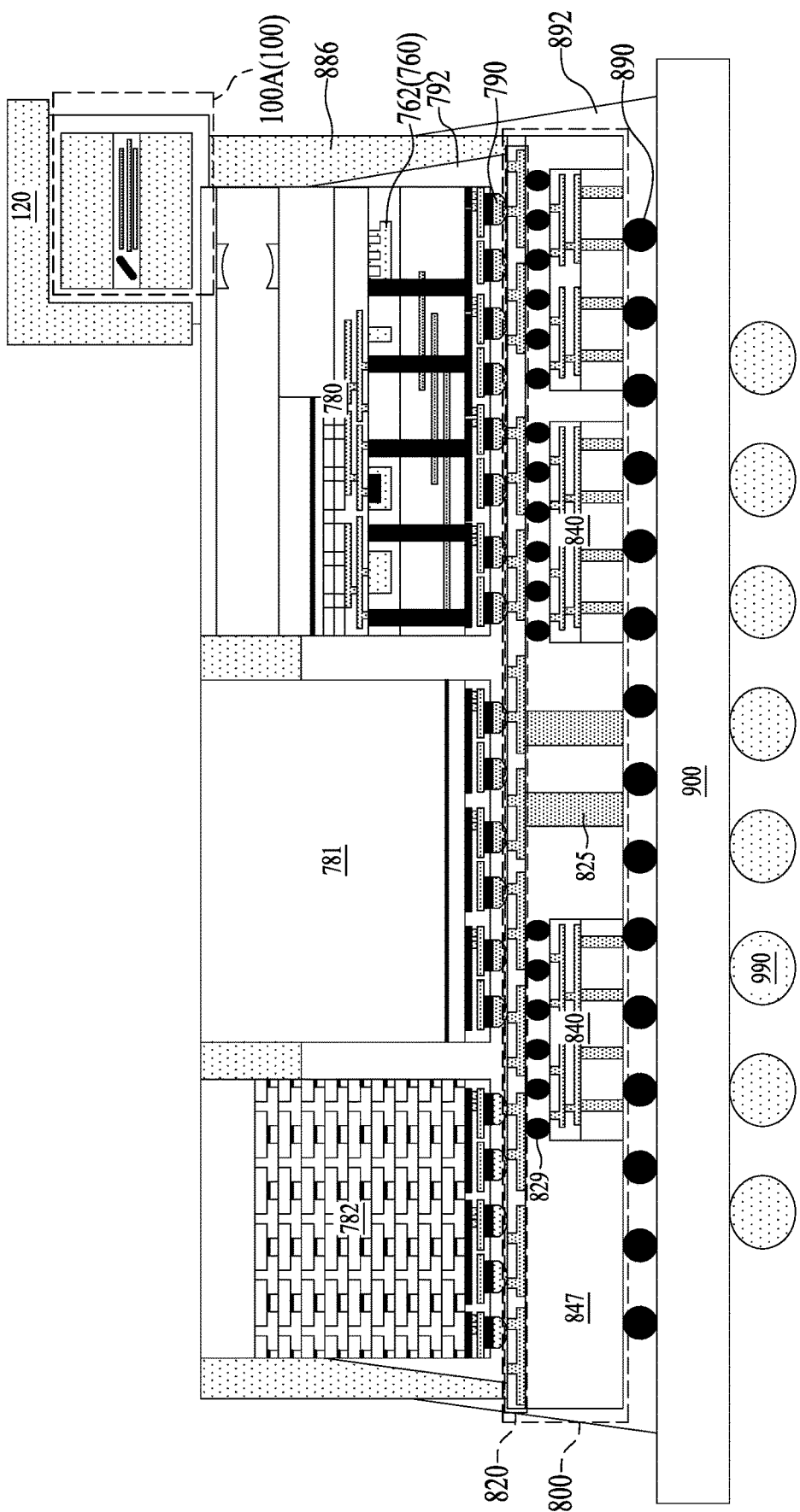
Figure 9H:
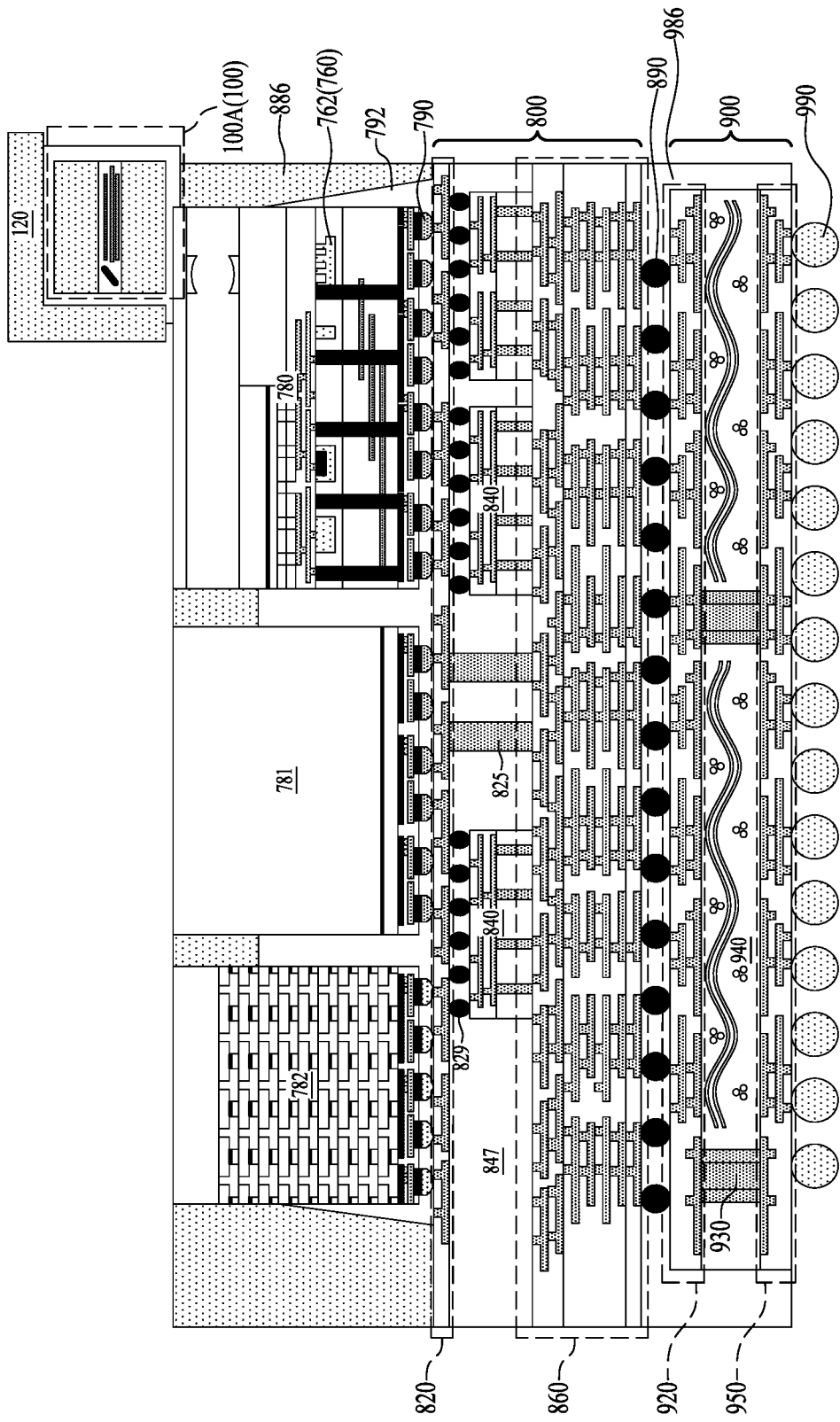
Figure 9I:
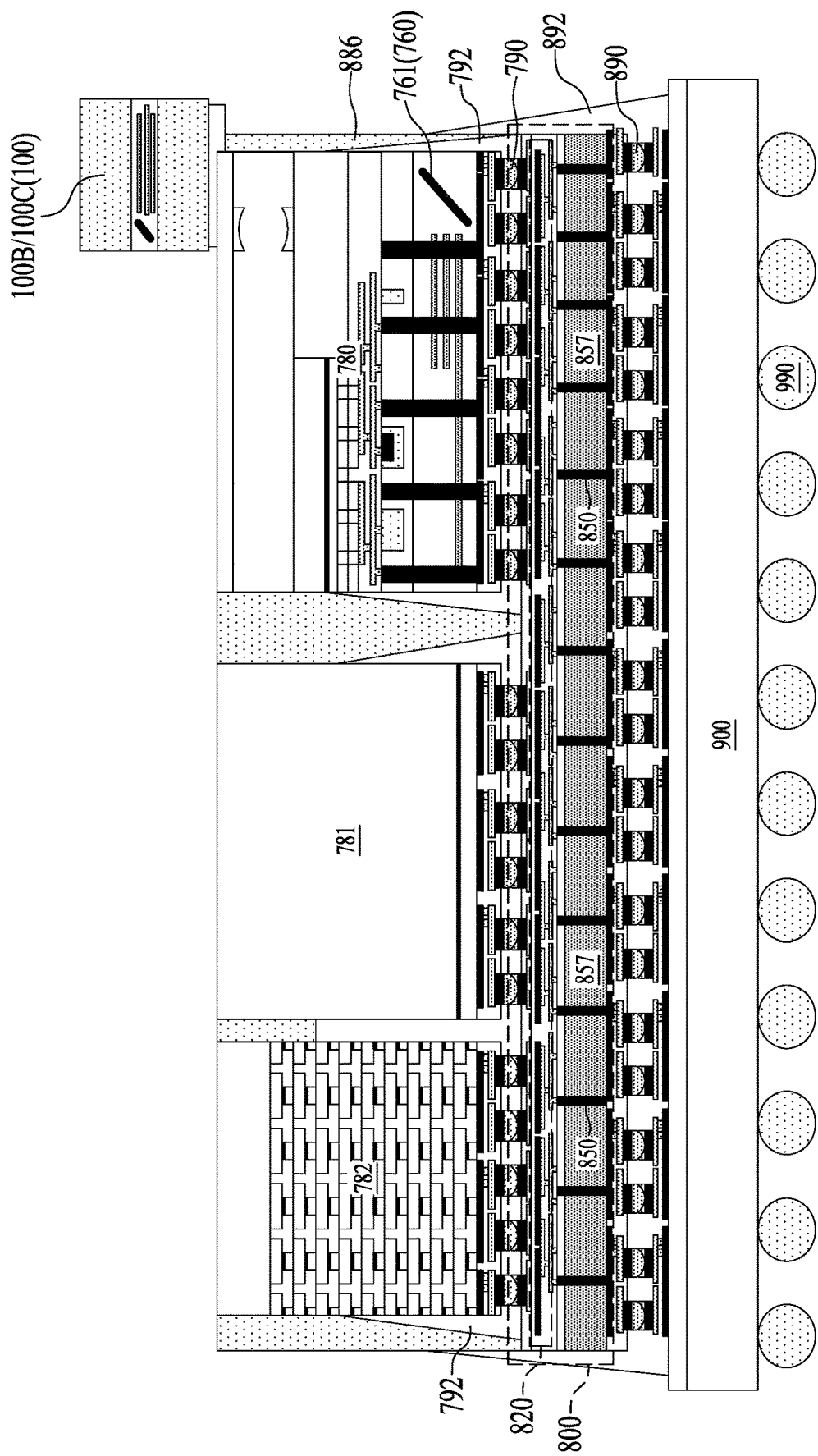
Figure 9J:
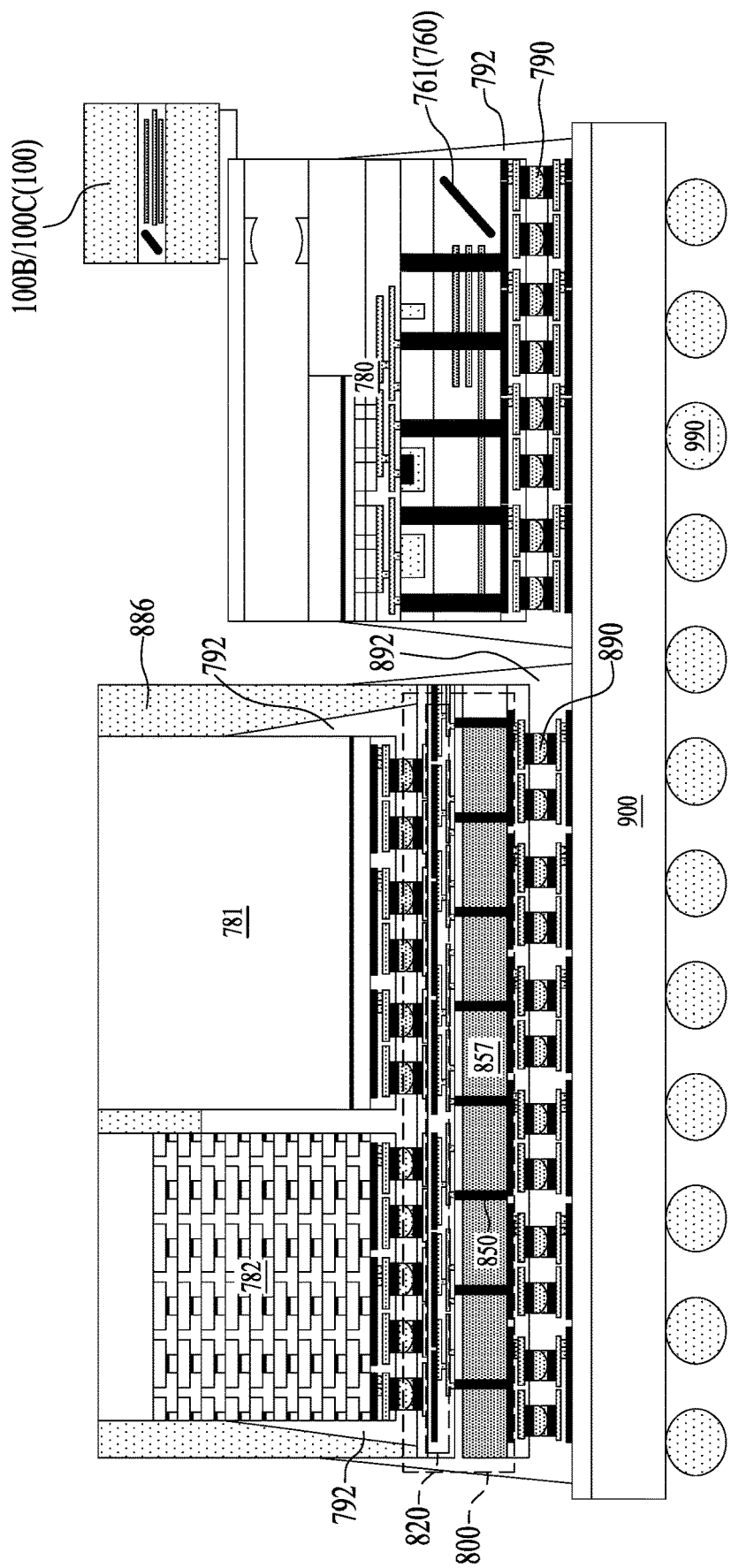
Figure 9K:
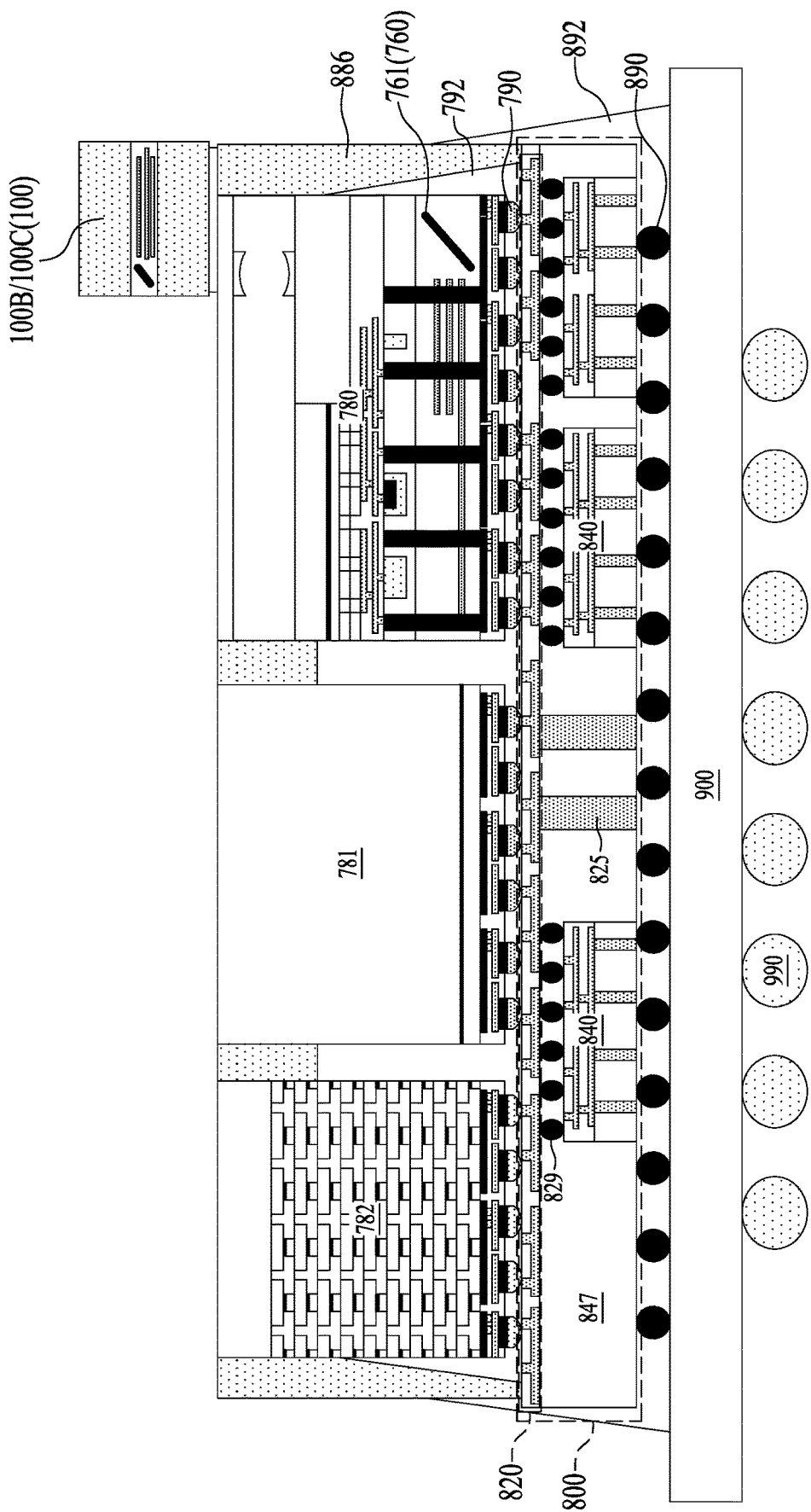
Figure 9L:
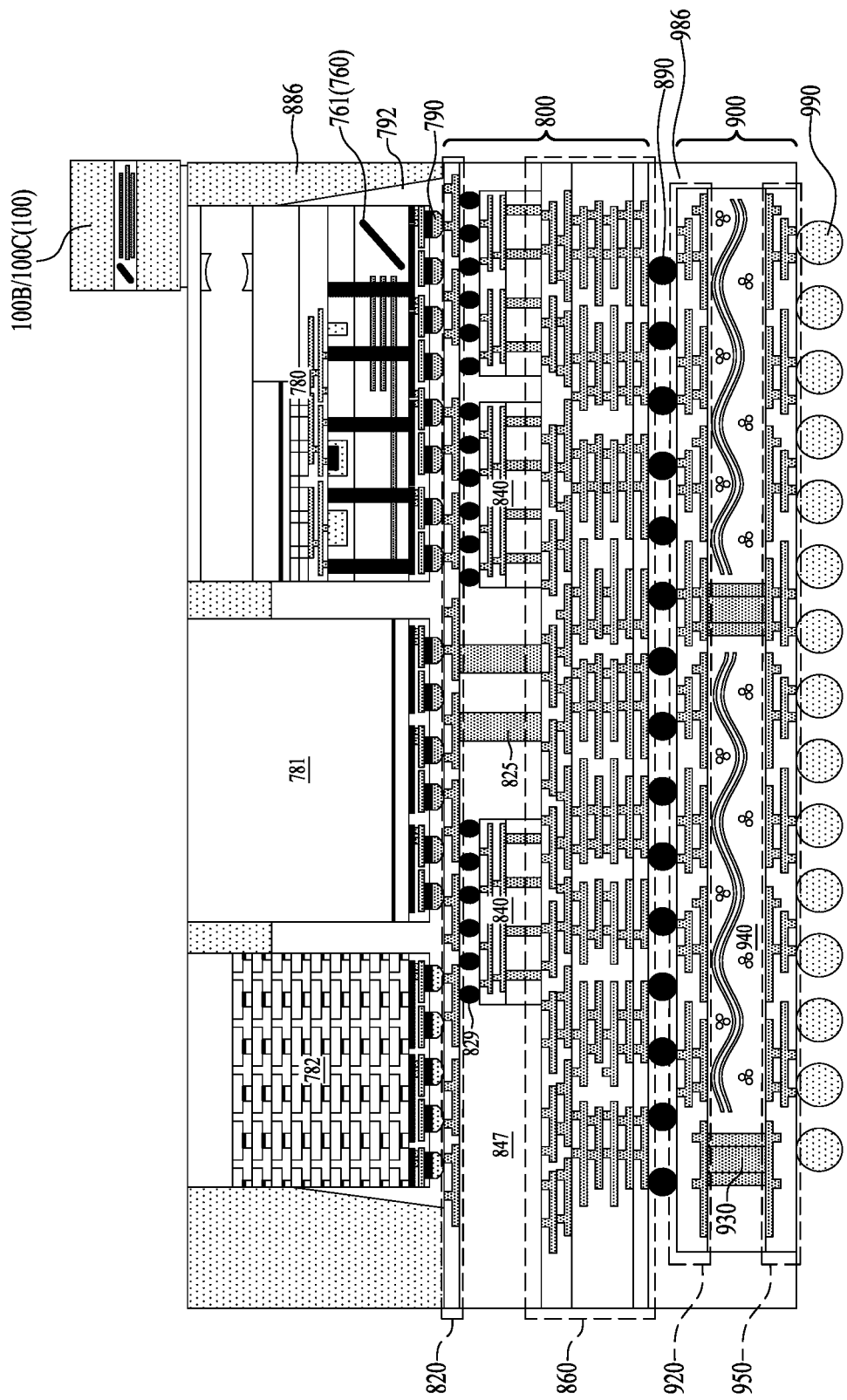
Figure 9M:
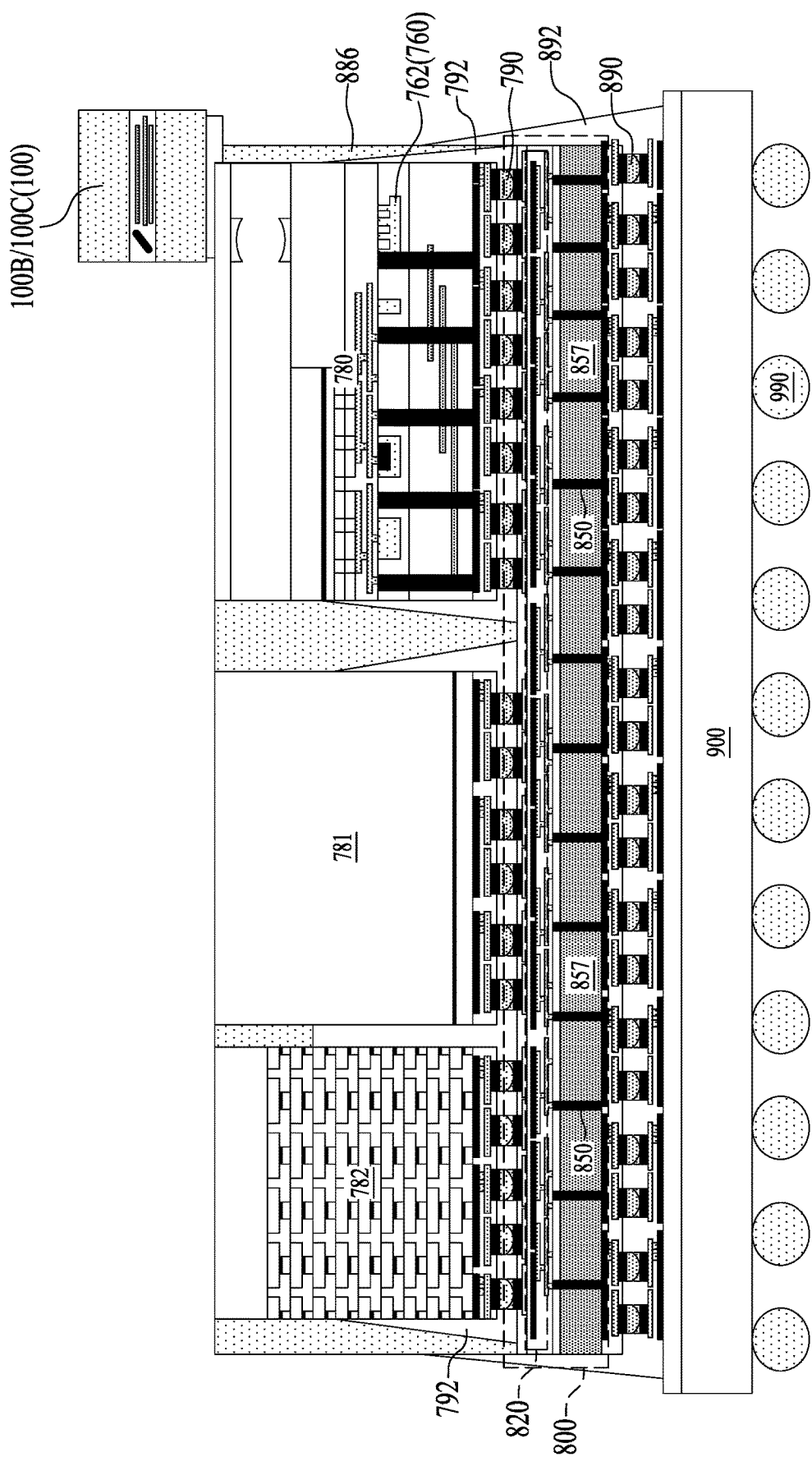
Figure 9N:
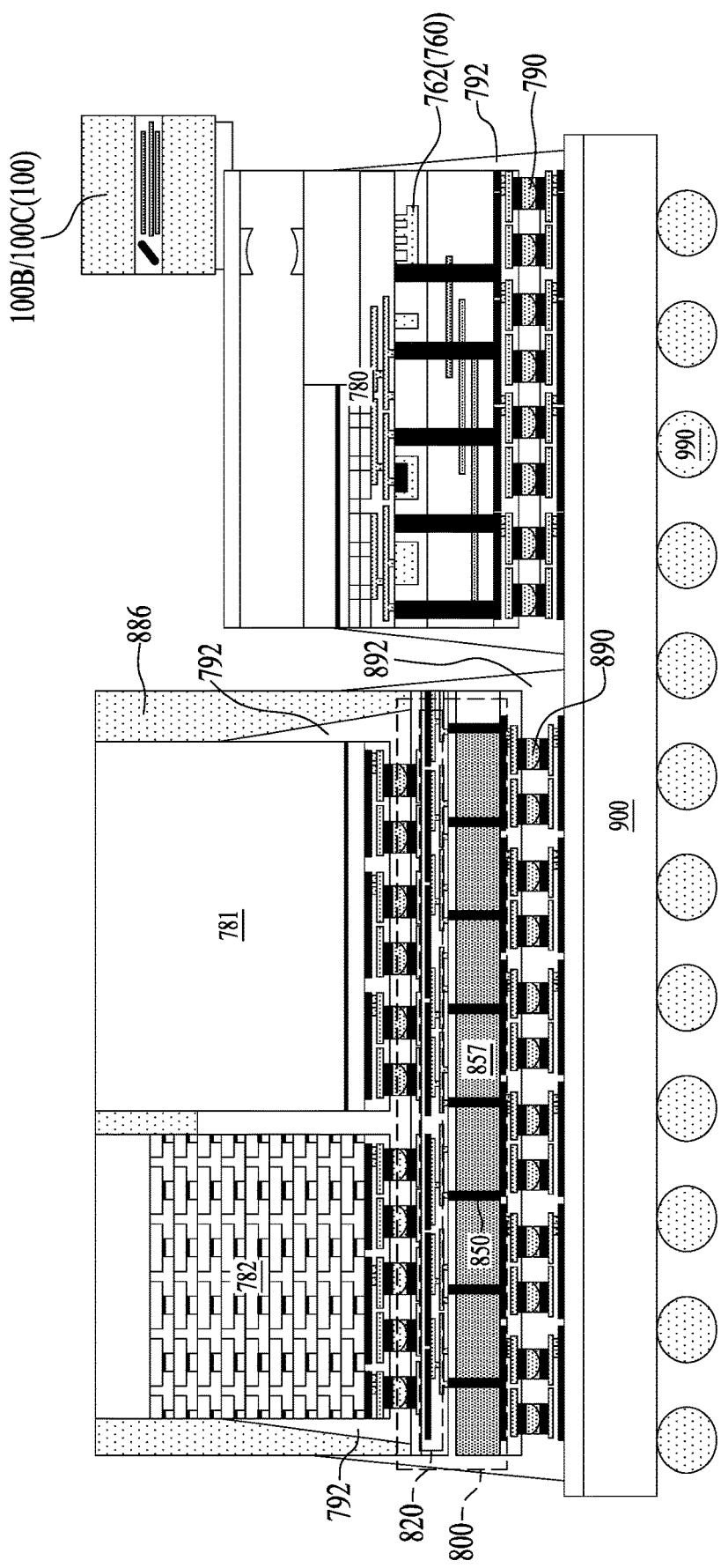
Figure 9O:
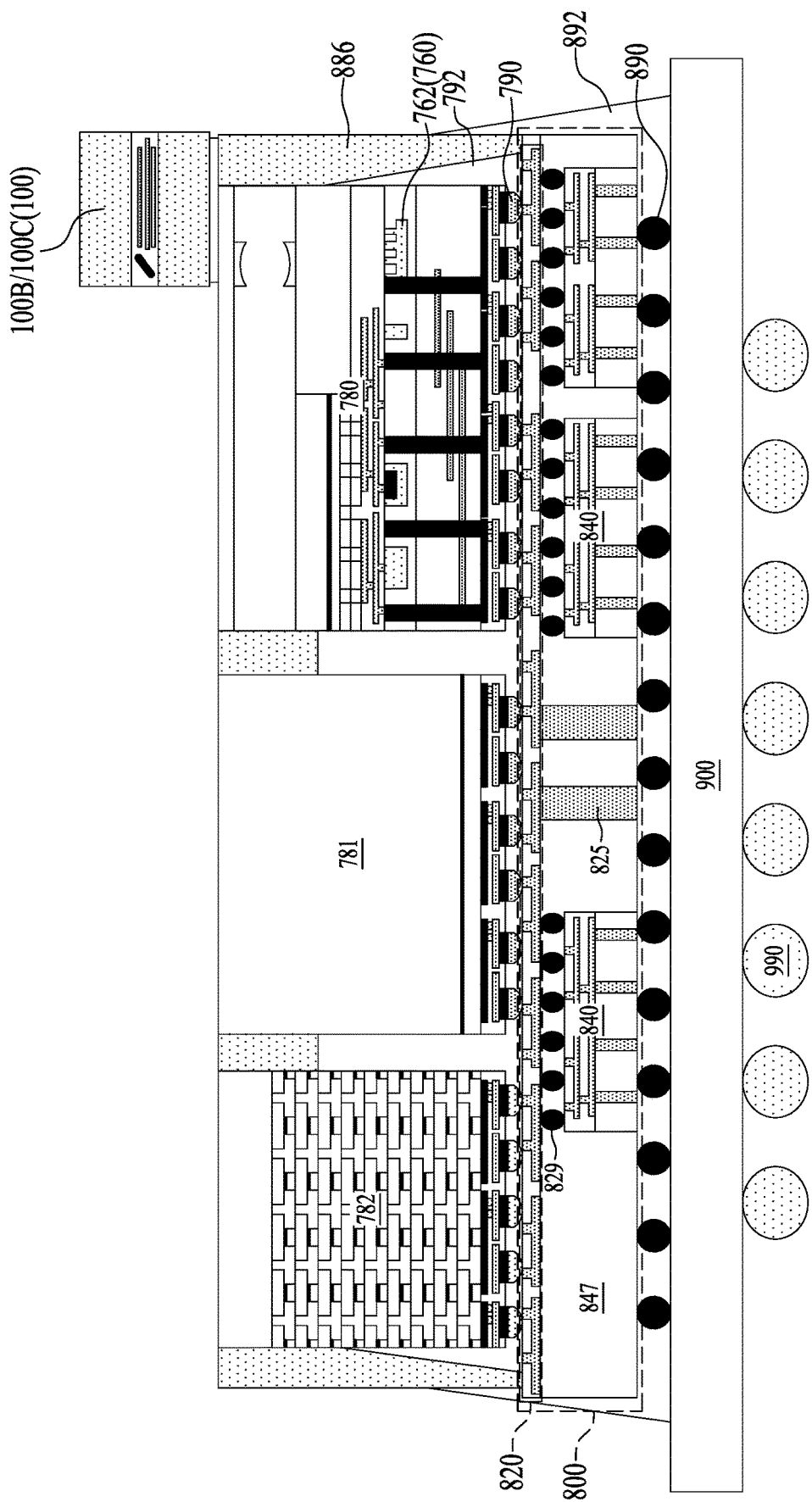
Figure 9P:
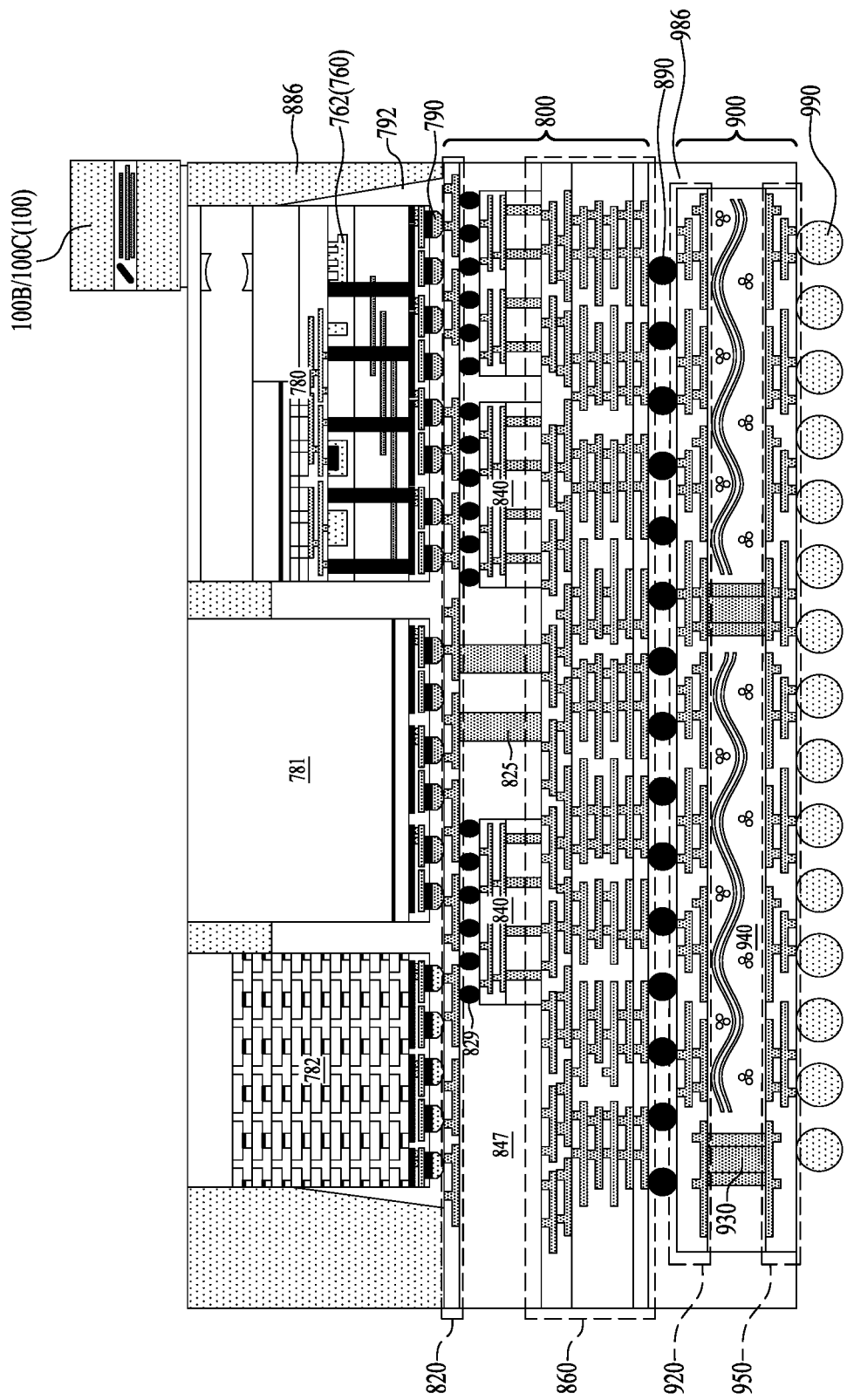
Figure 9Q:
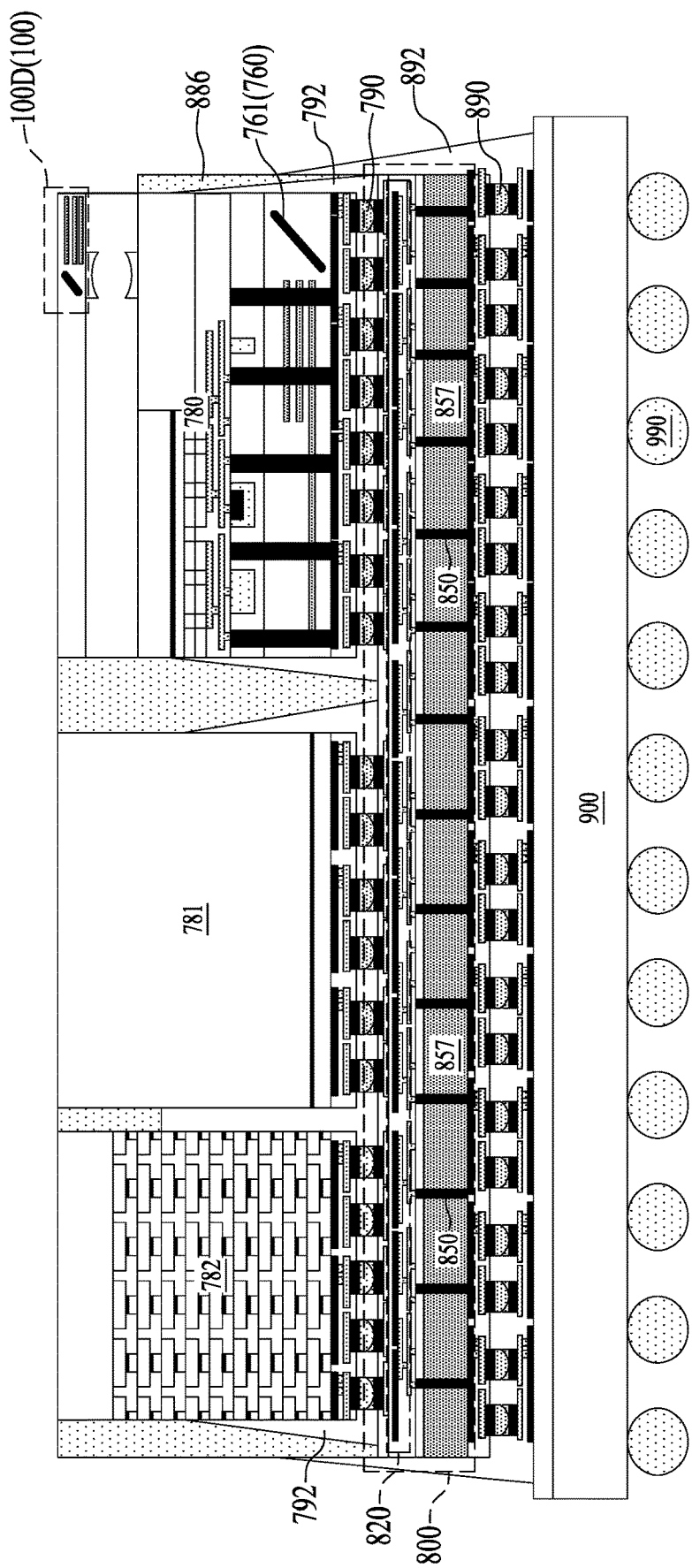
Figure 9R:
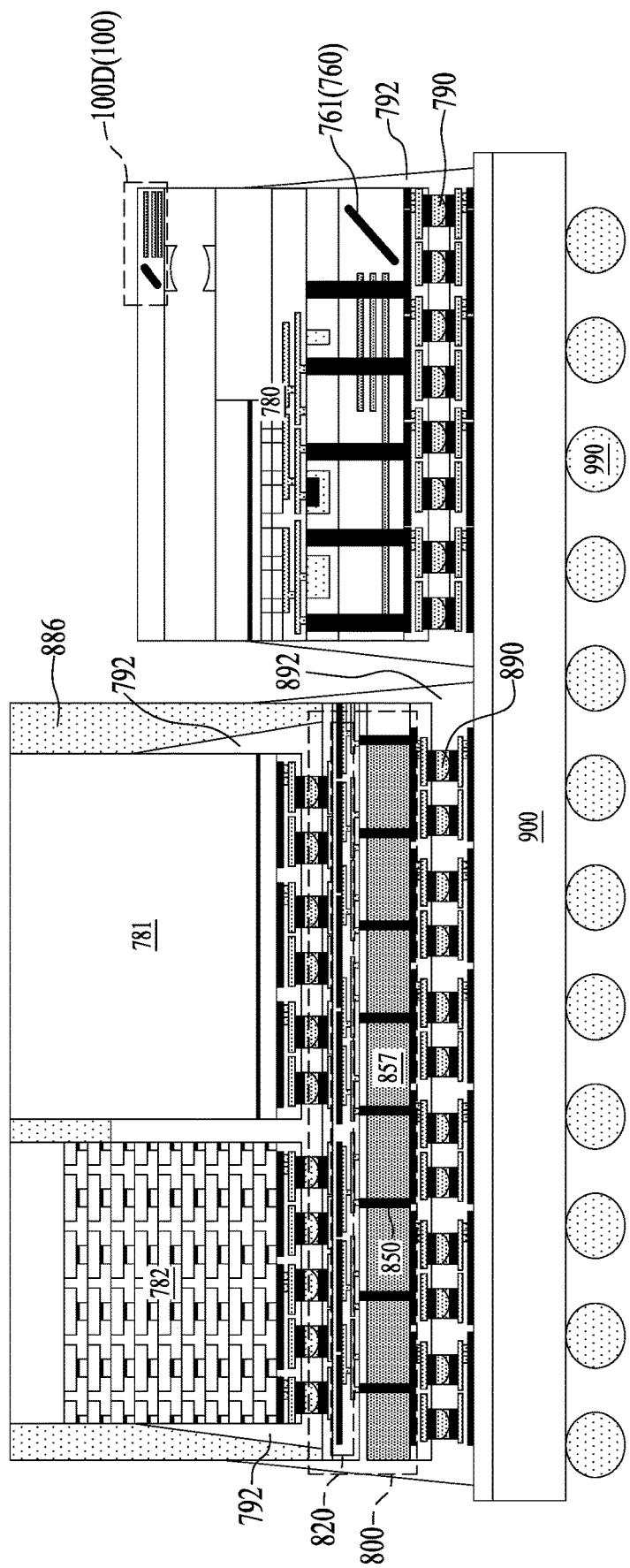
Figure 9S:
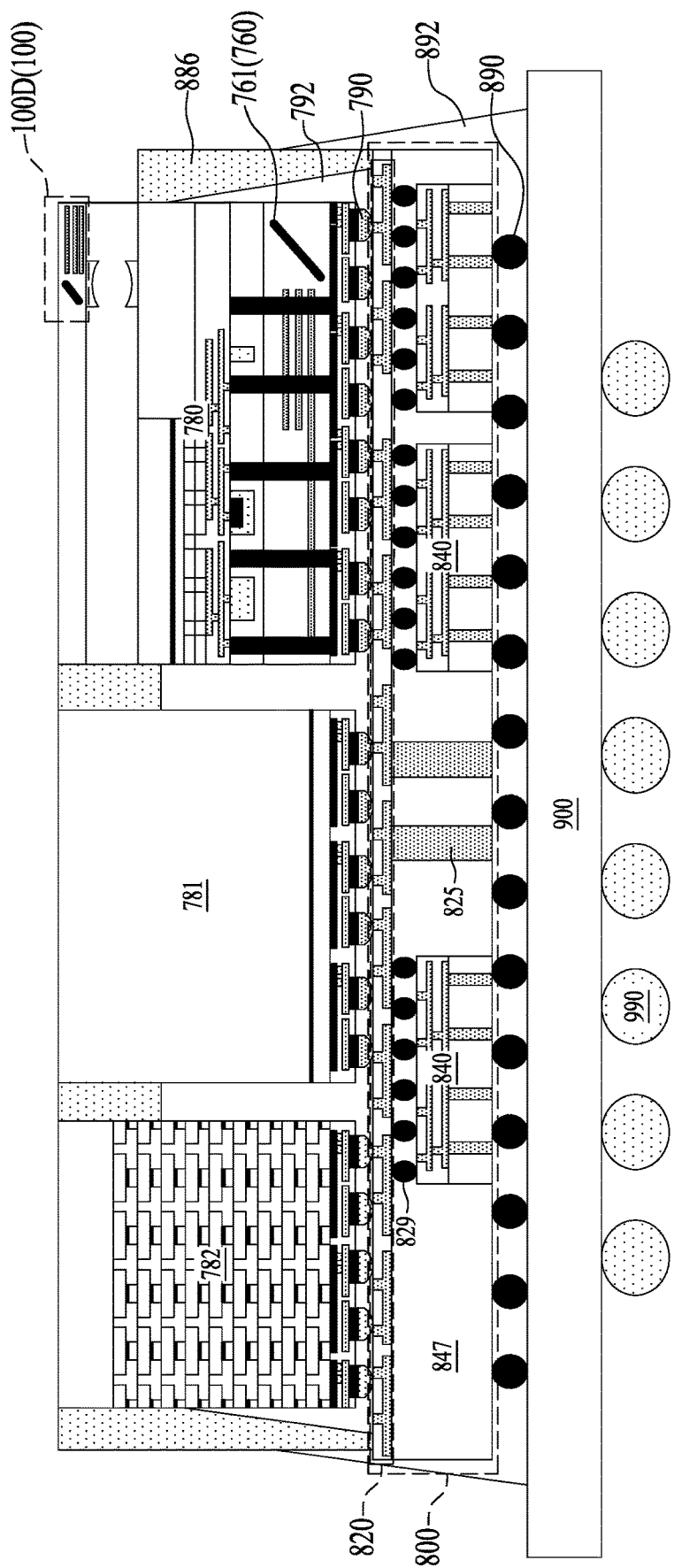
Figure 9T:
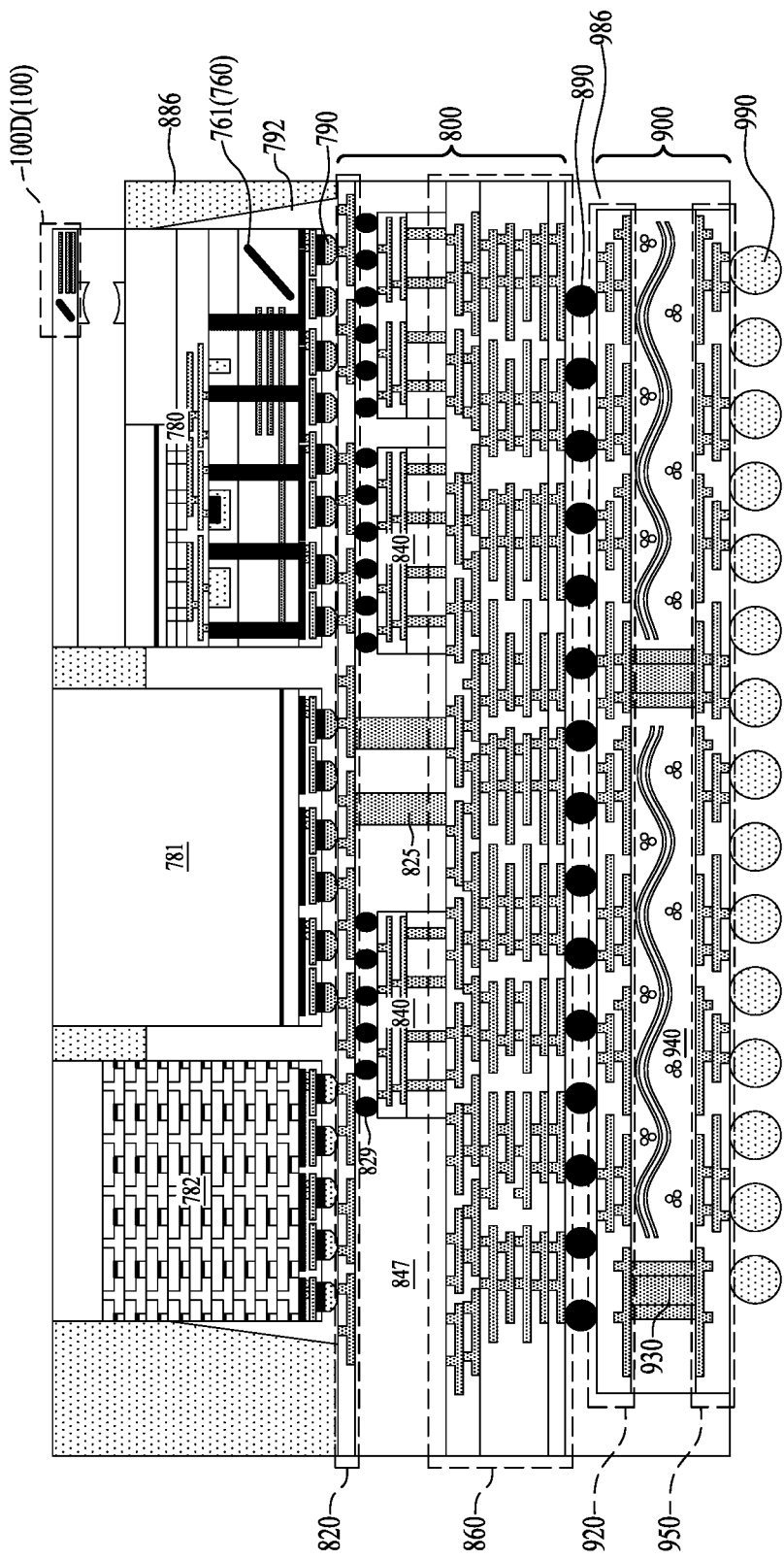
Figure 9U:
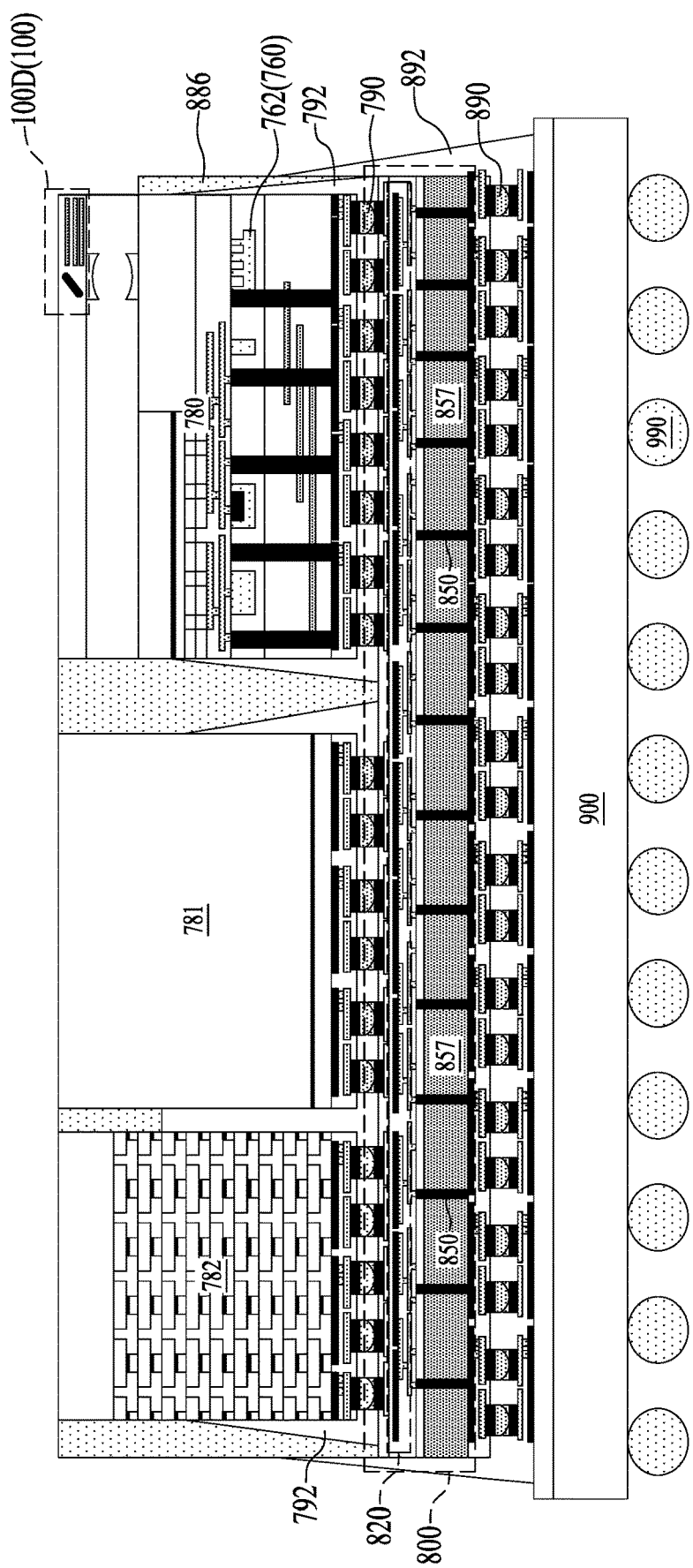
Figure 9V:
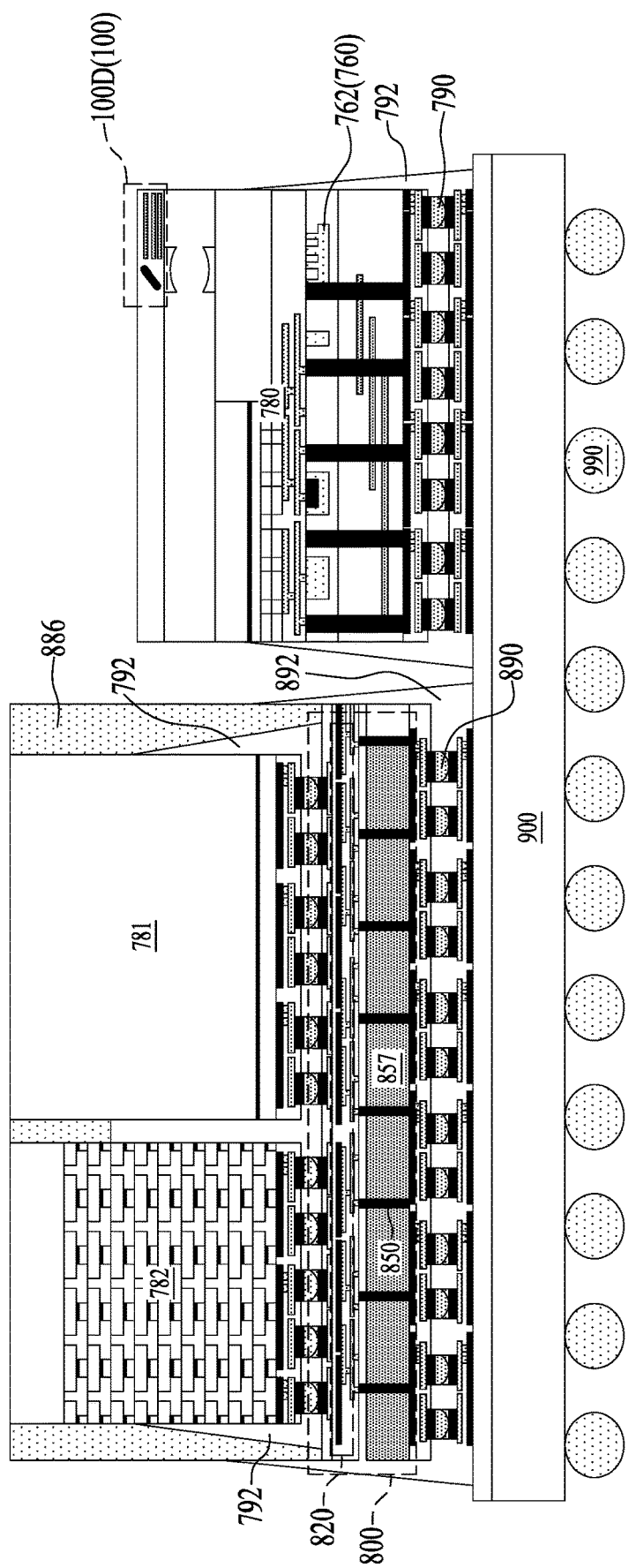
Figure 9W:
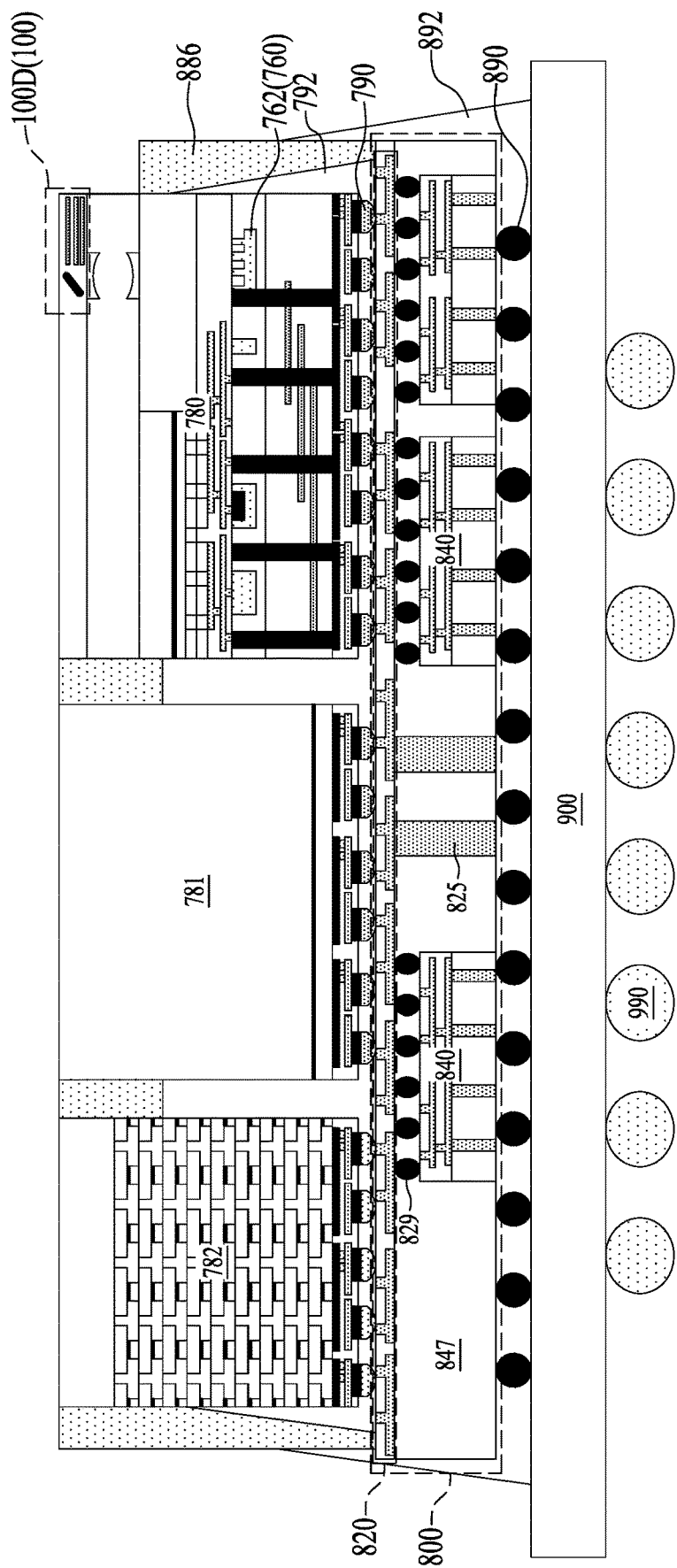
Figure 9X:
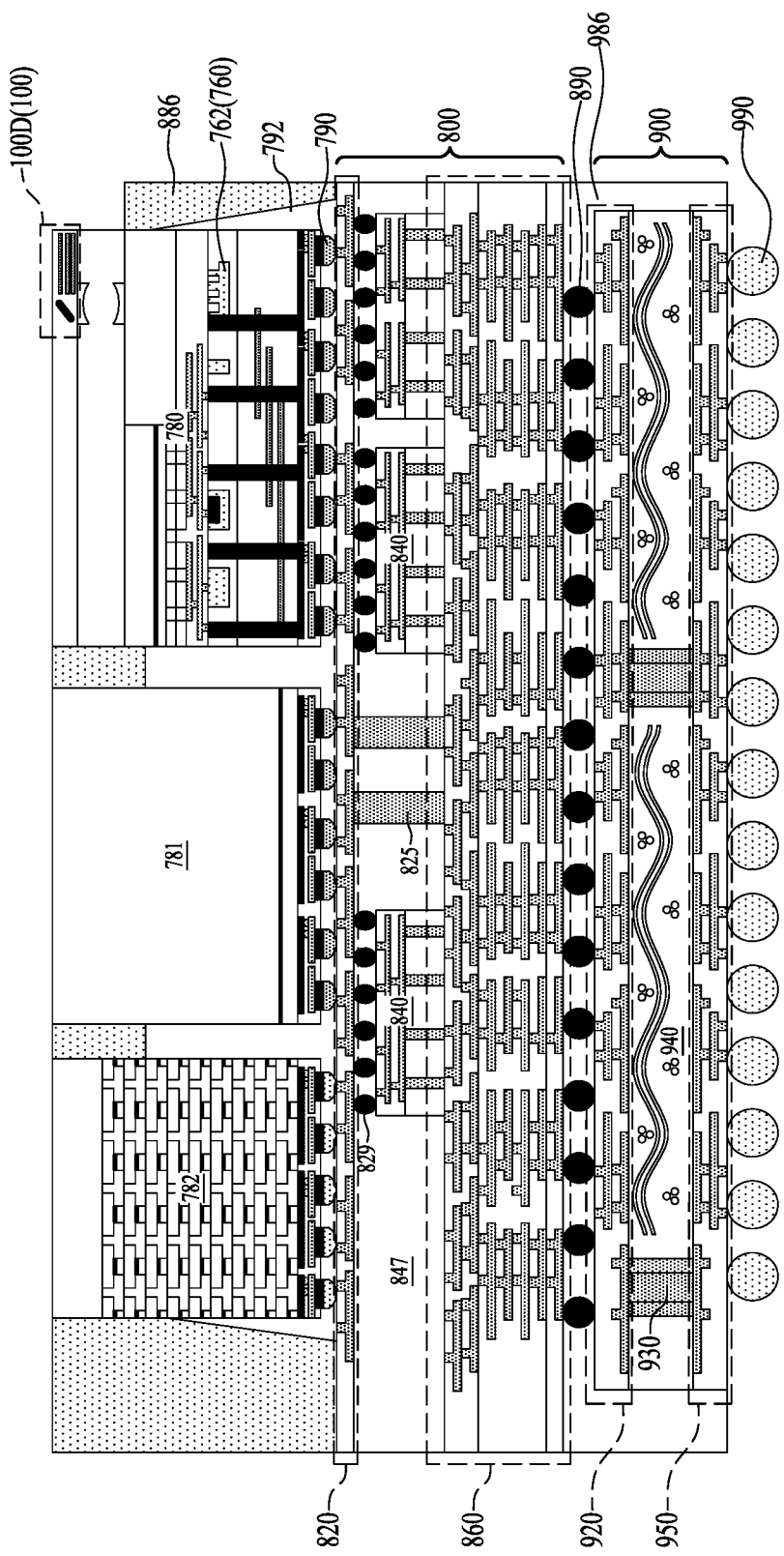

FIGS. 9A-9X are vertical cross-sectional views of various configurations of a sixth embodiment structure according to an aspect of the present disclosure.

Referring to FIG. 9A, a first configuration of the sixth embodiment structure may be derived from the first embodiment structure illustrated in FIGS. 1A-1E by using an interposer 800 having a greater lateral extent than the composite die 780, and by attaching additional semiconductor dies (781, 782) such as an application-specific integrated circuit (ASIC) die 781 and a memory die 782 to the interposer 800 through additional arrays of first solder material portions 790. In one embodiment, an additional first underfill material portion 792 may be formed around the additional semiconductor dies (781, 782), and the molding compound die frame 886 may laterally surround the composite die 780 and the additional semiconductor dies (781, 782). Sidewalls of the molding compound die frame 886 may be vertically coincident with sidewalls of the interposer 800. The optical connector unit 100 may be attached to the composite die 780 prior to, or after, attaching the solder joints 990 to the packaging substrate 900. The optical connector unit 100 may be attached to the composite die 780 prior to, or after, attaching solder joints 990 to the packaging substrate 900.

Referring to FIG. 9B, a second configuration of the sixth embodiment structure may be derived form the first embodiment structure illustrated in FIGS. 1A-1E by using a packaging substrate 900 having a greater lateral extent than the composite die 780, by attaching the composite die 780 to the packaging substrate 900 by using an array of first solder material portions 790, and by forming a first underfill material portion around the array of first solder material portions 790. Additional semiconductor dies (781, 782) such as an application-specific integrated circuit (ASIC) die 781 and a memory die 782 may be attached to an interposer 800 through additional arrays of first solder material portions 790. In one embodiment, an additional first underfill material portion 792 may be formed around the additional semiconductor dies (781, 782), and a molding compound die frame 886 may be formed around the additional semiconductor dies (781, 782). Sidewalls of the molding compound die frame 886 may be vertically coincident with sidewalls of the interposer 800. The interposer 800 may be attached to the packaging substrate 900 through an array of second solder material portions 890. A second underfill material portion 892 may be formed around the combination of the additional semiconductor dies (781, 782), the interposer 800, and the molding compound die frame 886. The combination of the additional semiconductor dies (781, 782), the interposer 800, and the molding compound die frame 886 may be located adjacent to the composite die 780 over the packaging substrate 900. The optical connector unit 100 may be attached to the composite die 780 prior to, or after, attaching solder joints 990 to the packaging substrate 900.

Referring to FIG. 9C, a third configuration of the sixth embodiment structure may be derived from the first configuration of the sixth embodiment structure illustrated in FIG. 9A by using a composite interposer including at least one embedded local interconnect die 840 as the interposer 800. In this embodiment, the interposer 800 may comprise at least one embedded local interconnect die 840 (such as silicon interconnect dies including a silicon substrate, through-substrate via structures, and metal interconnect structures embedded in dielectric material layers), through-interposer via structures 825 located adjacent to, and/or between, the at least one embedded local interconnect die 840, an interposer molding compound frame 847 embedding the at least one embedded local interconnect die 840 and the through-interposer via structures 825, and metal interconnect wiring 820 that is electrically connected to the at least one embedded local interconnect dies 840 through microbump structures 829 and eclectically connected to the through-interposer via structures 825. The composite die 780 and the additional semiconductor dies (781, 782) may be attached to the interposer 800 through a respective array of first solder material portions 790. A first underfill material portion 792 may laterally surround the arrays of first solder material portions 790. A molding compound die frame 886 may laterally surround composite die 780 and the additional semiconductor dies (781, 782). Sidewalls of the molding compound die frame 886 may be vertically coincident with sidewalls of the interposer 800. The assembly of the interposer 800, the composite die 780, the additional semiconductor dies (781, 782), and the molding compound die frame 886 may be attached to the packaging substrate 900 through an array of second solder material portions 890. A second underfill material portion 892 may laterally surround the array of second solder material portions 890. The optical connector unit 100 may be attached to the composite die 780 prior to, or after, attaching solder joints 990 to the packaging substrate 900.

Referring to FIG. 9D, a fourth configuration of the sixth embodiment structure may be derived from the third configuration of the sixth embodiment structure illustrated in FIG. 9C by using a composite interposer including additional metal interconnect wiring 860 as the interposer 800. In this embodiment, the interposer 800 may comprise at least one embedded local interconnect die 840 (such as silicon interconnect dies including a silicon substrate, through-substrate via structures, and metal interconnect structures embedded in dielectric material layers), through-interposer via structures 825 located adjacent to, and/or between, the at least one embedded local interconnect die 840, an interposer molding compound frame 847 embedding the at least one embedded local interconnect die 840 and the through-interposer via structures 825, die-side metal interconnect wiring 820 that is electrically connected to the at least one embedded local interconnect dies 840 through microbump structures 829 and eclectically connected to the through-interposer via structures 825, and package-side metal interconnect wiring 860 located on an opposite side of the die-side metal interconnect wiring 820.

The composite die 780 and the additional semiconductor dies (781, 782) may be attached to the interposer 800 through a respective array of first solder material portions 790. A first underfill material portion 792 may laterally surround the arrays of first solder material portions 790. A molding compound die frame 886 may laterally surround composite die 780 and the additional semiconductor dies (781, 782). Sidewalls of the molding compound die frame 886 may be vertically coincident with sidewalls of the interposer 800. A wafer including a two-dimensional array of interposers 800 may be provided, and a set of a composite die 780 and additional semiconductor dies (781, 782) may be attached to each interposer 800. A first underfill material portion 792 may be formed around each set of a composite die 780 and additional semiconductor dies (781, 782) that is formed over an interposer 800 within the two-dimensional array of interposer 800. A first molding compound material may be formed over the wafer including the two-dimensional array of interposer 800, and may be planarized to form a first molding compound matrix.

Packaging substrates 900 may be attached to a respective one of the interposers 800 through a respective array of second solder material portions 890. Each packaging substrate 900 may have a lesser area than the interposer 800 to which the packaging substrate 900 is attached. Each packaging substrate 900 may comprise die-side interconnection traces 920 located on a die side and board-side interconnection traces 950 located on a board side. Further, each packaging substrate 900 may comprise through-substrate via structures 930 embedded within an insulating substrate 940 and providing electrical connection between the die-side interconnection traces 920 and the board-side interconnection traces 950. A second molding compound material may be formed under the wafer including the two-dimensional array of interposer 800, and may be planarized to form a second molding compound matrix.

The combination of the wafer, a two-dimensional array of sets of dies (780, 781, 782), a two-dimensional array of packaging substrates 900, the first molding compound matrix, and the second molding compound matrix may be diced along dicing channels to form photonic assemblies. Each photonic assembly comprises a composite die 780, additional semiconductor dies (781, 782), a first underfill material portion 792, a molding compound die frame 886 that is a diced portion of the first molding compound matrix, a packaging substrate 900, and a molding compound substrate frame 986 which is a diced portion of the second molding compound matrix. The optical connector unit 100 may be attached to the composite die 780 prior to, or after, attaching solder joints 990 to the packaging substrate 900.

Referring to FIG. 9E, a fifth configuration of the sixth embodiment structure may be derived from the first configuration of the sixth embodiment structure illustrated in FIG. 9A by using a PIC die 700 illustrated in FIGS. 4A-4E in lieu of the PIC die 700 illustrated in FIGS. 1A-1E. In this embodiment, a grating coupler 762 may be used in lieu of an in-die mirror 761 as the optical deflector 760 in the PIC die 700.

Referring to FIG. 9F, a sixth configuration of the sixth embodiment structure may be derived from the second configuration of the sixth embodiment structure illustrated in FIG. 9B by using a PIC die 700 illustrated in FIGS. 4A-4E in lieu of the PIC die 700 illustrated in FIGS. 1A-1E. In this embodiment, a grating coupler 762 may be used in lieu of an in-die mirror 761 as the optical deflector 760 in the PIC die 700.

Referring to FIG. 9G, a seventh configuration of the sixth embodiment structure may be derived from the third configuration of the sixth embodiment structure illustrated in FIG. 9C by using a PIC die 700 illustrated in FIGS. 4A-4E in lieu of the PIC die 700 illustrated in FIGS. 1A-1E. In this embodiment, a grating coupler 762 may be used in lieu of an in-die mirror 761 as the optical deflector 760 in the PIC die 700.

Referring to FIG. 9H, an eighth configuration of the sixth embodiment structure may be derived from the fourth configuration of the sixth embodiment structure illustrated in FIG. 9D by using a PIC die 700 illustrated in FIGS. 4A-4E in lieu of the PIC die 700 illustrated in FIGS. 1A-1E. In this embodiment, a grating coupler 762 may be used in lieu of an in-die mirror 761 as the optical deflector 760 in the PIC die 700.

Referring to FIG. 9I, a ninth configuration of the sixth embodiment structure may be derived from the first configuration of the sixth embodiment structure illustrated in FIG. 9A by using an optical connector die 100B illustrated in FIGS. 6A and 6B or by using an optical connector die 100C illustrated in FIG. 7A or 7B in lieu of an optical connector die 100A illustrated in FIGS. 1A-1E.

Referring to FIG. 9J, a tenth configuration of the sixth embodiment structure may be derived from the second configuration of the sixth embodiment structure illustrated in FIG. 9A by using an optical connector die 100B illustrated in FIGS. 6A and 6B or by using an optical connector die 100C illustrated in FIG. 7A or 7B in lieu of an optical connector die 100A illustrated in FIGS. 1A-1E.

Referring to FIG. 9K, an eleventh configuration of the sixth embodiment structure may be derived from the third configuration of the sixth embodiment structure illustrated in FIG. 9A by using an optical connector die 100B illustrated in FIGS. 6A and 6B or by using an optical connector die 100C illustrated in FIG. 7A or 7B in lieu of an optical connector die 100A illustrated in FIGS. 1A-1E.

Referring to FIG. 9L, a twelfth configuration of the sixth embodiment structure may be derived from the fourth configuration of the sixth embodiment structure illustrated in FIG. 9A by using an optical connector die 100B illustrated in FIGS. 6A and 6B or by using an optical connector die 100C illustrated in FIG. 7A or 7B in lieu of an optical connector die 100A illustrated in FIGS. 1A-1E.

Referring to FIG. 9M, a thirteenth configuration of the sixth embodiment structure may be derived from the fifth configuration of the sixth embodiment structure illustrated in FIG. 9A by using an optical connector die 100B illustrated in FIGS. 6A and 6B or by using an optical connector die 100C illustrated in FIG. 7A or 7B in lieu of an optical connector die 100A illustrated in FIGS. 1A-1E.

Referring to FIG. 9N, a fourteenth configuration of the sixth embodiment structure may be derived from the sixth configuration of the sixth embodiment structure illustrated in FIG. 9A by using an optical connector die 100B illustrated in FIGS. 6A and 6B or by using an optical connector die 100C illustrated in FIG. 7A or 7B in lieu of an optical connector die 100A illustrated in FIGS. 1A-1E.

Referring to FIG. 9O, a fifteenth configuration of the sixth embodiment structure may be derived from the seventh configuration of the sixth embodiment structure illustrated in FIG. 9A by using an optical connector die 100B illustrated in FIGS. 6A and 6B or by using an optical connector die 100C illustrated in FIG. 7A or 7B in lieu of an optical connector die 100A illustrated in FIGS. 1A-1E.

Referring to FIG. 9P, a sixteenth configuration of the sixth embodiment structure may be derived from the eighth configuration of the sixth embodiment structure illustrated in FIG. 9A by using an optical connector die 100B illustrated in FIGS. 6A and 6B or by using an optical connector die 100C illustrated in FIG. 7A or 7B in lieu of an optical connector die 100A illustrated in FIGS. 1A-1E.

Referring to FIG. 9Q, a seventeenth configuration of the sixth embodiment structure may be derived from the first configuration of the sixth embodiment structure illustrated in FIG. 9A by using an embedded optical connector unit 100D illustrated in FIGS. 8A and 8B in lieu of an optical connector die 100A illustrated in FIGS. 1A-1E.

Referring to FIG. 9R, an eighteenth configuration of the sixth embodiment structure may be derived from the second configuration of the sixth embodiment structure illustrated in FIG. 9A by using an embedded optical connector unit 100D illustrated in FIGS. 8A and 8B in lieu of an optical connector die 100A illustrated in FIGS. 1A-1E.

Referring to FIG. 9S, a nineteenth configuration of the sixth embodiment structure may be derived from the third configuration of the sixth embodiment structure illustrated in FIG. 9A by using an embedded optical connector unit 100D illustrated in FIGS. 8A and 8B in lieu of an optical connector die 100A illustrated in FIGS. 1A-1E.

Referring to FIG. 9T, a twentieth configuration of the sixth embodiment structure may be derived from the fourth configuration of the sixth embodiment structure illustrated in FIG. 9A by using an embedded optical connector unit 100D illustrated in FIGS. 8A and 8B in lieu of an optical connector die 100A illustrated in FIGS. 1A-1E.

Referring to FIG. 9U, a twenty-first configuration of the sixth embodiment structure may be derived from the fifth configuration of the sixth embodiment structure illustrated in FIG. 9A by using an embedded optical connector unit 100D illustrated in FIGS. 8A and 8B in lieu of an optical connector die 100A illustrated in FIGS. 1A-1E.

Referring to FIG. 9V, a twenty-second configuration of the sixth embodiment structure may be derived from the sixth configuration of the sixth embodiment structure illustrated in FIG. 9A by using an embedded optical connector unit 100D illustrated in FIGS. 8A and 8B in lieu of an optical connector die 100A illustrated in FIGS. 1A-1E.

Referring to FIG. 9W, a twenty-third configuration of the sixth embodiment structure may be derived from the seventh configuration of the sixth embodiment structure illustrated in FIG. 9A by using an embedded optical connector unit 100D illustrated in FIGS. 8A and 8B in lieu of an optical connector die 100A illustrated in FIGS. 1A-1E.

Referring to FIG. 9X, a twenty-fourth configuration of the sixth embodiment structure may be derived from the eighth configuration of the sixth embodiment structure illustrated in FIG. 9A by using an embedded optical connector unit 100D illustrated in FIGS. 8A and 8B in lieu of an optical connector die 100A illustrated in FIGS. 1A-1E.

Figure 10:
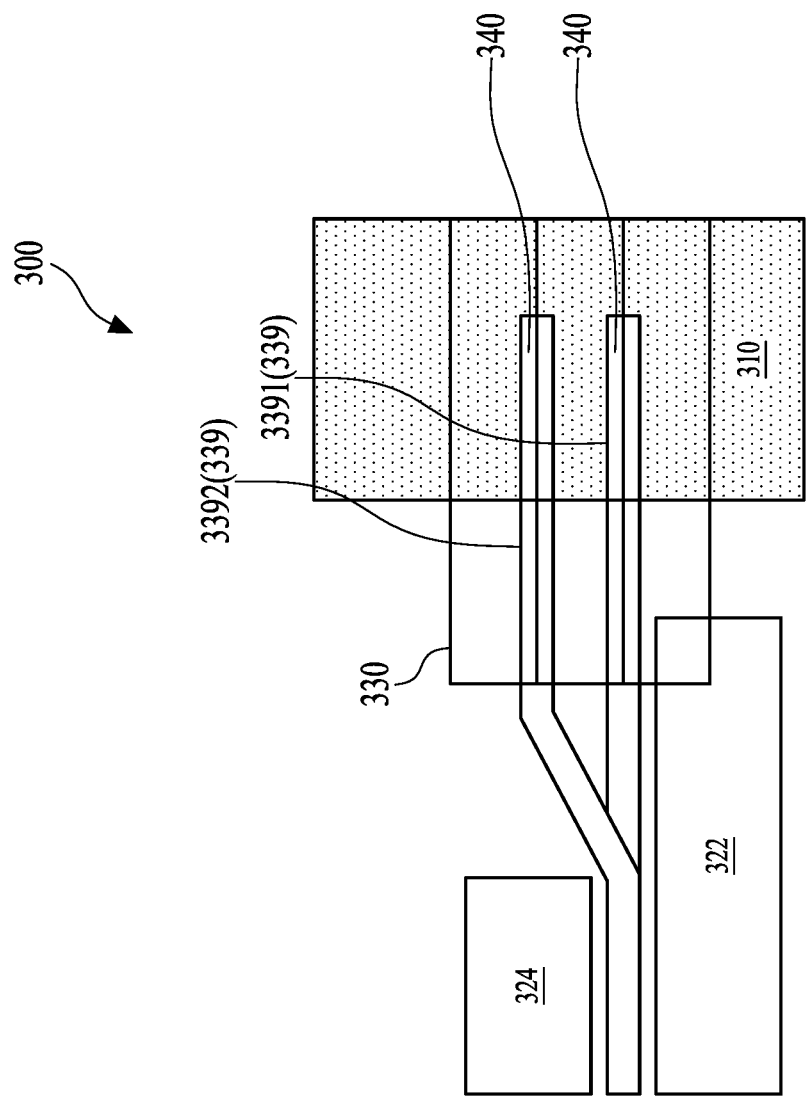
FIG. 10 is a vertical cross-sectional view of a fiber array units assembly according to an aspect of the present disclosure.

Referring to FIG. 10, a fiber array units assembly 300 according to an aspect of the present disclosure is illustrated, which may be used in conjunction with any of the embodiment structures above to provide optical coupling with an optical connector unit 100. The fiber array units assembly 300 comprises a proximal support plate 322, a distal support plate 324 overlying the proximal support plate 322 and having a lesser lateral extent than the proximal support plate 322, and optical fibers 340 located between the proximal support plate 322 and the distal support plate 324.

The spacing between the proximal support plate 322 and the distal support plate 324 may be about the same as the vertical dimension of a transition edge coupler 140 in an optical connector unit 100 described above, and may be about the same as the thickness of a dielectric matrix layer 150. The lateral dimension of the proximal support plate 322 may be in a range from 60 microns to 1 mm, such as from 120 microns to 500 microns, although lesser and greater lateral dimensions may also be used. The lateral dimension of the distal support plate 324 may be in a range from 30 microns to 500 microns, such as from 60 microns to 250 microns, although lesser and greater lateral dimensions may also be used.

In one embodiment, the proximal support plate 322 may comprise a stiff material such as a silicon. The thickness of the proximal support plate 322 may be in a range from 30 microns to 300 microns, such as from 60 microns to 150 microns, although lesser and greater thicknesses may also be used. The distal support plate 324 may comprise an optically transparent material such as silicon oxide. The thickness of the distal support plate 324 may be in a range from 10 microns to 300 microns, such as from 20 microns to 150 microns, although lesser and greater thicknesses may also be used. In some embodiments, the thickness of the distal support plate 324 may be the same as the thickness of the first spacer plate 111.

In one embodiment, the fiber array units assembly 300 comprises a fiber array matrix 310, which is a block of a rigid material including a plurality of laterally-extending cavities therein and/or therethrough. Each of the plurality of laterally-extending cavities may have a respective widthwise dimension (such as a diameter) that is the same as the diameter of an optical fiber 340, and may be configured to fit in a respective optical fiber 340. The laterally-extending cavities in the fiber array matrix 310 is herein referred to as a fiber sheath 339. The fiber sheaths 339 may be arranged as a rectangular array or as a hexagonal array including at least two vertically stacked rows of fiber sheaths 339. Each of the optical fibers 340 may comprise a respective first end that is located between the proximal support plate 322 and the distal support plate 324, and a respective second end that is fitted into a respective one of the fiber sheaths 339.

Generally, the fiber sheaths 339 may laterally surround a respective optical fibers 340, and may be laterally spaced from the proximal support plate 322 and the distal support plate 324. In one embodiment, the fiber sheaths 339 comprises first sheaths 3391 and second sheaths 3392 that are vertically spaced from each other; a first subset of the optical fibers 340 extends into the first sheaths 3391; and a second subset of the optical fibers 340 extends into the second sheaths 3392.

The fiber array units assembly 300 may further comprise a fiber cladding 330, which comprises a cladding material and laterally surrounds the portions of the optical fibers 340 that are proximal to the fiber array matrix 310. In one embodiment, the fiber cladding 330 may laterally extend between, and may be adjoined to each of, the fiber array matrix 310 and the proximal support plate 322 without contacting the distal support plate 324. Thus, the optical fibers 340 may be rigidly attached to a transition edge coupler 140 in an optical connector unit 100 during attachment to the optical connector unit 100.

FIGS. 11A-11H are vertical cross-sectional views of various configurations of a seventh embodiment structure according to an aspect of the present disclosure. Generally, the fiber array units assembly 300 illustrated in FIG. 10 may be attached to any of the optical connector units 100 described above. For example, the optical glue portion 130 may be used to attach the fiber array units assembly 300 to any of the optical connector units 100 described above. Further, in embodiments in which an encapsulation cover 120 is present over the optical connector unit 100, the encapsulation cover 120 may be laterally extended to cover the top surface of the distal support plate 324. In this embodiment, the optical glue portion 130 may be applied on the top surface of the distal support plate 324, and may be attached to a bottom surface of a laterally protruding portion of the encapsulation cover 120 through the optical glue portion 130. Generally, the height of the optical fibers 340 may be the same as the height of a transition edge coupler 140 within an optical connector unit 100 so that optical coupling between the transition edge coupler 140 and the optical fibers 340 is maximized.

Generally, a first transition edge coupler 140 may be formed within, or on, the composite die 780. The first connector-side mirror reflector 160 is configured to change a beam direction between a vertically-extending beam path 99 through the composite die 780 and a horizontally-extending beam path 98 through the first transition edge coupler 140. A fiber array units assembly 300 comprising a plurality of optical fibers 340 may be attached to the optical connector unit 100 through an optical glue portion 130. A horizontally-extending beam path 98 laterally extends into a respective optical fiber 340 within a plurality of optical fibers 340.

In some embodiments, the optical connector unit 100 comprises an optical connector die (100A, 100B, 100C) that is attached to a top surface of the composite die 780. In embodiments in which an optical connector die 100C including a plurality of transition edge couplers 140 located at different heights is used, a plurality of fiber array units assemblies 300 located at different heights may be attached to the plurality of transition edge couplers 140. Generally, the proximal support plate 322 and the distal support plate (324, 324') may be attached to the optical connector die (100A, 100B, 100C) through an optical glue portion 130, and the proximal support plate 322 laterally protrudes farther outward from the optical glue portion 130 than the distal support plate (324, 324') does from the optical glue portion 130. Alternatively, the optical connector unit 100 may be provided as an embedded optical connector unit 100D illustrated in FIGS. 8A and 8B and FIGS. 9Q-9X. In this embodiment, the fiber array units assembly 300 may be attached to a sidewall of the optically transparent dielectric layer 580 such that the optical fibers 340 are optically coupled to the transition edge coupler 140 embedded within the optically transparent dielectric layer 580.

Figure 11A:
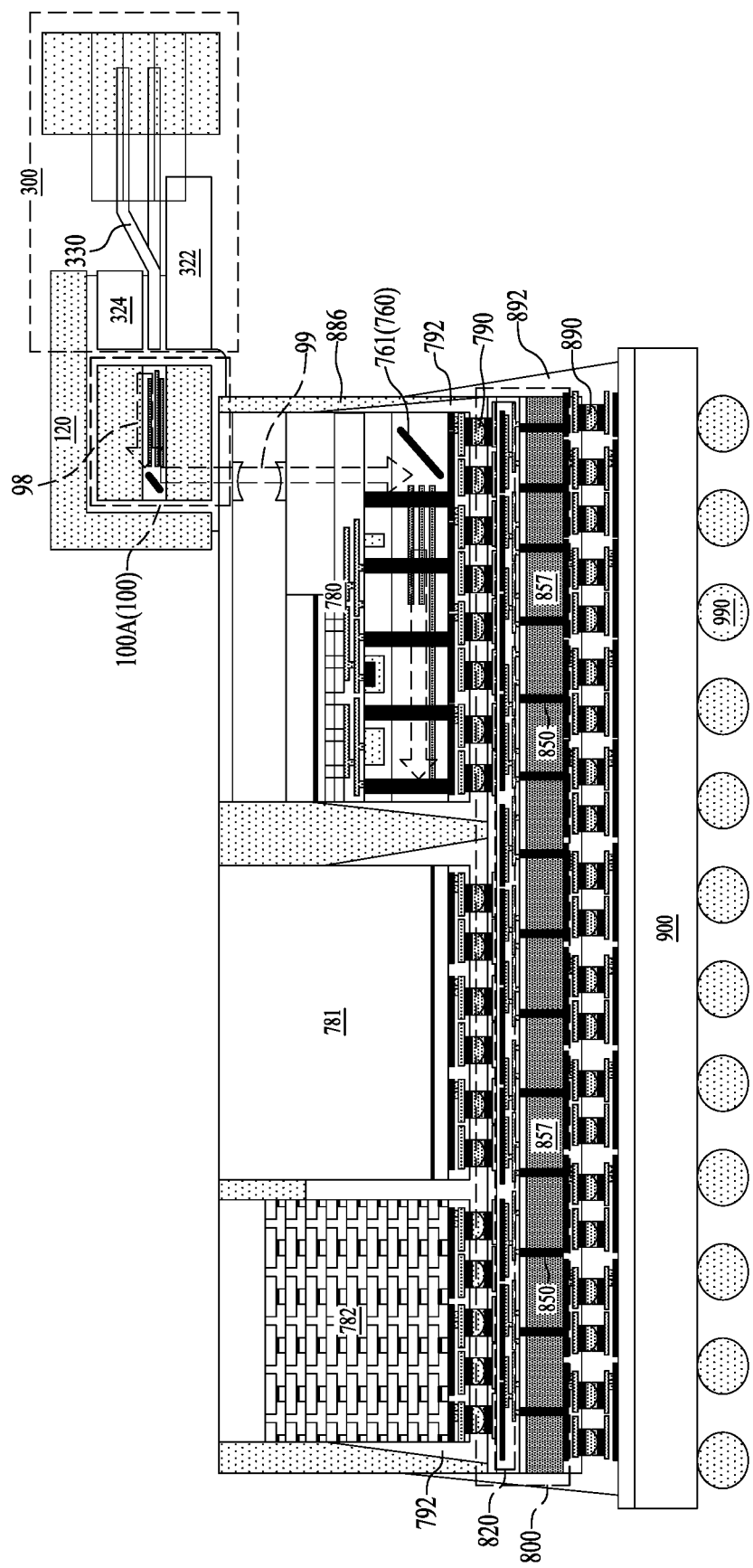
FIGS. 11A-11H are vertical cross-sectional views of various configurations of a seventh embodiment structure according to an aspect of the present disclosure.

Referring to FIG. 11A, a first configuration of the seventh embodiment structure may be derived from the first configuration of the sixth embodiment structure illustrated in FIG. 9A, the ninth configuration of the sixth embodiment structure illustrated in FIG. 9I, or the seventeenth configuration of the sixth embodiment structure illustrated in FIG. 9Q by attaching the fiber array units assembly 300 to the optical connector unit 100.

Figure 11B:
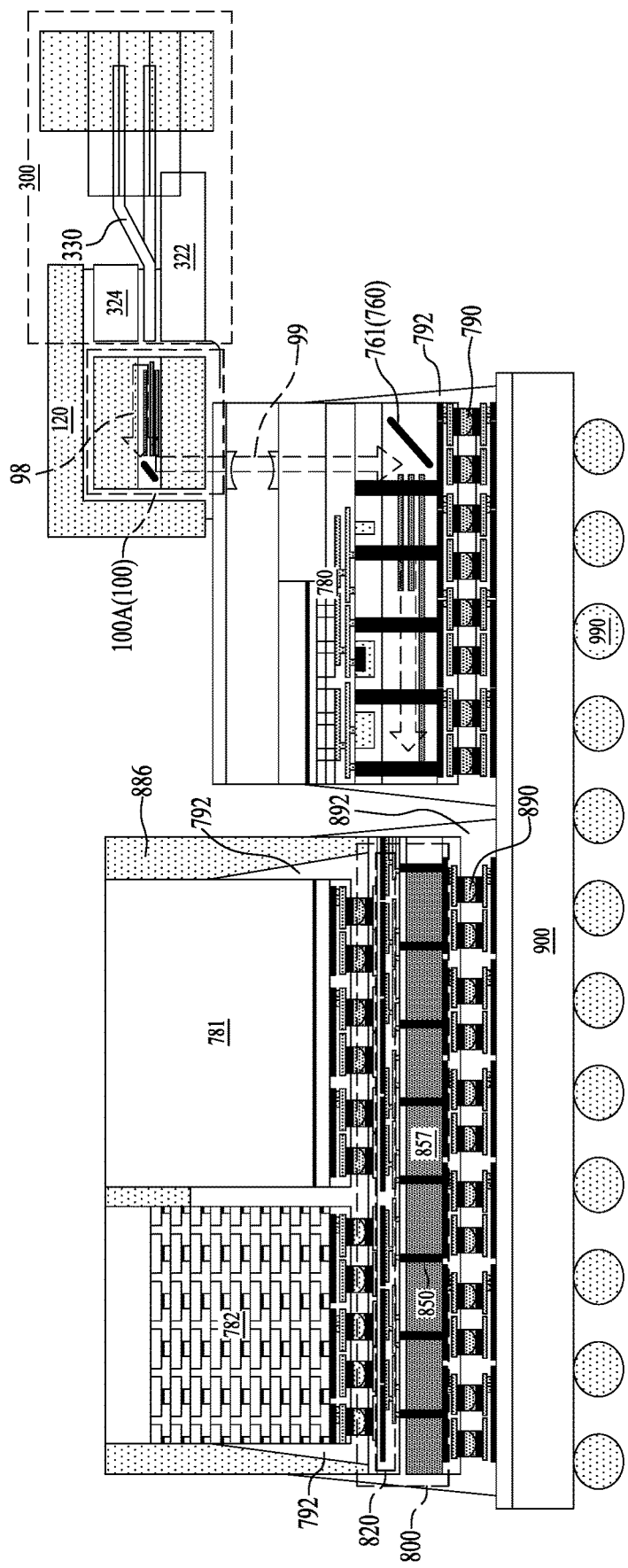

Referring to FIG. 11B, a second configuration of the seventh embodiment structure may be derived from the second configuration of the sixth embodiment structure illustrated in FIG. 9B, the tenth configuration of the sixth embodiment structure illustrated in FIG. 9J, or the eighteenth configuration of the sixth embodiment structure illustrated in FIG. 9R by attaching the fiber array units assembly 300 to the optical connector unit 100.

Figure 11C:
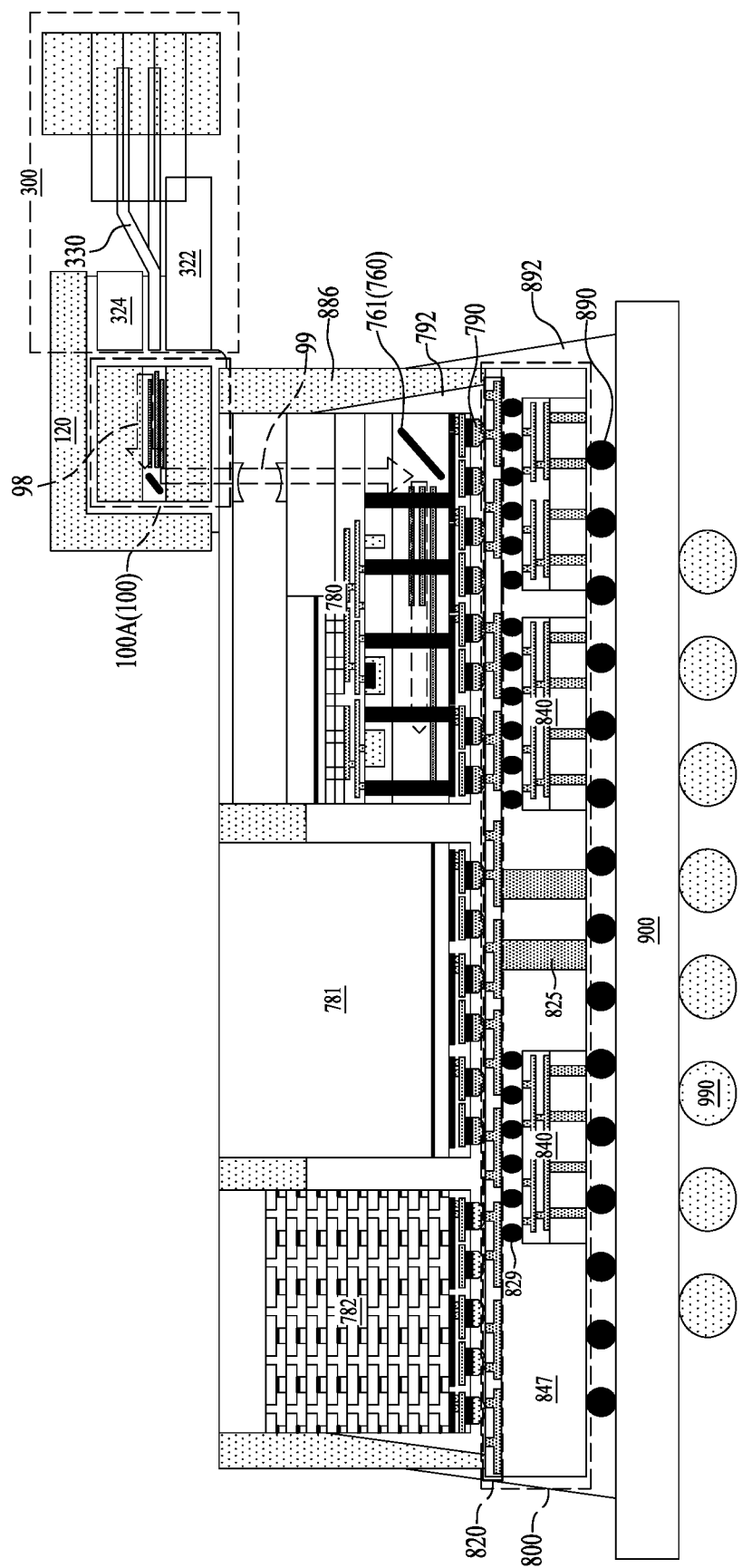

Referring to FIG. 11C, a third configuration of the seventh embodiment structure may be derived from the third configuration of the sixth embodiment structure illustrated in FIG. 9C, the eleventh configuration of the sixth embodiment structure illustrated in FIG. 9K, or the ninteenth configuration of the sixth embodiment structure illustrated in FIG. 9S by attaching the fiber array units assembly 300 to the optical connector unit 100.

Figure 11D:
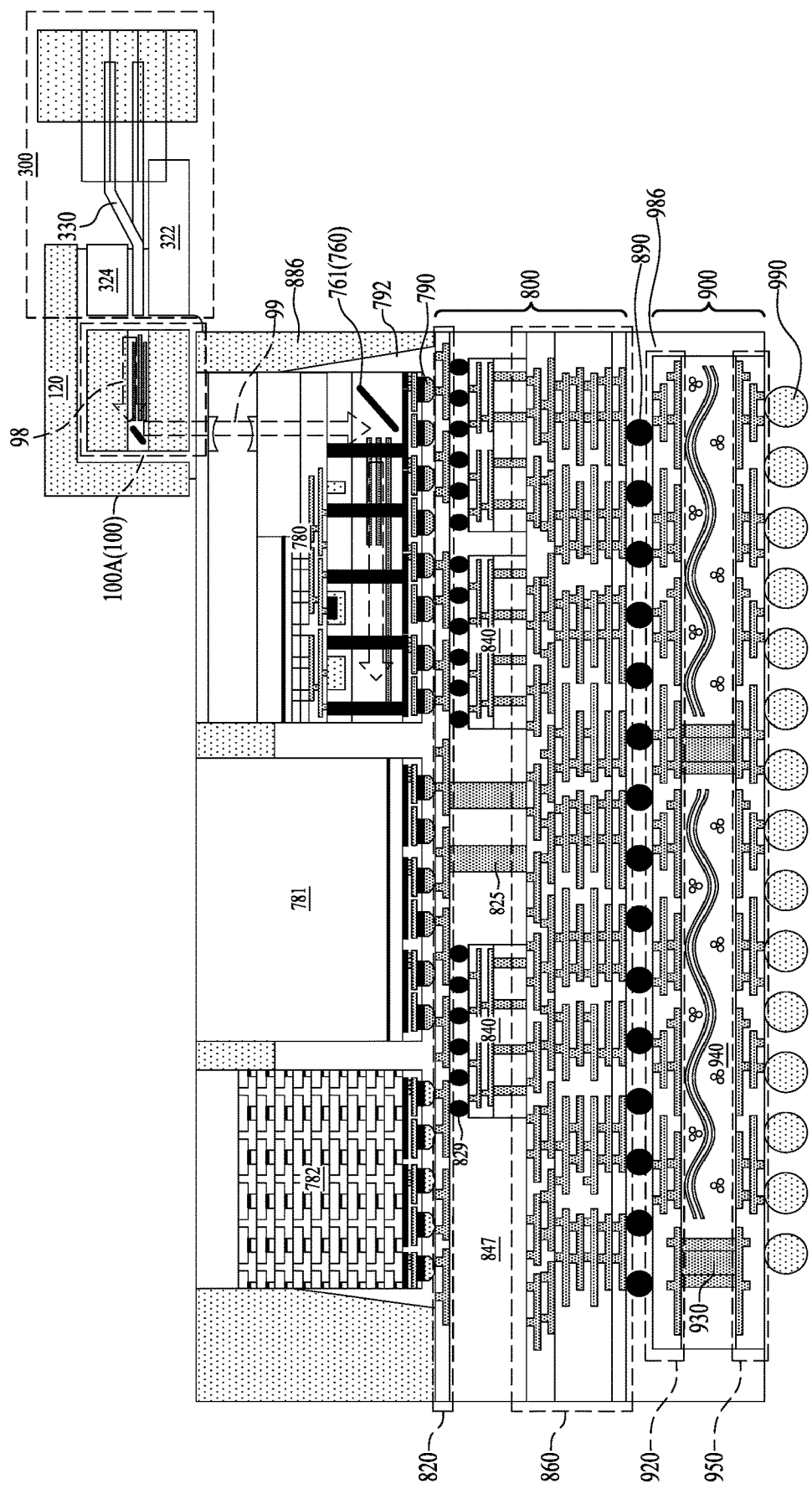

Referring to FIG. 11D, a fourth configuration of the seventh embodiment structure may be derived from the fourth configuration of the sixth embodiment structure illustrated in FIG. 9D, the twelfth configuration of the sixth embodiment structure illustrated in FIG. 9L, or the twentieth configuration of the sixth embodiment structure illustrated in FIG. 9T by attaching the fiber array units assembly 300 to the optical connector unit 100.

Figure 11E:
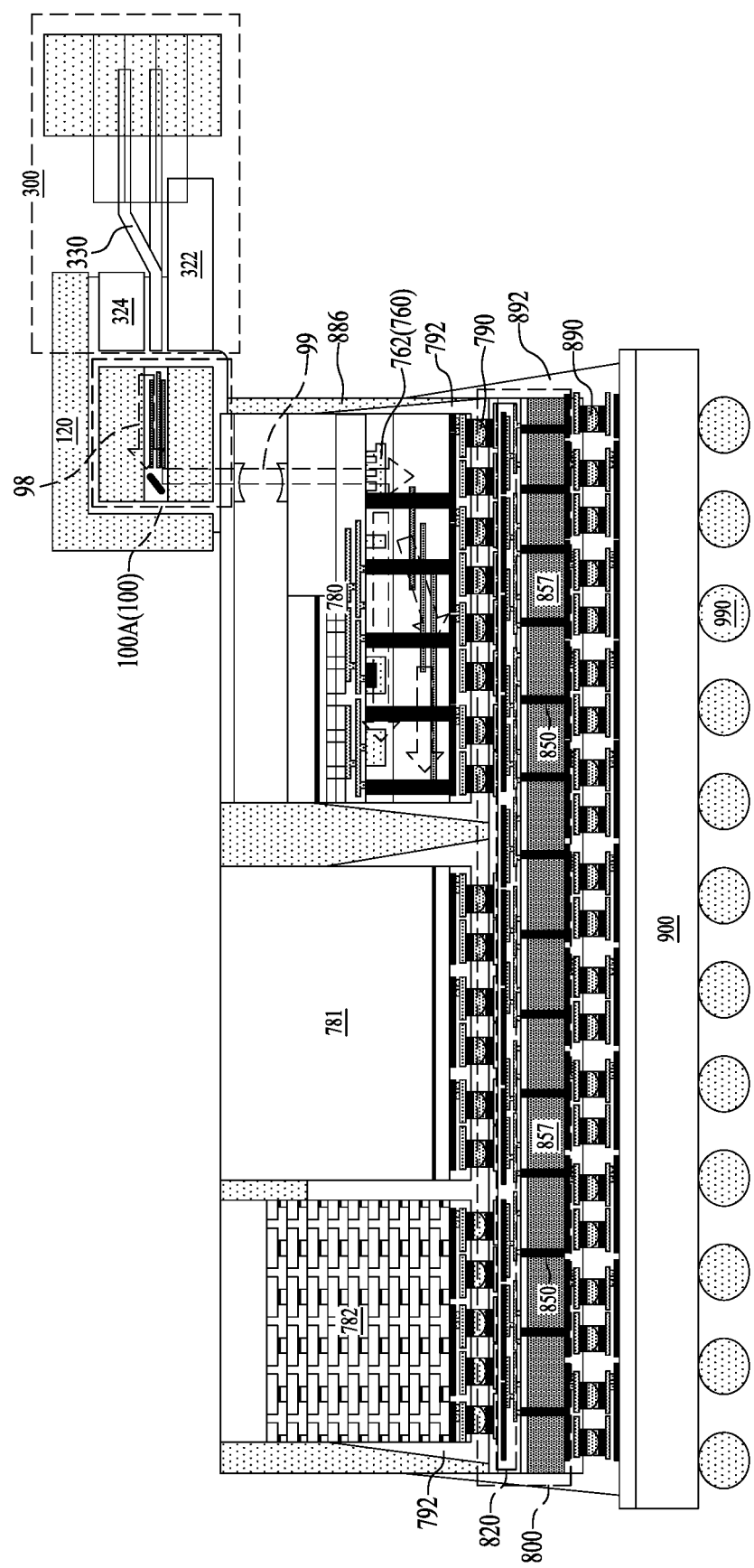

Referring to FIG. 11E, a fifth configuration of the seventh embodiment structure may be derived from the fifth configuration of the sixth embodiment structure illustrated in FIG. 9E, the thirteenth configuration of the sixth embodiment structure illustrated in FIG. 9M, or the twenty-first configuration of the sixth embodiment structure illustrated in FIG. 9U by attaching the fiber array units assembly 300 to the optical connector unit 100.

Figure 11F:
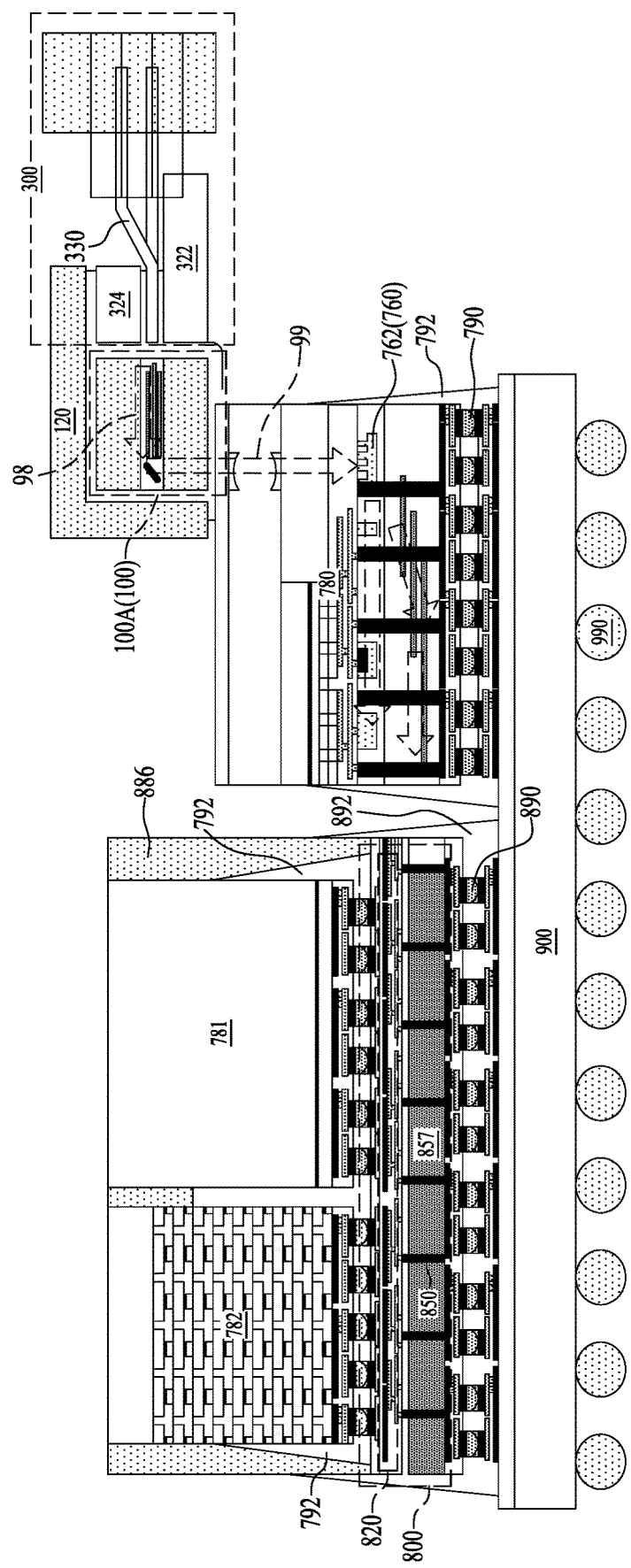

Referring to FIG. 11F, a sixth configuration of the seventh embodiment structure may be derived from the sixth configuration of the sixth embodiment structure illustrated in FIG. 9F, the fourteenth configuration of the sixth embodiment structure illustrated in FIG. 9N, or the twenty-second configuration of the sixth embodiment structure illustrated in FIG. 9V by attaching the fiber array units assembly 300 to the optical connector unit 100.

Figure 11G:
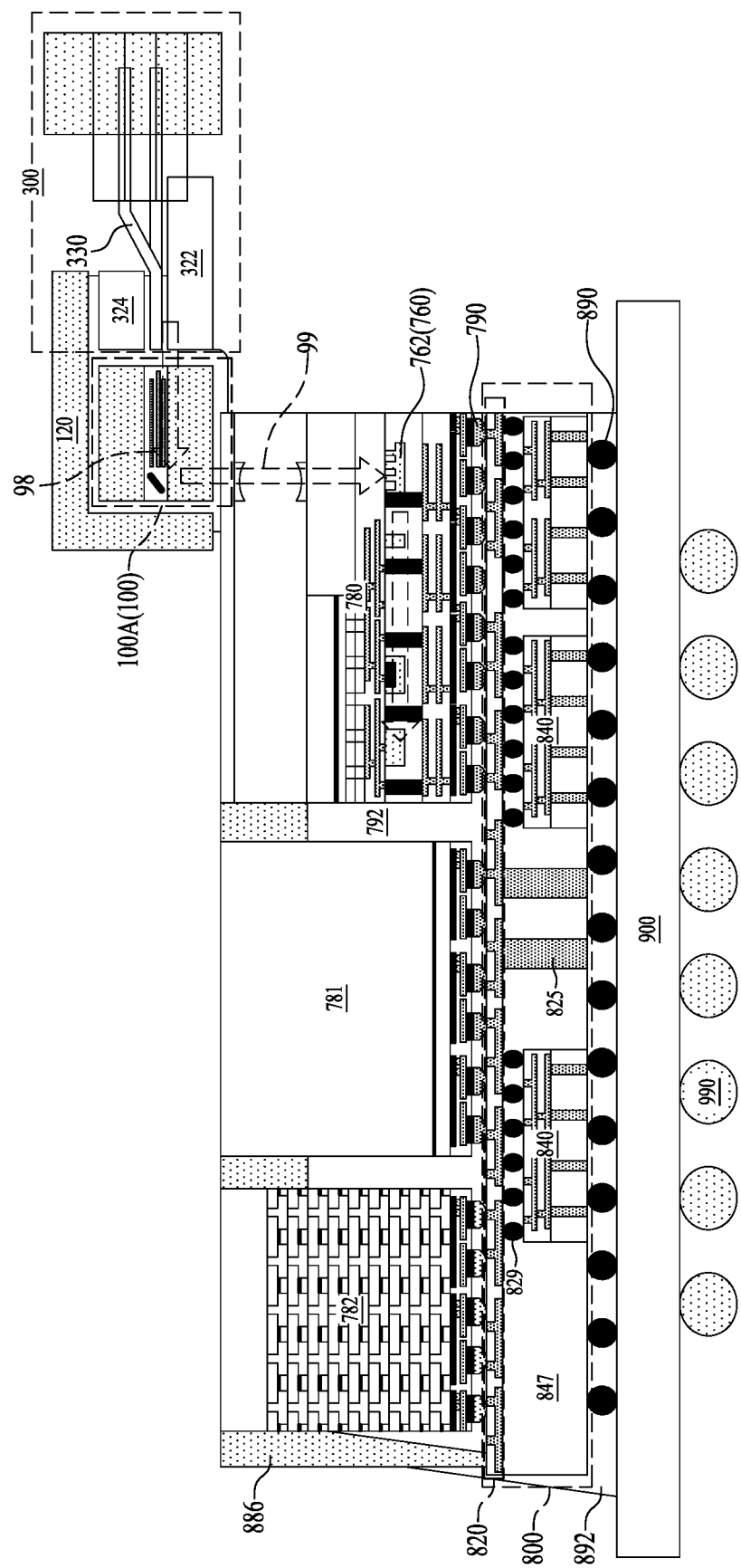

Referring to FIG. 11G, a seventh configuration of the seventh embodiment structure may be derived from the seventh configuration of the sixth embodiment structure illustrated in FIG. 9F, the fifteenth configuration of the sixth embodiment structure illustrated in FIG. 9N, or the twenty-third configuration of the sixth embodiment structure illustrated in FIG. 9V by attaching the fiber array units assembly 300 to the optical connector unit 100.

Figure 11H:
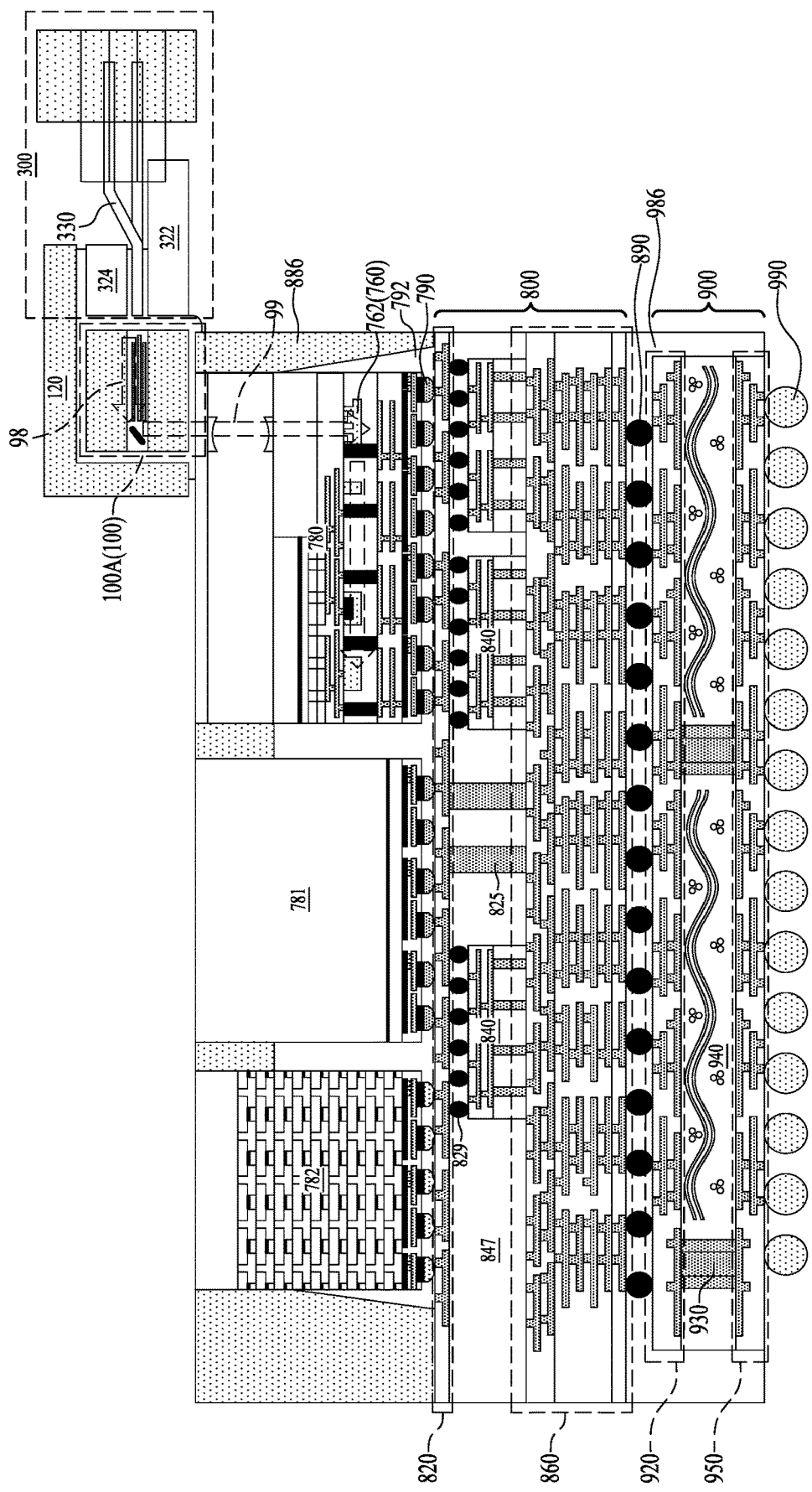

Referring to FIG. 11H, an eighth configuration of the seventh embodiment structure may be derived from the eighth configuration of the sixth embodiment structure illustrated in FIG. 9F, the sixteenth configuration of the sixth embodiment structure illustrated in FIG. 9N, or the twenty-fourth configuration of the sixth embodiment structure illustrated in FIG. 9V by attaching the fiber array units assembly 300 to the optical connector unit 100.

Similarly, additional configurations of the seventh embodiment structure may be derived from any of the first through fifth embodiment structures by attaching a fiber array units assembly 300 to the optical connector unit 100.

FIGS. 12A-12F are vertical cross-sectional views of various configurations of an eighth embodiment structure according to an aspect of the present disclosure.

Figure 12A:
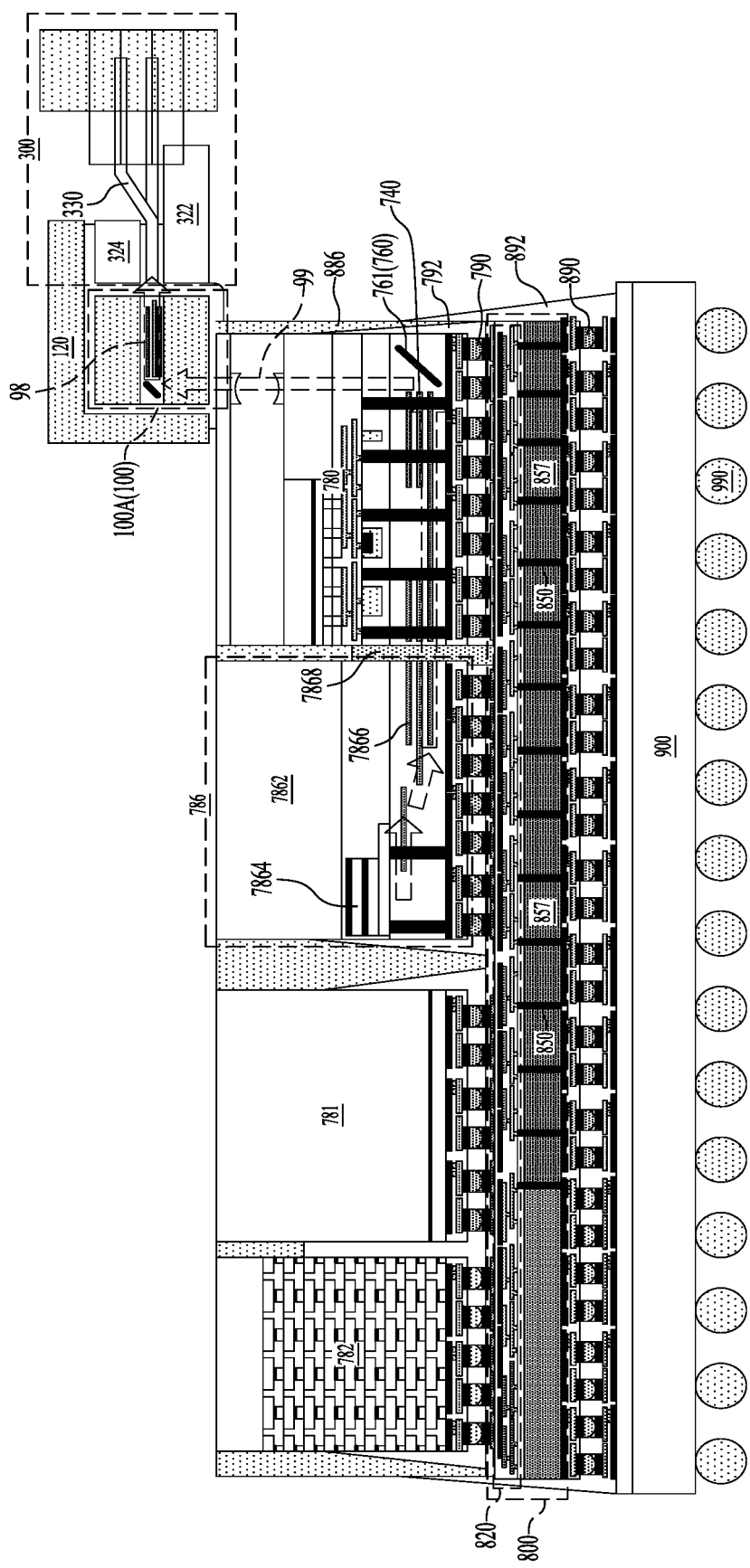
FIGS. 12A-12F are vertical cross-sectional views of various configurations of an eighth embodiment structure according to an aspect of the present disclosure.

Referring to FIG. 12A, a first configuration of the eighth embodiment structure may be derived from the first configuration of the eighth embodiment structure illustrated in FIG. 11A by attaching a light-emitting die 786 to the interposer 800 through an array of first solder material portions 790. The light-emitting die 786 comprises a substrate 7862, at least one light emitting element 7864 (such as a laser element), and waveguides 7866 that are optically coupled to the at least one light emitting element 7864. The light-emitting die 786 may be placed adjacent to the composite die 780 such that the waveguides 7866 within the light-emitting die 786 are aligned to waveguides 740 within the PIC die 700. The optical coupling between the waveguides 7866 within the light-emitting die 786 and the waveguides 740 within the PIC die 700 may be provided through an additional optical glue portion 7868 that is provided between the composite die 780 and the light-emitting die 786. In one embodiment, the additional optical glue portion 7868 may contact a sidewall of the light-emitting die 786 and a sidewall of the composite die 780, which comprises a sidewall of the PIC die 700. In this embodiment, the vertically-extending beam path 99 may be a bidirectional beam path, and the horizontally-extending beam path 98 may be a bidirectional beam path.

Figure 12B:
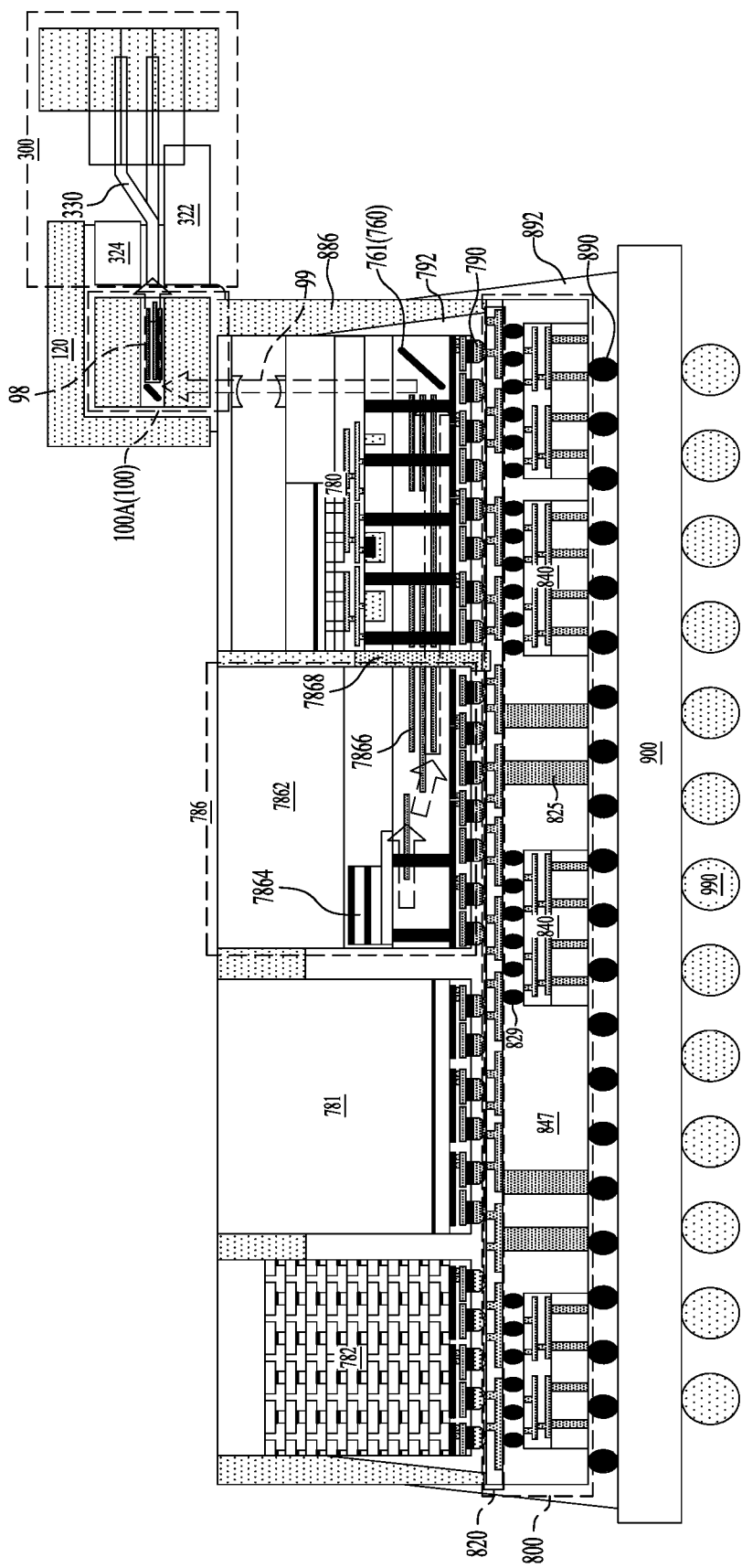

Referring to FIG. 12B, a second configuration of the eighth embodiment structure may be derived from the second configuration of the eighth embodiment structure illustrated in FIG. 11B by attaching a light-emitting die 786 to the interposer 800 through an array of first solder material portions 790.

Figure 12C:
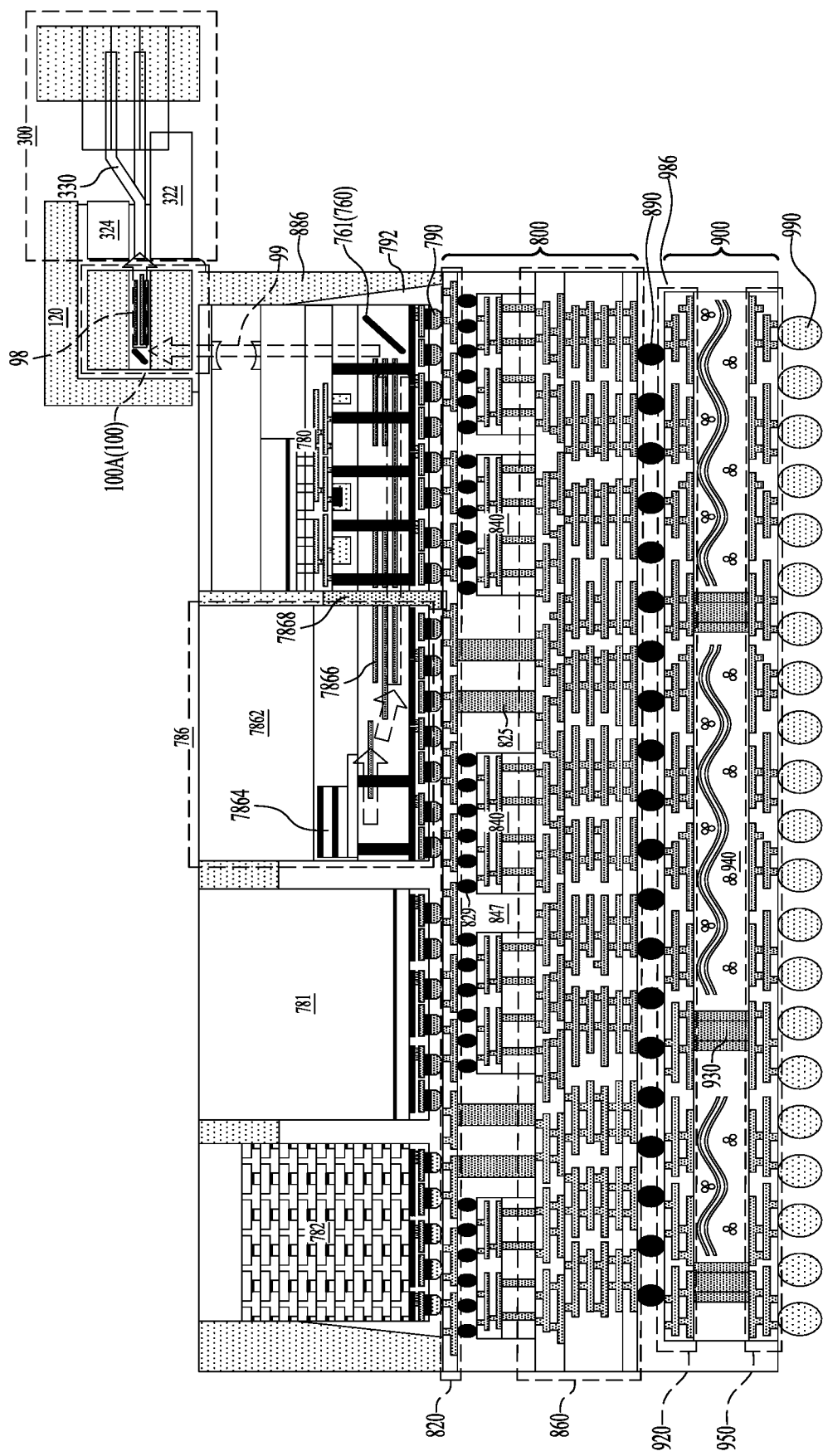

Referring to FIG. 12C, a third configuration of the eighth embodiment structure may be derived from the third configuration of the eighth embodiment structure illustrated in FIG. 11C by attaching a light-emitting die 786 to the interposer 800 through an array of first solder material portions 790.

Figure 12D:
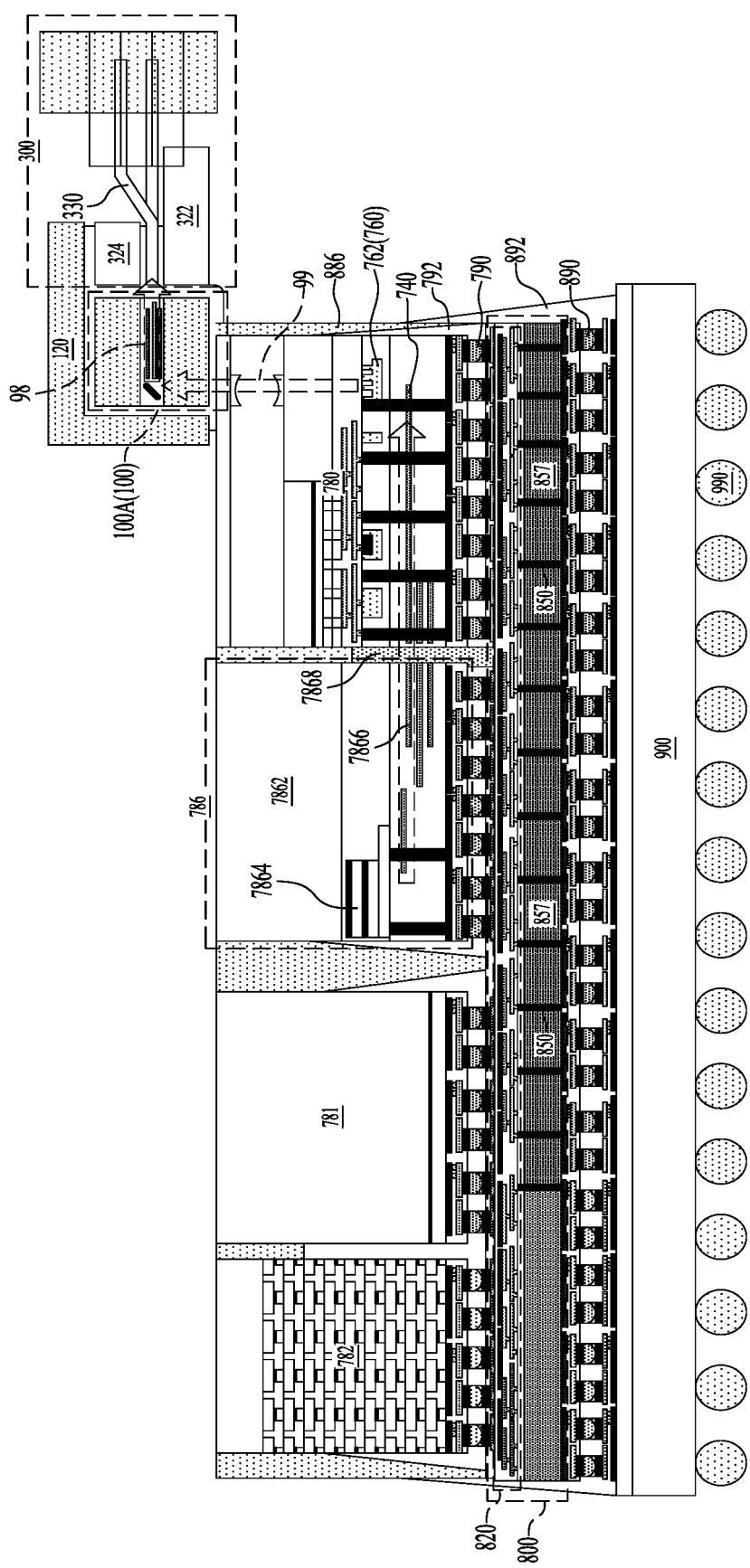

Referring to FIG. 12D, a fourth configuration of the eighth embodiment structure may be derived from the fourth configuration of the eighth embodiment structure illustrated in FIG. 11D by attaching a light-emitting die 786 to the interposer 800 through an array of first solder material portions 790.

Figure 12E:
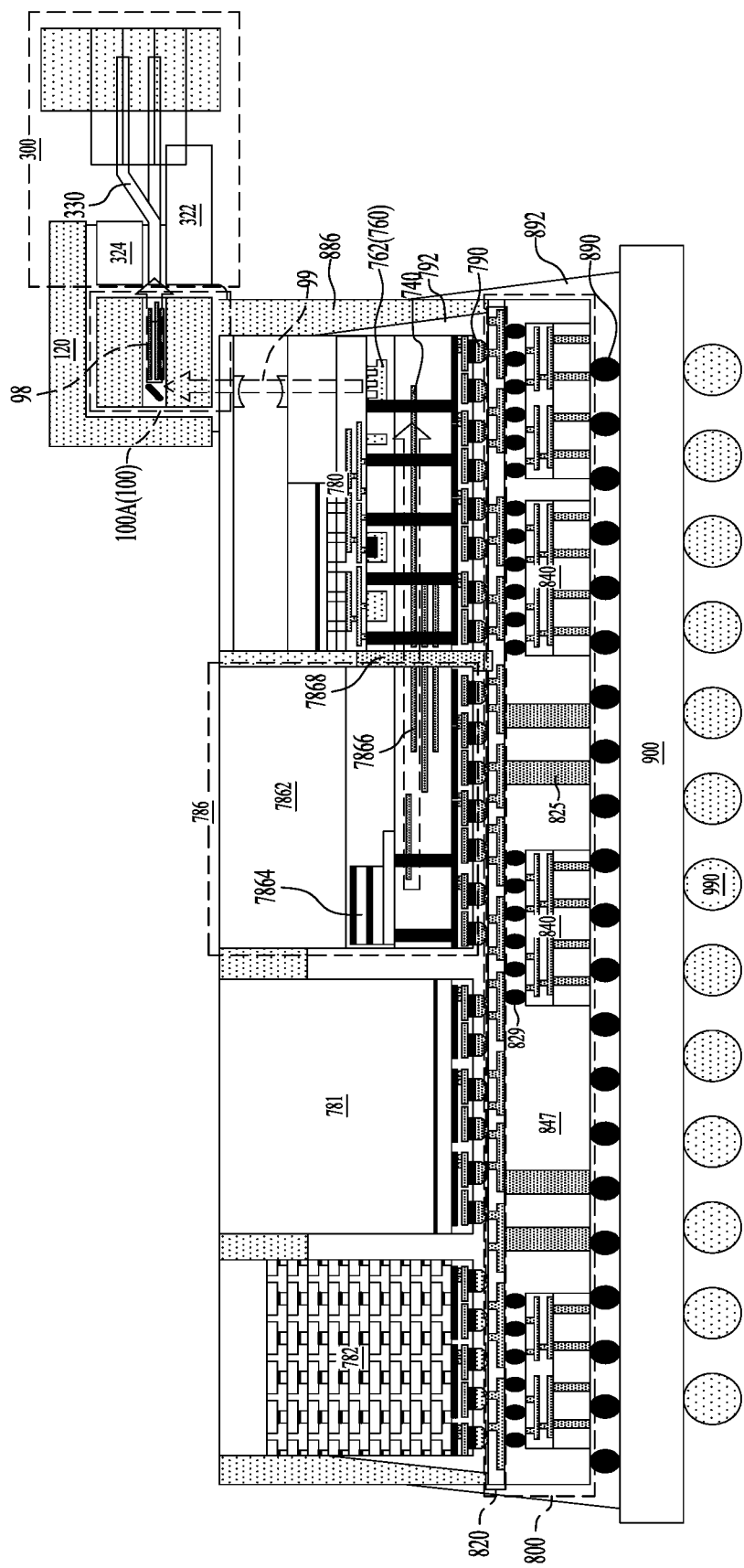

Referring to FIG. 12E, a fifth configuration of the eighth embodiment structure may be derived from the fifth configuration of the eighth embodiment structure illustrated in FIG. 11E by attaching a light-emitting die 786 to the interposer 800 through an array of first solder material portions 790.

Figure 12F:
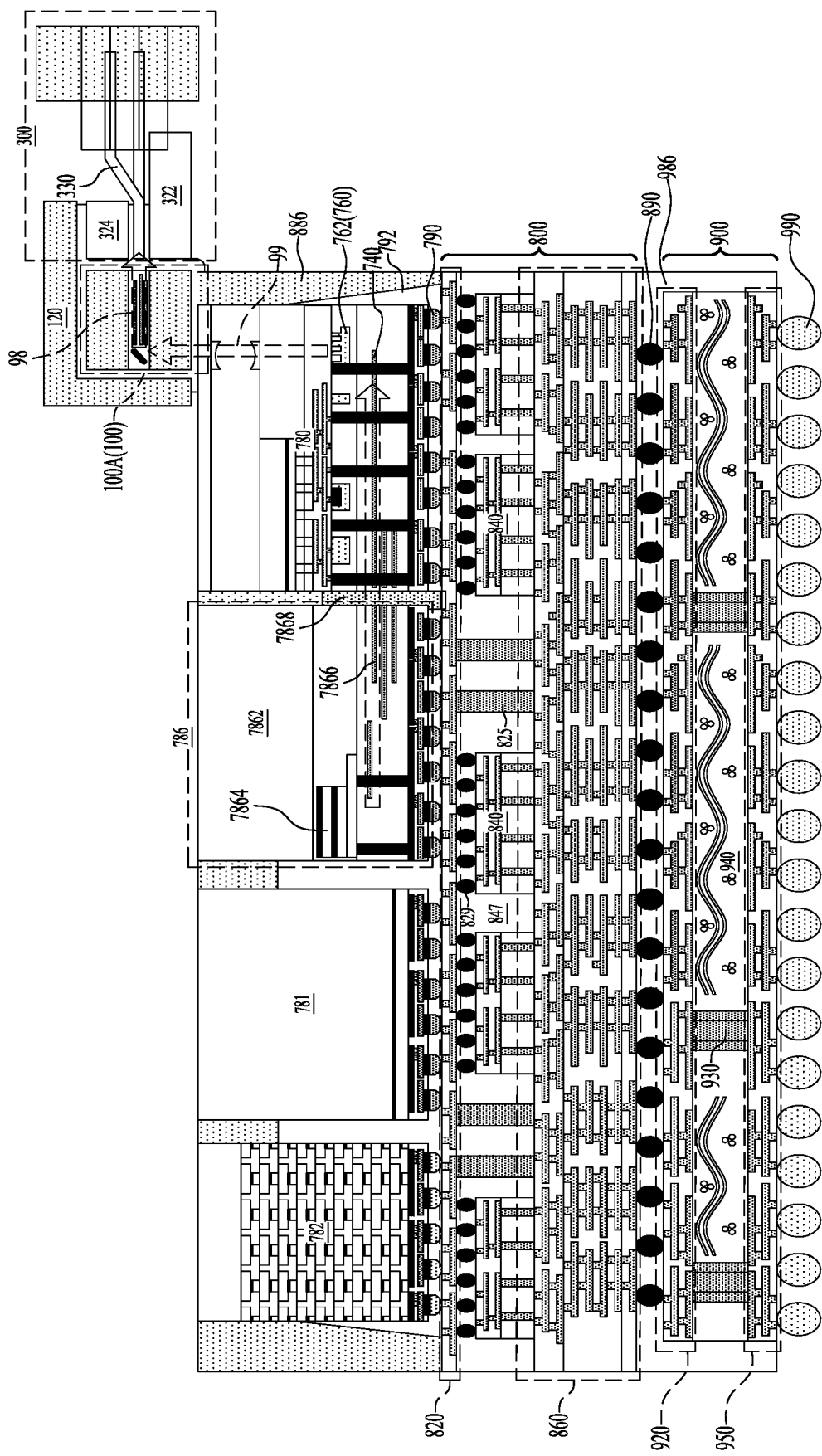

Referring to FIG. 12F, a sixth configuration of the eighth embodiment structure may be derived from the sixth configuration of the eighth embodiment structure illustrated in FIG. 11F by attaching a light-emitting die 786 to the interposer 800 through an array of first solder material portions 790.

Additional configurations of the eighth embodiment structure may be derived from any other configuration of the eighth embodiment structure or from any other embodiment structures described above by optically connecting a light-emitting die 786 to the interposer 800 through an array of first solder material portions 790, and by optically connecting the waveguides 7866 within the light-emitting die 786 with the waveguides in the PIC die 700.

While the various configurations described with reference to FIGS. 12A-12F provide examples in which the vertically-extending beam path 99 may be used as a bidirectional beam path, and the horizontally-extending beam path 98 may be a bidirectional beam path, it is understood that photonic devices 750 provided within the PIC die 700 in any configuration of the embodiment structures of the present disclosure may comprise at least one light-emitting element such as at least one laser element. Thus, the vertically-extending beam path 99 is inherently capable of being used as a bidirectional vertical beam path, and the horizontally-extending beam path 98 is inherently capable of being used as a bidirectional horizontal beam path.

Referring collectively to all embodiments in which fiber array units assembly 300 is attached to an optical connector unit 100 and according to an aspect of the present disclosure, a photonic assembly is provided, which comprises: a composite die 780 including a photonic integrated circuits (PIC) die 700 and an electronic integrated circuits (EIC) die 600, the PIC die 700 comprising waveguides 740 and photonic devices 750 therein, and the EIC die 600 comprising semiconductor devices 620 therein; an optical connector unit 100 comprising a first connector-side mirror reflector 160 and a first transition edge coupler 140 and attached to a top surface of the composite die 780, wherein the first connector-side mirror reflector 160 is configured to change a beam direction between a vertically-extending beam path 99 through the composite die 780 and a horizontally-extending beam path 98 through the first transition edge coupler 140; and a fiber array units assembly 300 attached to a sidewall of the optical connector unit 100.

In one embodiment, the photonic assembly comprises an encapsulation cover 120 having a horizontally-extending portion overlying the optical connector unit 100 (which may comprise an optical connector die (100A, 100B, 100C)) and a portion of the fiber array units assembly 300, and a vertically-extending portion that is attached to a sidewall of the optical connector unit 100 through the optical glue portion 130. In one embodiment, the composite die 780 comprises a support semiconductor substrate 510 interposed between the PIC die 700 and the optical connector unit 100; and the vertically-extending beam path 99 vertically extends through the support semiconductor substrate 510. In one embodiment, the optical connector unit 100 may comprise an optical connector die (100A, 100B, 100C) which comprises: a dielectric matrix layer 150 embedding the first connector-side mirror reflector 160 and the first transition edge coupler 140; a first spacer plate (111, 111') located over the first connector-side mirror reflector 160 and more distal from the composite die 780 than the first connector-side mirror reflector 160; and a second spacer plate (112, 112') interposed between the composite die 780 and the dielectric matrix layer 150.

Figure 13A:
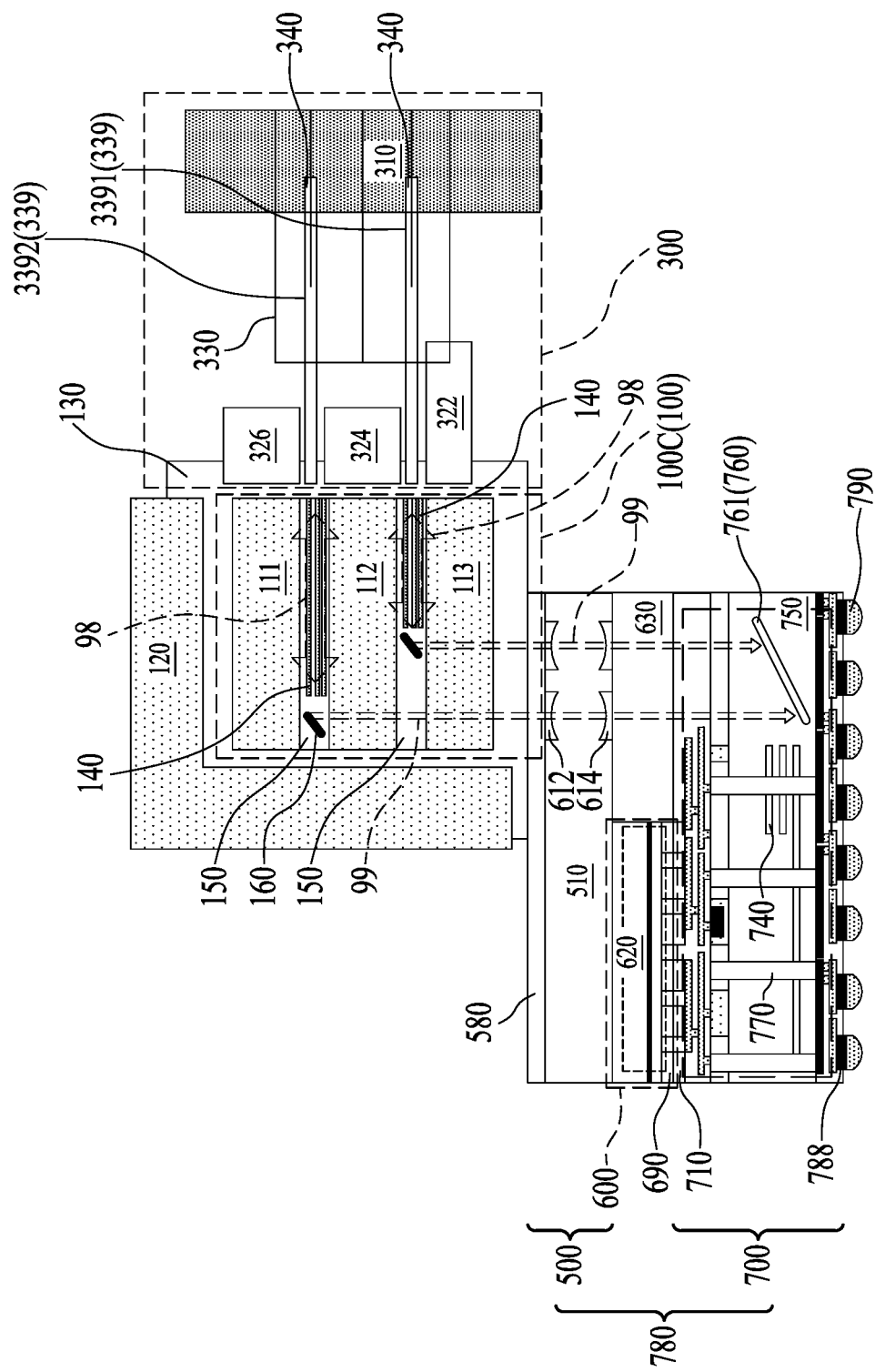
FIG. 13A is a vertical cross-sectional view of a ninth embodiment structure of the present disclosure.
Figure 13B:
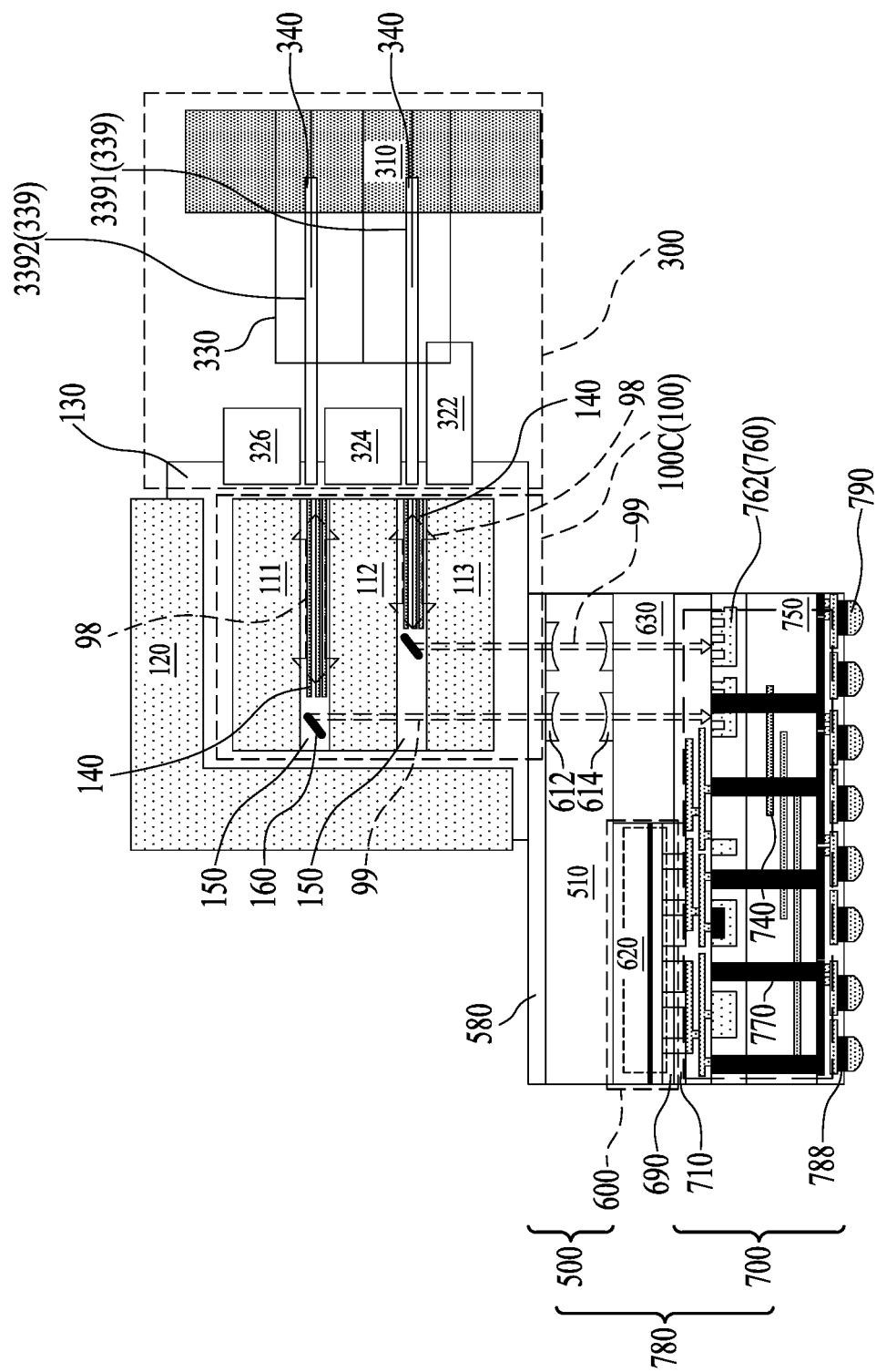
FIG. 13B is a vertical cross-sectional view of an alternative configuration of the ninth embodiment structure of the present disclosure.

FIG. 13A is a vertical cross-sectional view of a ninth embodiment structure of the present disclosure. FIG. 13B is a vertical cross-sectional view of an alternative configuration of the ninth embodiment structure of the present disclosure.

Referring to FIG. 13A, the ninth embodiment structure of the present disclosure may be derived from the fourth embodiment structure illustrated in FIG. 7A by attaching a modified embodiment of the fiber array units assembly 300 illustrated in FIG. 10. The modified fiber array units assembly 300 used in the ninth embodiment structure of FIG. 13A by adding additional optical fibers 340 on a top surface of a distal support plate 324 and fastening the additional optical fibers 340 to the distal support plate 324 by disposing and affixing over the additional optical fibers 340 an additional support plate, which is herein referred to as capping support plate 326. The capping support plate 326 may comprise the same material as, and may have the same lateral dimension as, the distal support plate 324. In one embodiment, the proximal support plate 322 may comprise a semiconductor material such as silicon, and the distal support plate 324 and the capping support plate 326 may comprise an optically transparent material such as silicon oxide.

A first row of optical fibers 340 disposed between the proximal support plate 322 and the distal support plate 324 may be vertically aligned to a first horizontally-extending optical path 98 that passes through a first transition edge coupler 140, and a second row of optical fibers 340 disposed between the distal support plate 324 and the capping support plate 326 may be vertically aligned to a second horizontally-extending optical path 98 that passes through a second transition edge coupler 140. In this embodiment, the thickness of the distal support plate 324 may be about the same as the thickness of the second spacer plate 112. The fiber array units assembly 300 is optically coupled to the optical connector die 100C, which is an optical connector unit 100.

Generally, the fiber array units assembly 300 illustrated in FIG. 13A comprises a proximal support plate 322, a first row of optical fibers 340 having first ends overlying the proximal support plate 322, a distal support plate 324 overlying the first row of optical fibers 340 and having a lesser lateral extent than the proximal support plate 322, and a second row of optical fibers 340 having first ends overlying the distal support plate 324, and a capping support plate 326 overlying the second row of optical fibers 340 and having a lesser lateral extent than the proximal support plate 322. The capping support plate 326 may have the same lateral extent as the distal support plate 324. In one embodiment, sidewalls of the proximal support plate 322, the distal support plate 324, and the capping support plate 326 may be vertically coincident, i.e., may be located within a same vertical plane.

The spacing between the proximal support plate 322 and the distal support plate 324 may be about the same as the thickness of a first dielectric matrix layer 150 that is located between the second spacer plate 112 and the third spacer plate 113. The spacing between the distal support plate 324 and the capping support plate 326 may be about the same as the thickness of a second dielectric matrix layer 150 that is located between the first spacer plate 111 and the second spacer plate 112. The lateral dimension of the proximal support plate 322 may be in a range from 60 microns to 1 mm, such as from 120 microns to 500 microns, although lesser and greater lateral dimensions may also be used. The lateral dimensions of the distal support plate 324 and the capping support plate 326 may be in a range from 30 microns to 500 microns, such as from 60 microns to 250 microns, although lesser and greater lateral dimensions may also be used.

In one embodiment, the proximal support plate 322 may comprise a stiff material such as a silicon. The thickness of the proximal support plate 322 may be in a range from 30 microns to 300 microns, such as from 60 microns to 150 microns, although lesser and greater thicknesses may also be used. The distal support plate 324 may comprise an optically transparent material such as silicon oxide. The thicknesses of the distal support plate 324 and the capping support plate 326 may be in a range from 10 microns to 300 microns, such as from 20 microns to 150 microns, although lesser and greater thicknesses may also be used. In some embodiments, the thickness of the distal support plate 324 may be the same as the thickness of the second spacer plate 112.

In one embodiment, the fiber array units assembly 300 comprises a fiber array matrix 310, which is a block of a rigid material including a plurality of laterally-extending cavities therein and/or therethrough. Each of the plurality of laterally-extending cavities may have a respective widthwise dimension (such as a diameter) that is the same as the diameter of an optical fiber 340, and may be configured to fit in a respective optical fiber 340. The laterally-extending cavities in the fiber array matrix 310 is herein referred to as a fiber sheath 339. The fiber sheaths 339 may be arranged as a rectangular array or as a hexagonal array including at least two vertically stacked rows of fiber sheaths 339. Each of the optical fibers 340 may comprise a respective second end that is fitted into a respective one of the fiber sheaths 339.

Generally, the fiber sheaths 339 may laterally surround a respective optical fibers 340, and may be laterally spaced from the proximal support plate 322 and the distal support plate 324. In one embodiment, the fiber sheaths 339 comprises first sheaths 3391 and second sheaths 3392 that are vertically spaced from each other; a first subset of the optical fibers 340 extends into the first sheaths 3391; and a second subset of the optical fibers 340 extends into the second sheaths 3392.

The fiber array units assembly 300 may further comprise a fiber cladding 330, which comprises a cladding material and laterally surrounds the portions of the optical fibers 340 that are proximal to the fiber array matrix 310. In one embodiment, the fiber cladding 330 may laterally extend between, and may be adjoined to each of, the fiber array matrix 310 and the proximal support plate 322 without contacting the distal support plate 324. The fiber array units assembly 300 may be attached to the optical connector die 100C by an optical glue portion 130, which may be a portion of the optical glue portion 130 that is used to attach the optical connector die 100C to the composite die 170, or may be an additional optical glue portion. Thus, the optical fibers 340 may be rigidly attached to a plurality of transition edge couplers 140 in an optical connector unit 100 through an optical glue portion 130.

Generally, the proximal support plate 322 and the distal support plate 324 may be attached to the optical connector unit 100 through an optical glue portion 130, and the proximal support plate 322 laterally protrudes farther outward from the optical glue portion 130 than the distal support plate 324 does from the optical glue portion 130. The optical connector die 100C in the ninth embodiment structure comprises a first connector-side mirror reflector 160 and a first transition edge coupler 140 embedded in a first dielectric matrix layer 150, and a second connector-side mirror reflector 160 and a second transition edge coupler 140 that are embedded in a second dielectric matrix layer 150 and are more distal from the top surface of the composite die 780 than the first connector-side mirror reflector 160 is from the top surface of the composite die 780. The second connector-side mirror reflector 160 is laterally offset from the first connector-side mirror reflector 160 along a horizontal direction.

Referring to FIG. 13B, the alternative configuration of the ninth embodiment structure may be derived from the ninth embodiment structure illustrated in FIG. 13B by using the alternative embodiment of the fourth embodiment structure illustrated in FIG. 7B in lieu of the fourth embodiment structure illustrated in FIG. 7A. In this embodiment, a plurality of grating couplers 762 may be used as a plurality of optical deflectors 760 in lieu of the in-die mirrors 761.

Figure 14A:
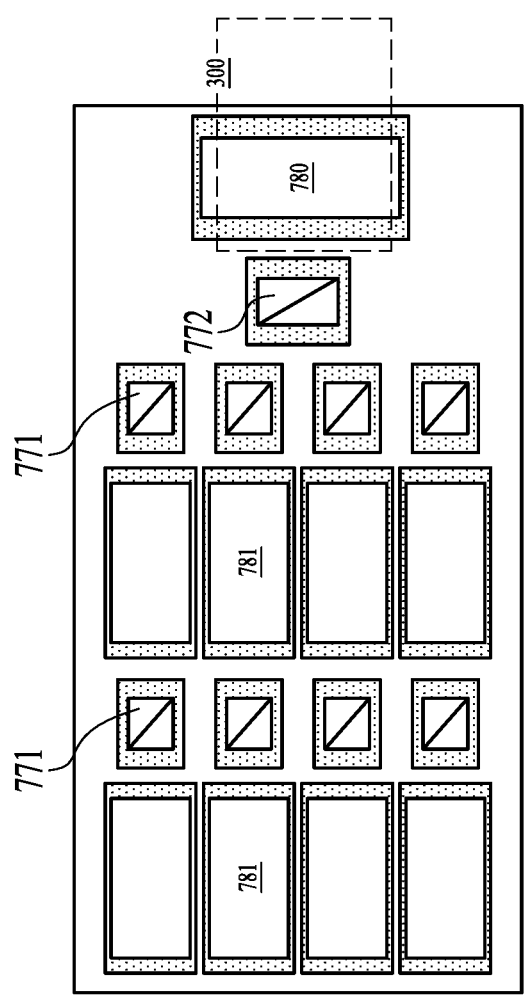
FIG. 14A is a vertical cross-sectional view of a tenth embodiment structure according to an aspect of the present disclosure.
Figure 14B:
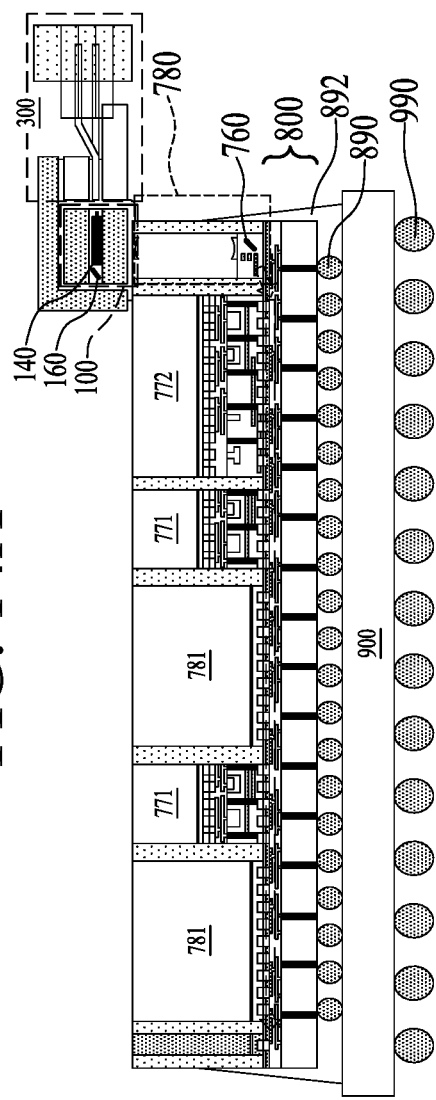
FIG. 14B is a top-down view of the tenth embodiment structure of FIG. 14A.

FIG. 14A is a vertical cross-sectional view of a tenth embodiment structure according to an aspect of the present disclosure. FIG. 14B is a top-down view of the tenth embodiment structure of FIG. 14A.

Referring to FIGS. 14A and 14B, the tenth embodiment structure comprises a photonic assembly based on at least one application-specific integrated circuit (ASIC) die 781. The tenth embodiment structure comprises at least one ASIC die 781, a composite die 780, at least one first-level memory die 771, and at least one second-level memory die 772. The composite die 780 may be any of the composite dies 780 described above. Each first-level memory die 771 may provide fast memory access with a lesser total memory capacity, and each second-level memory die 772 may provide slow memory access with a greater total memory capacity. An optical connector unit 100 may be provided within, or on, the composite die 780. A fiber array units assembly 300 may be attached to the optical connector unit 100. The optical connector unit 100 may be any of the previously described optical connector units 100, and the fiber array units assembly 300 may be selected to be compatible with the optical connector unit 100.

Figure 15A:
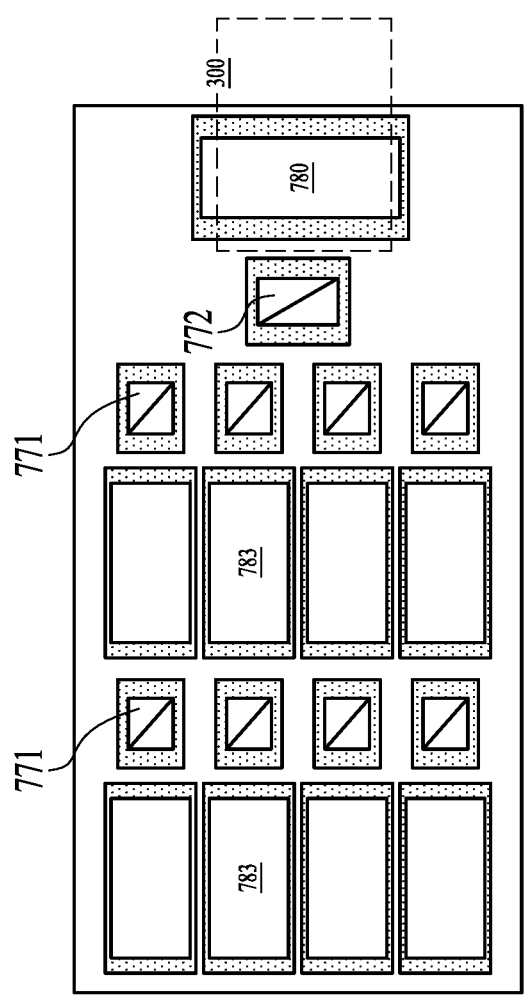
FIG. 15A is a vertical cross-sectional view of an eleventh embodiment structure according to an aspect of the present disclosure.
Figure 15B:
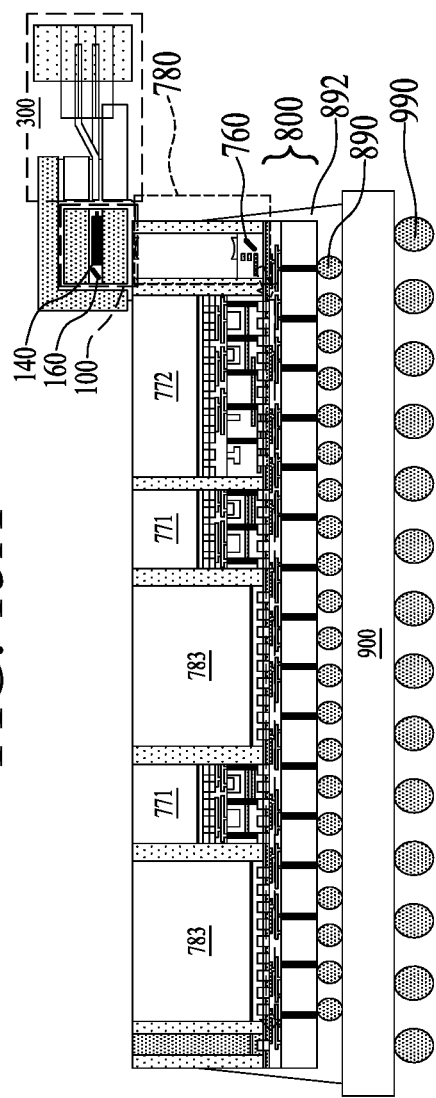
FIG. 15B is a top-down view of the eleventh embodiment structure of FIG. 15A.

FIG. 15A is a vertical cross-sectional view of an eleventh embodiment structure according to an aspect of the present disclosure. FIG. 15B is a top-down view of the eleventh embodiment structure of FIG. 15A.

Referring to FIGS. 15A and 15B, the eleventh embodiment structure comprises a photonic assembly based on at least one memory die 783. The eleventh embodiment structure comprises at least one memory die 783, a composite die 780, at least one first-level memory die 771 that is in communication with a respective memory die 783, and at least one second-level memory die 772 that is in communication with a respective memory die 783. Each first-level memory die 771 may provide fast memory access with a lesser total memory capacity, and each second-level memory die 772 may provide slow memory access with a greater total memory capacity. An optical connector unit 100 may be provided within, or on, the composite die 780. A fiber array units assembly 300 may be attached to the optical connector unit 100. The optical connector unit 100 may be any of the previously described optical connector units 100, and the fiber array units assembly 300 may be selected to be compatible with the optical connector unit 100.

FIGS. 16A-16D are vertical cross-sectional views of various configurations of a twelfth embodiment structure according to an aspect of the present disclosure.

Figure 16A:
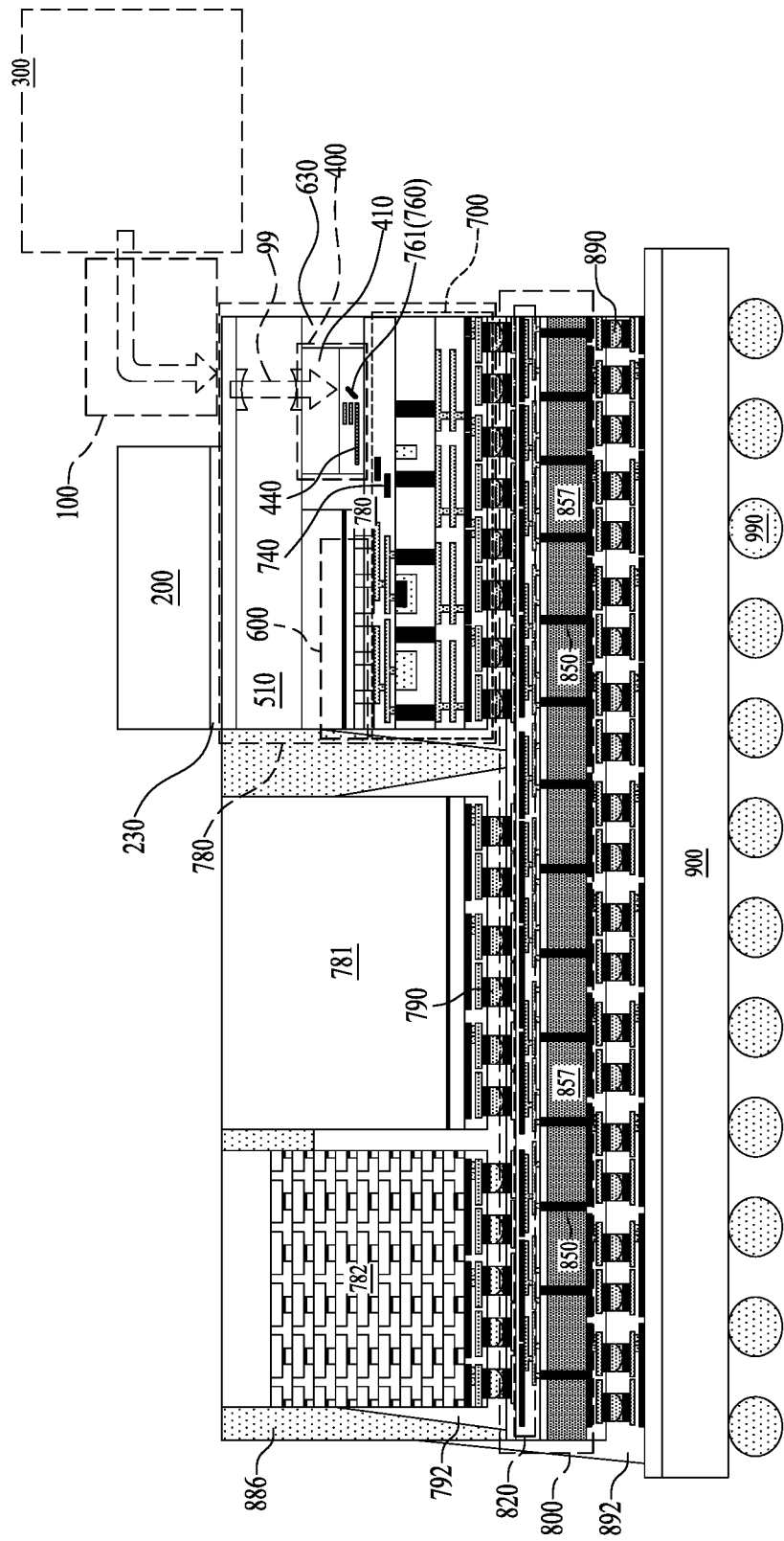
FIGS. 16A-16D are vertical cross-sectional views of various configurations of a twelfth embodiment structure according to an aspect of the present disclosure.

Referring to FIG. 16A, a first configuration of the twelfth embodiment structure may be derived from the first configuration of the sixth embodiment structure illustrated in FIG. 9A by attaching a heat sink 200 to a top surface of the composite die 780 using a thermal interface material (TIM) layer 230. The heat sink 200 may be disposed adjacent to, and/or on a sidewall of, an optical connector unit 100, which may comprise an optical connector die (100A, 100B, 100C). The heat sink 200 comprises a metal providing high thermal conductivity. For example, the heat sink 200 may comprise aluminum, copper, or another high-thermal-conductivity metal. The thickness of the heat sink 200 may be in a range from 30 microns to 600 microns, such as from 60 microns to 300 microns, although lesser and greater thicknesses may also be used.

Optionally, the composite die 780 illustrated in FIG. 9A may be modified to include an embedded optical connector die 400 therein. In this embodiment, the embedded optical connector die 400 may be embedded in the dielectric matrix 630. For example, the embedded optical connector die 400 may be bonded to the top surface of the PIC die 700 prior to, or after, bonding the EIC die 600 to the PIC die 700, and prior to formation of the dielectric matrix 630. In this embodiment, the dielectric matrix 630 may laterally surround the EIC die 600 and the embedded optical connector die 400. The support semiconductor substrate 510 may be formed over the EIC die 600, the embedded optical connector die 400, and the dielectric matrix 630. In one embodiment, the EIC die 600, the embedded optical connector die 400, and the dielectric matrix 630 may have the same thickness.

The embedded optical connector die 400 comprises a die substrate 410 (which may comprise a semiconductor material such as silicon), and dielectric material layers embedding an optical deflector 760 (such as an in-die mirror 761) and waveguides 440 that laterally extend along a horizontal direction and optically coupled to the optical deflector 760. In some embodiments, the in-die mirror 761 may be replaced with a grading coupler. The optical deflector 760 is configured to deflect a beam between a vertically-extending beam path 99 that vertically extends through the die substrate 410 and the support semiconductor substrate 510 and a horizontally-extending beam path that laterally extends through a subset of the waveguides 440 within the embedded optical connector die 400. Optical beams in the waveguides 440 within the embedded optical connector die 400 may be optically coupled to the waveguides 740 in the PIC die 700 through evanescent coupling.

Figure 16B:
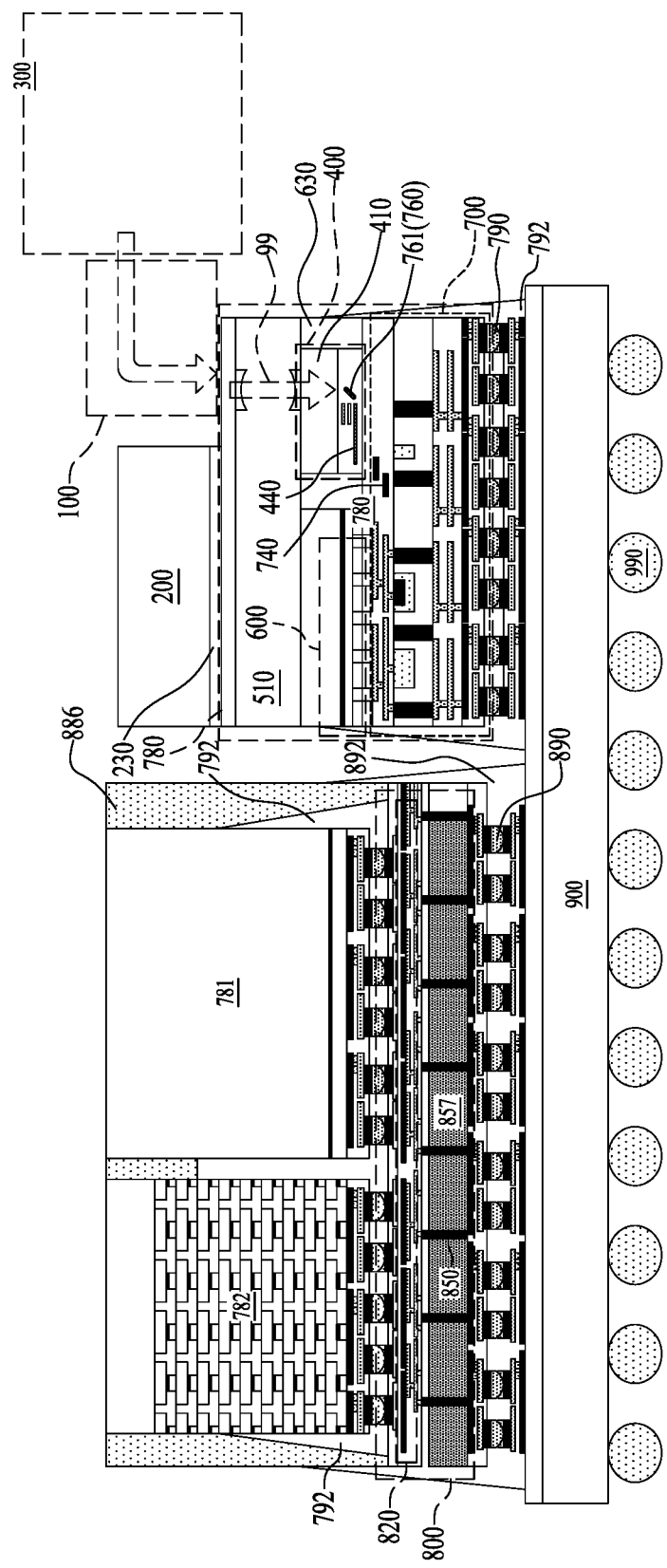

Referring to FIG. 16B, a second configuration of the twelfth embodiment structure may be derived from the second configuration of the sixth embodiment structure illustrated in FIG. 9B by attaching a heat sink 200 to a top surface of the composite die 780 using a thermal interface material (TIM) layer 230. The heat sink 200 may be disposed adjacent to, and/or on a sidewall of, an optical connector unit 100, which may comprise an optical connector die (100A, 100B, 100C). Optionally, a composite die 780 including an embedded optical connector die 400 therein (as described with reference to FIG. 16A) may be used in lieu of the composite die 780 illustrated in FIG. 9B. In some embodiments, the in-die mirror 761 may be replaced with a grading coupler.

Figure 16C:
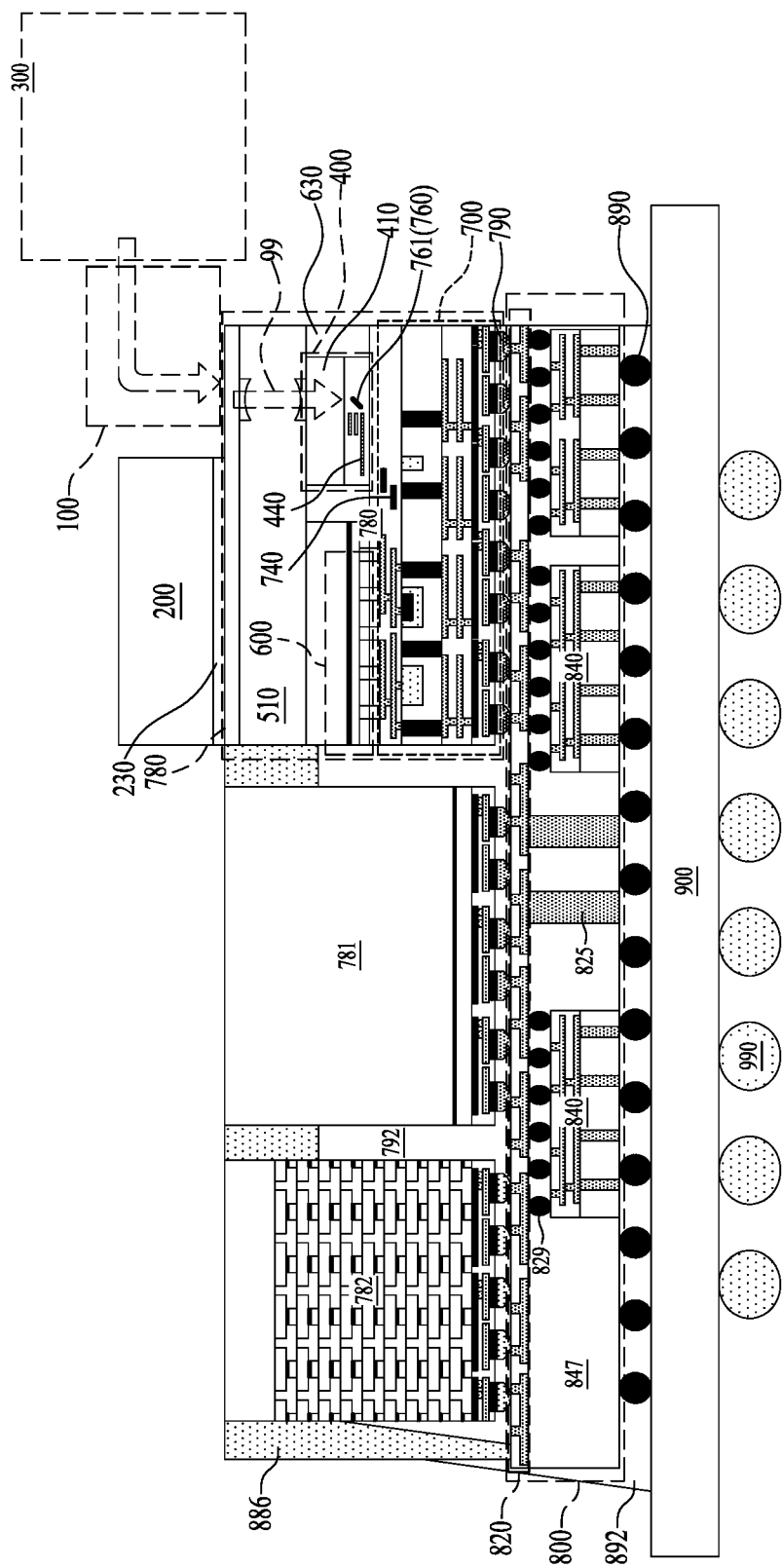

Referring to FIG. 16C, a third configuration of the twelfth embodiment structure may be derived from the fourth configuration of the sixth embodiment structure illustrated in FIG. 9C by attaching a heat sink 200 to a top surface of the composite die 780 using a thermal interface material (TIM) layer 230. The heat sink 200 may be disposed adjacent to, and/or on a sidewall of, an optical connector unit 100, which may comprise an optical connector die (100A, 100B, 100C). Optionally, a composite die 780 including an embedded optical connector die 400 therein (as described with reference to FIG. 16A) may be used in lieu of the composite die 780 illustrated in FIG. 9B. In some embodiments, the in-die mirror 761 may be replaced with a grading coupler.

Figure 16D:
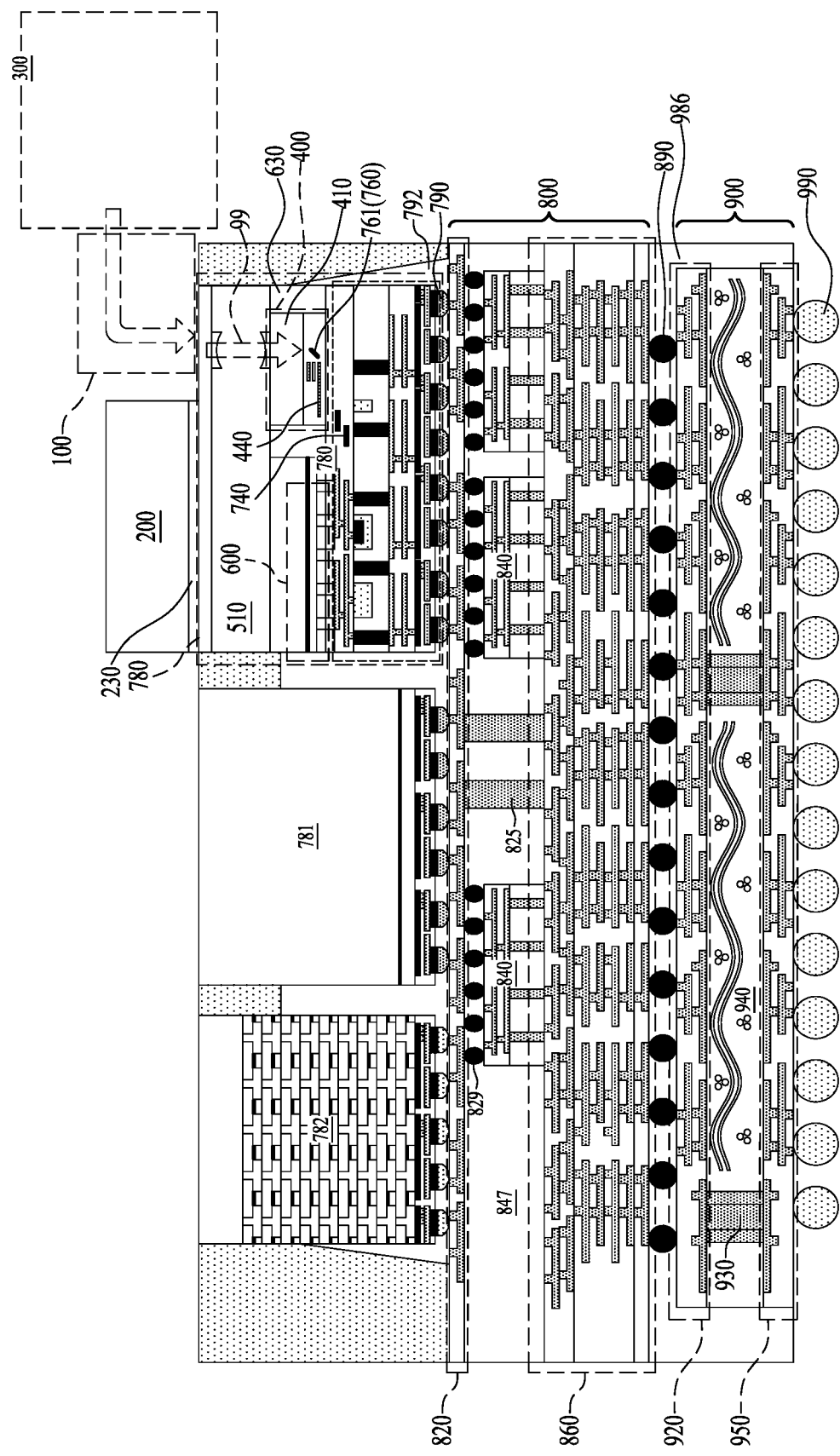

Referring to FIG. 16D, a fourth configuration of the twelfth embodiment structure may be derived from the fourth configuration of the sixth embodiment structure illustrated in FIG. 9D by attaching a heat sink 200 to a top surface of the composite die 780 using a thermal interface material (TIM) layer 230. The heat sink 200 may be disposed adjacent to, and/or on a sidewall of, an optical connector unit 100, which may comprise an optical connector die (100A, 100B, 100C). Optionally, a composite die 780 including an embedded optical connector die 400 therein (as described with reference to FIG. 16A) may be used in lieu of the composite die 780 illustrated in FIG. 9B. In some embodiments, the in-die mirror 761 may be replaced with a grading coupler.

FIGS. 17A-17H are vertical cross-sectional views of various configurations of a thirteenth embodiment structure according to an aspect of the present disclosure.

Figure 17A:
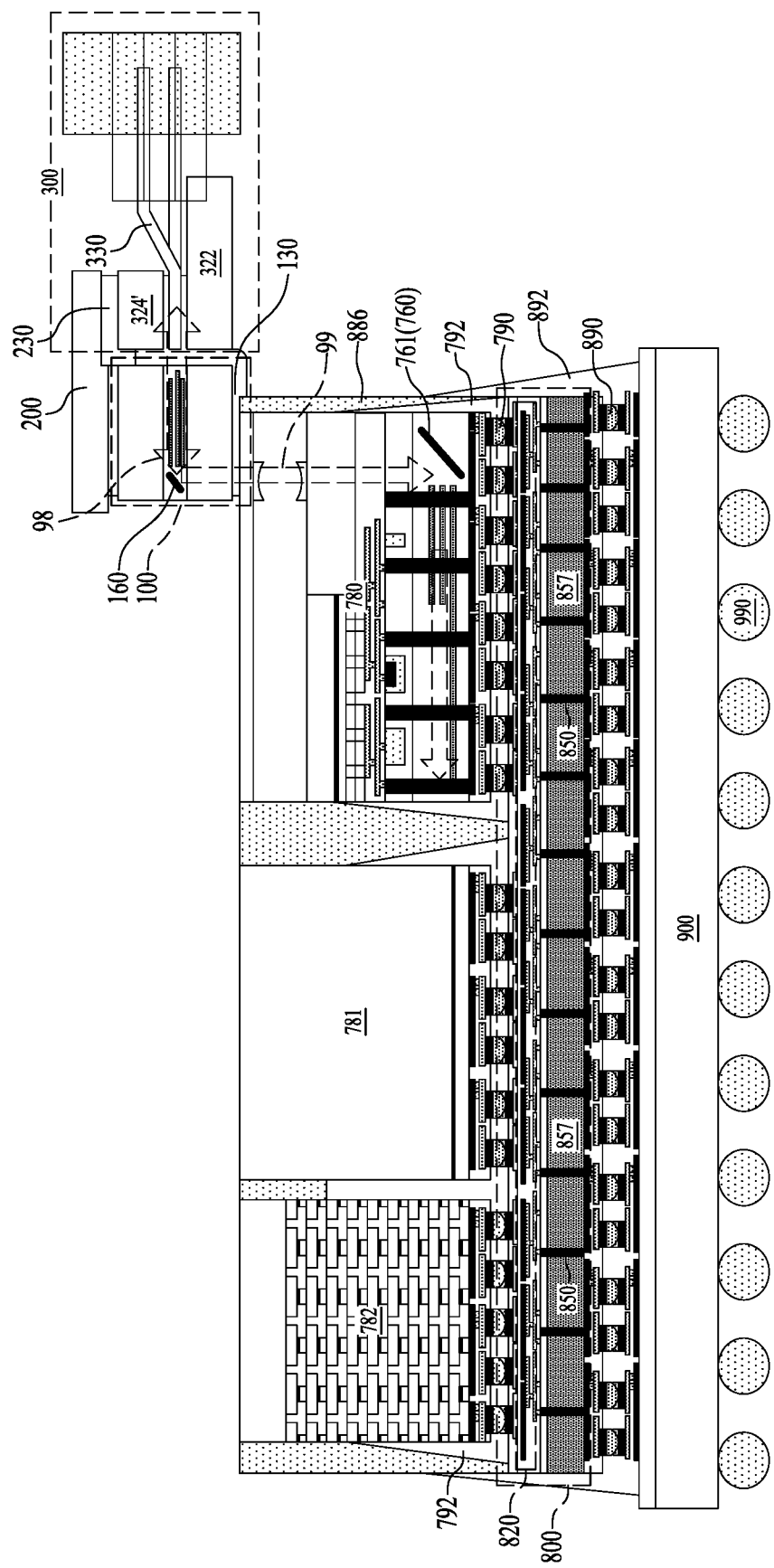
FIGS. 17A-17H are vertical cross-sectional views of various configurations of a thirteenth embodiment structure according to an aspect of the present disclosure.

Referring to FIG. 17A, a first configuration of the thirteenth embodiment structure may be derived from the first configuration of the seventh embodiment structure illustrated in FIG. 11A by using a heat sink 200 in lieu of an encapsulation cover 120. Any type of optical connector unit 100 may be used provided that the configuration of the optical connector unit 100 matches the configuration in the composite die 780 such that each vertically-extending beam path 99 intersect a respective transition edge coupler 140. The heat sink 200 may be attached to a top surface of an optical connector unit 100 using a TIM layer 230. In one embodiment, the heat sink 200 may extend over a fiber array units assembly 300. For example, a distal support plate 324 or a capping support plate 326 of a fiber array units assembly 300 may be attached to a bottom surface of the heat sink 200 through the TIM layer 230.

In some embodiments, the distal support plate 324 or the capping support plate 326 described with reference to fiber array units assemblies 300 described above may be replaced with a semiconductor support plate 324' comprising, and/or consisting essentially of, a semiconductor material such as silicon. In this embodiment, the semiconductor support plate 324' may have the same shape as the distal support plate 324 or the capping support plate 326. Generally, a support plate overlying, and contacting, a row of optical fibers 340 may be attached to a bottom surface of the heat sink 200 through the TIM layer 230. Further, a sidewall of the support plate may be attached to the optical connector unit 100 through an optical glue portion 130.

Figure 17B:
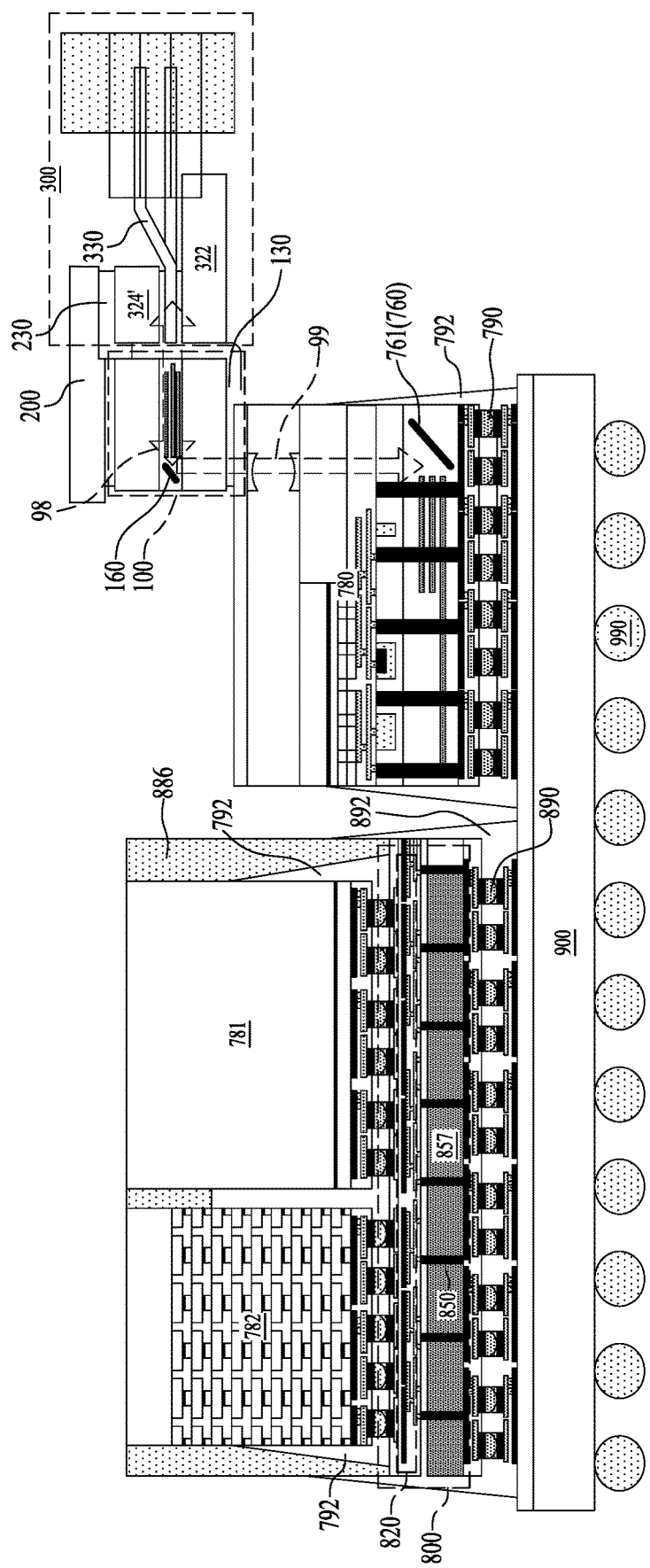

Referring to FIG. 17B, a second configuration of the thirteenth embodiment structure may be derived from the second configuration of the seventh embodiment structure illustrated in FIG. 11B by using a heat sink 200 in lieu of an encapsulation cover 120. The heat sink 200 may be attached to a top surface of an optical connector unit 100 using a TIM layer 230. In one embodiment, the heat sink 200 may extend over a fiber array units assembly 300.

Figure 17C:
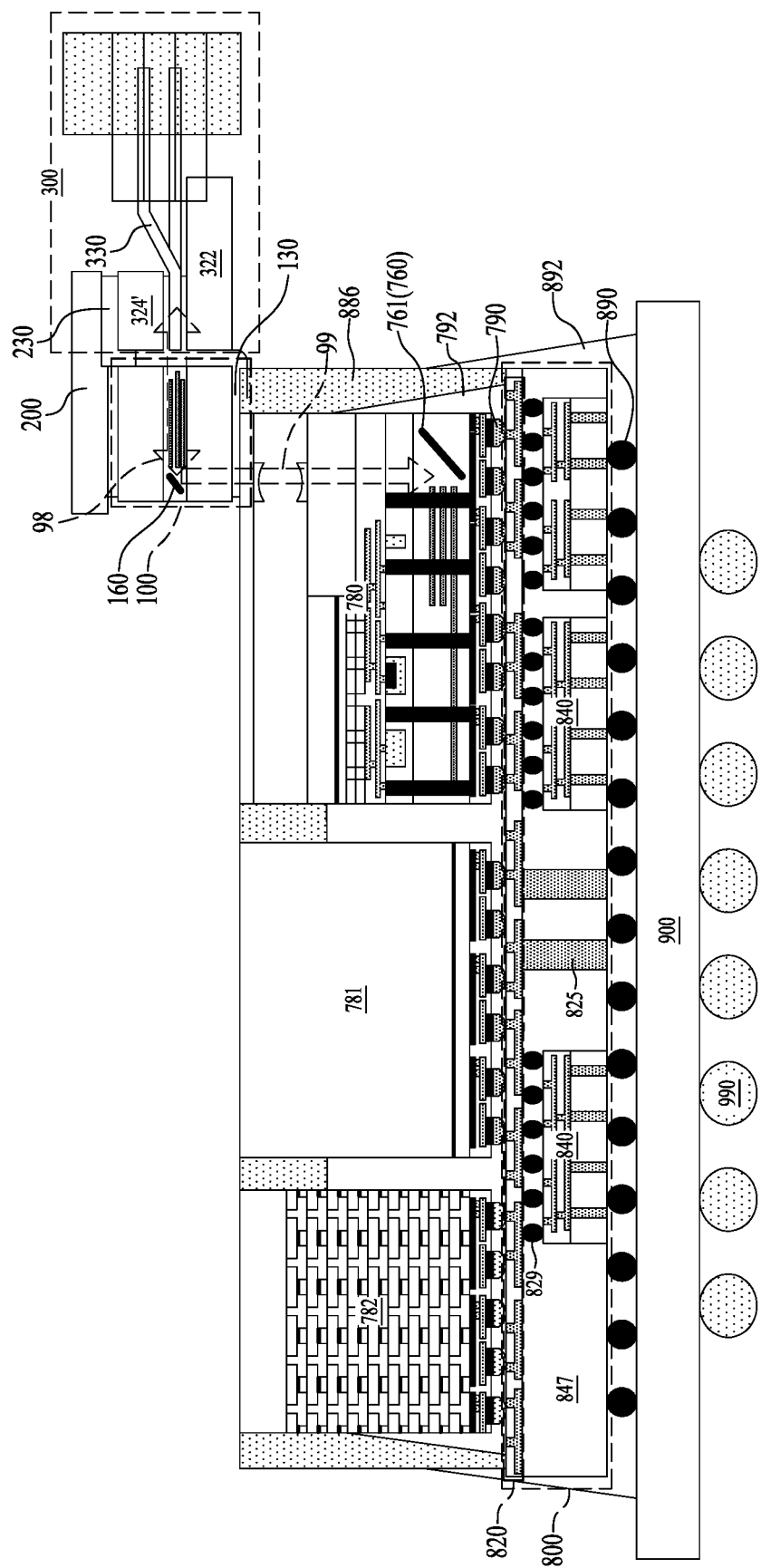

Referring to FIG. 17C, a third configuration of the thirteenth embodiment structure may be derived from the third configuration of the seventh embodiment structure illustrated in FIG. 11C by using a heat sink 200 in lieu of an encapsulation cover 120. The heat sink 200 may be attached to a top surface of an optical connector unit 100 using a TIM layer 230. In one embodiment, the heat sink 200 may extend over a fiber array units assembly 300.

Figure 17D:
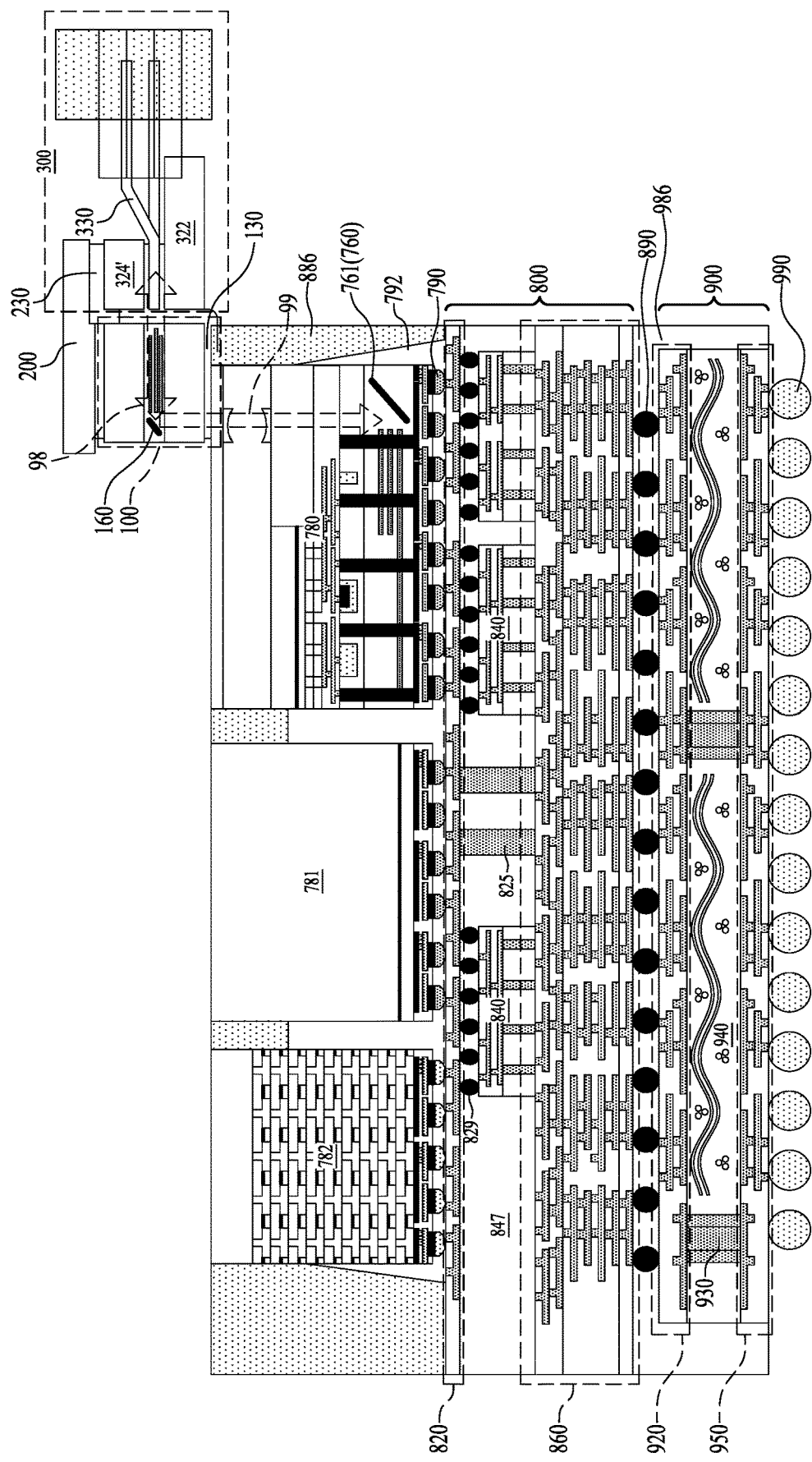

Referring to FIG. 17D, a fourth configuration of the thirteenth embodiment structure may be derived from the fourth configuration of the seventh embodiment structure illustrated in FIG. 11D by using a heat sink 200 in lieu of an encapsulation cover 120. The heat sink 200 may be attached to a top surface of an optical connector unit 100 using a TIM layer 230. In one embodiment, the heat sink 200 may extend over a fiber array units assembly 300.

Figure 17E:
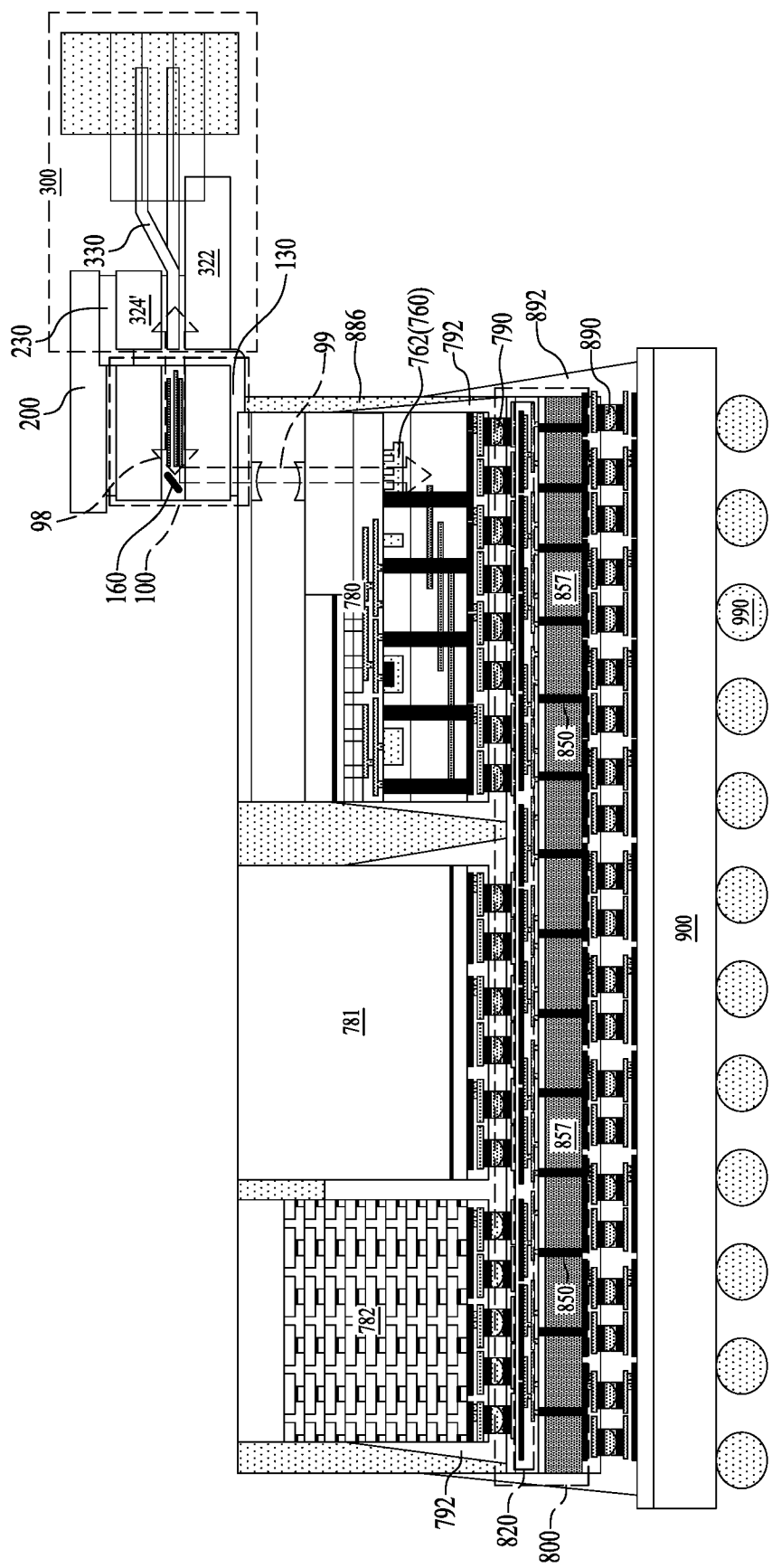
Figure 17F:
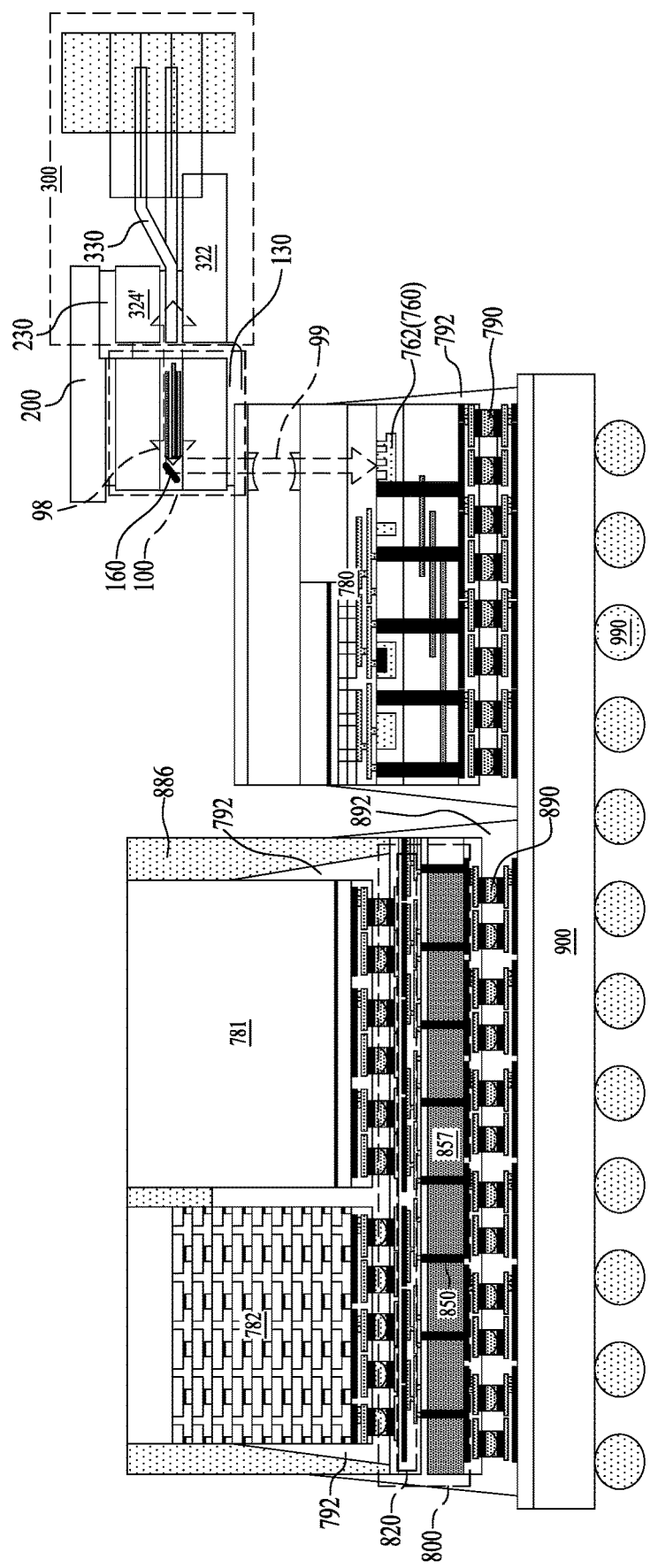

Referring to FIG. 17E, a fifth configuration of the thirteenth embodiment structure may be derived from the fifth configuration of the seventh embodiment structure illustrated in FIG. 11E by using a heat sink 200 in lieu of an encapsulation cover 120. The heat sink 200 may be attached to a top surface of an optical connector unit 100 using a TIM layer 230. In one embodiment, the heat sink 200 may extend over a fiber array units assembly 300.

Figure 17G:
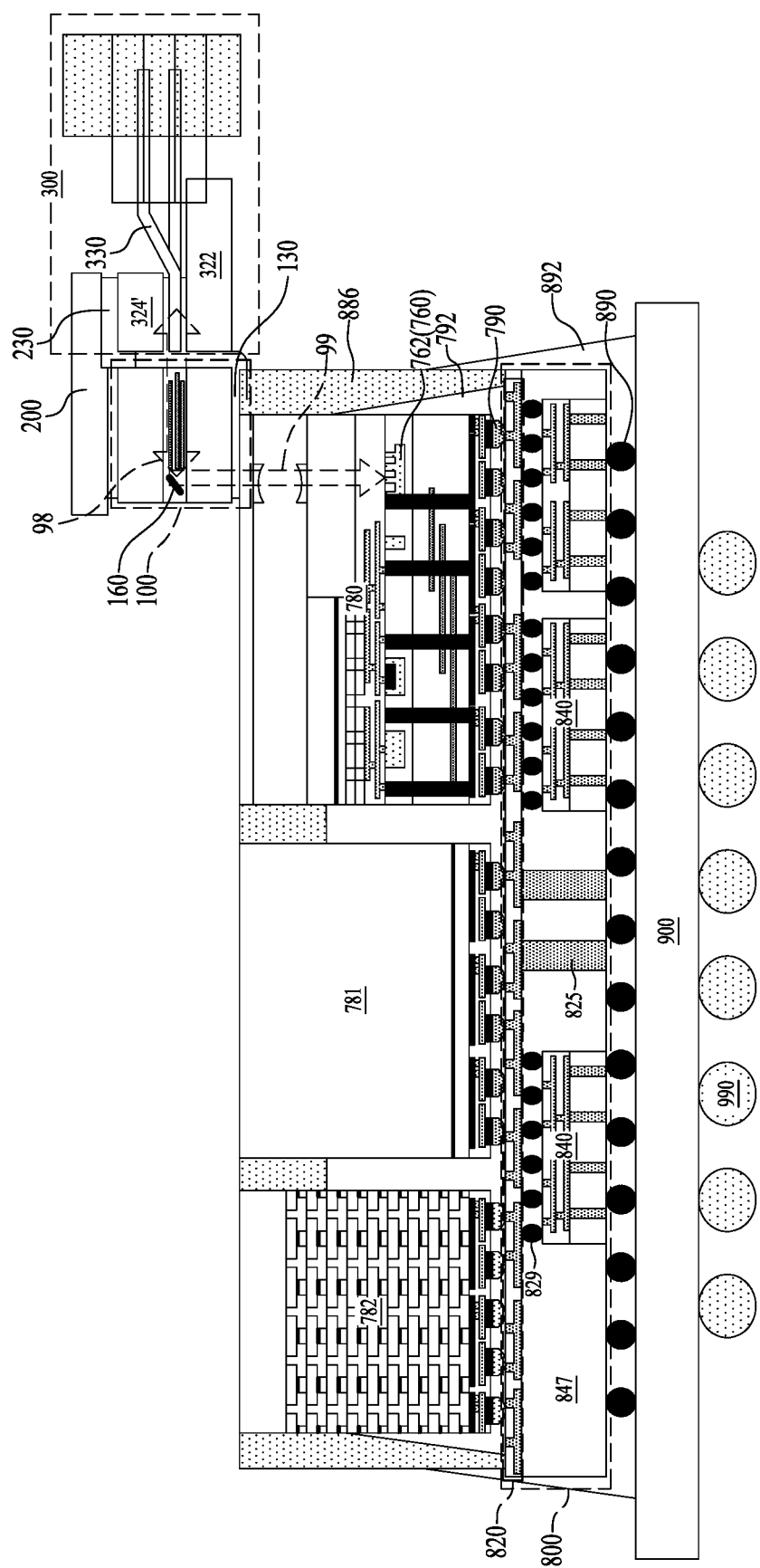

Referring to FIG. 17G, a seventh configuration of the thirteenth embodiment structure may be derived from the seventh configuration of the seventh embodiment structure illustrated in FIG. 11G by using a heat sink 200 in lieu of an encapsulation cover 120. The heat sink 200 may be attached to a top surface of an optical connector unit 100 using a TIM layer 230. In one embodiment, the heat sink 200 may extend over a fiber array units assembly 300.

Figure 17H:
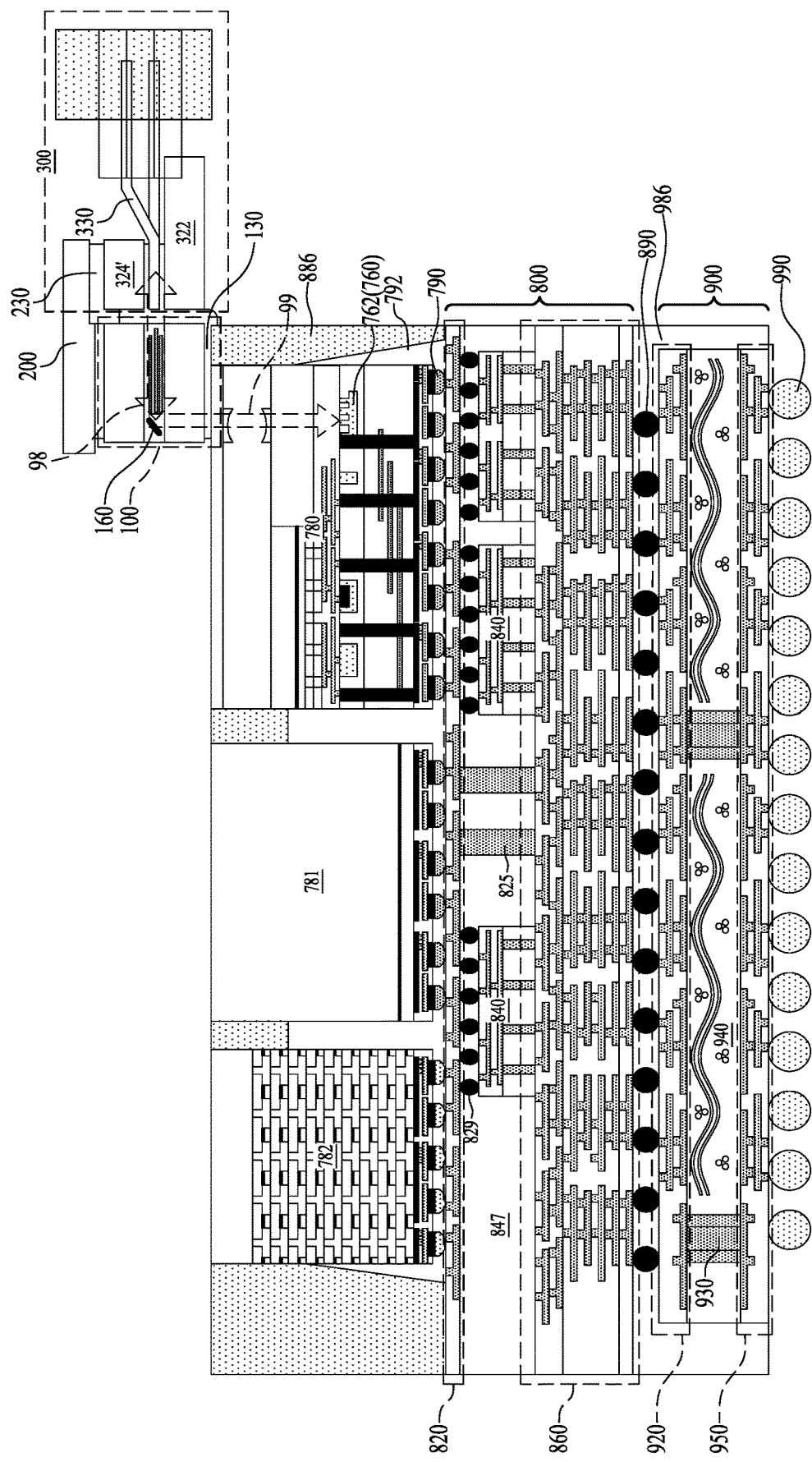

Referring to FIG. 17H, an eighth configuration of the thirteenth embodiment structure may be derived from the eighth configuration of the seventh embodiment structure illustrated in FIG. 11H by using a heat sink 200 in lieu of an encapsulation cover 120. The heat sink 200 may be attached to a top surface of an optical connector unit 100 using a TIM layer 230. In one embodiment, the heat sink 200 may extend over a fiber array units assembly 300.

FIGS. 18A-18H are vertical cross-sectional views of various configurations of a fourteenth embodiment structure according to an aspect of the present disclosure.

Figure 18A:
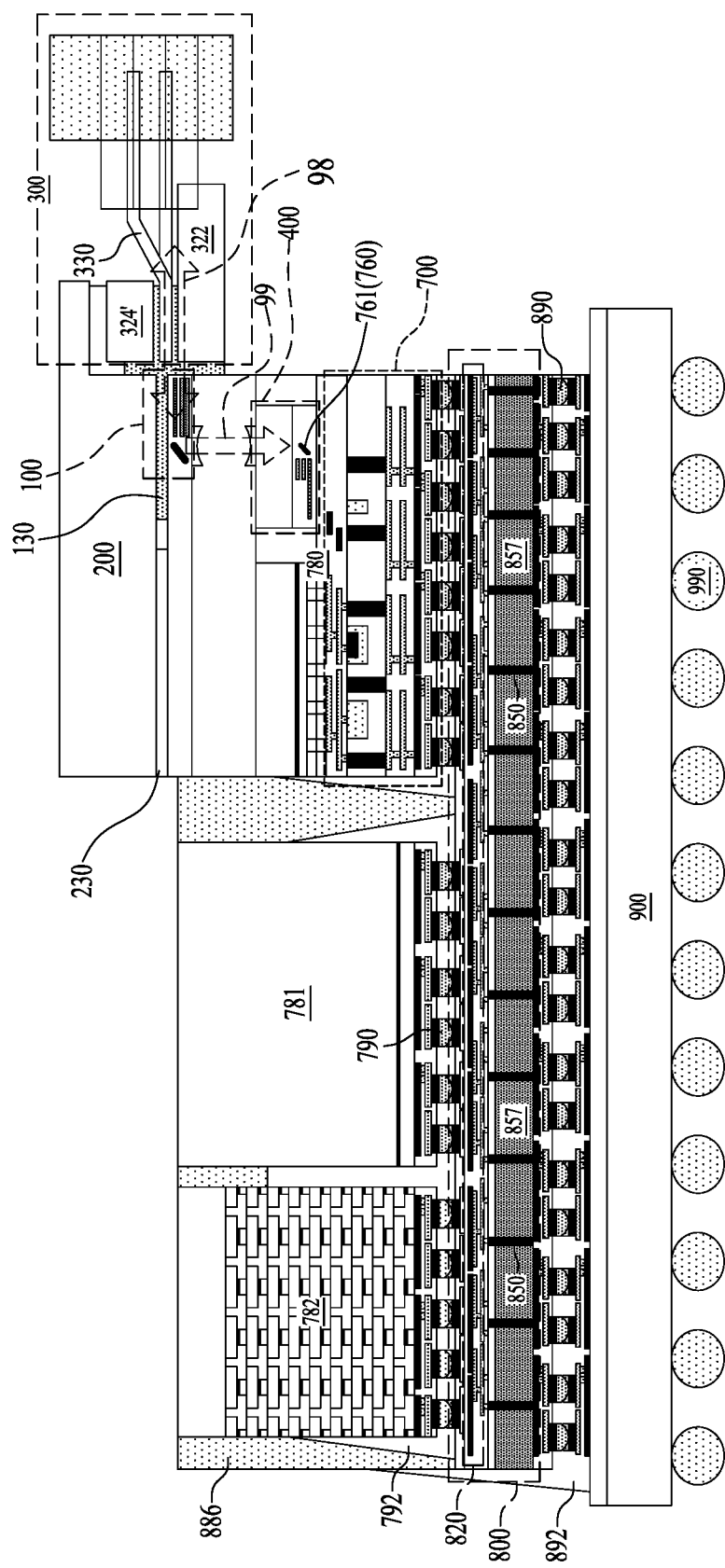
FIGS. 18A-18H are vertical cross-sectional views of various configurations of a fourteenth embodiment structure according to an aspect of the present disclosure.

Referring to FIG. 18A, a first configuration of the fourteenth embodiment structure may be derived from the seventeenth configuration of the sixth embodiment structure illustrated in FIG. 9Q by attaching a fiber array units assembly 300 to the embedded optical connector unit 100D, and by attaching a heat sink 200 to a top surface of the composite die 780 and to a top surface of the fiber array units assembly 300, such as a top surface of a spacer plate using a TIM layer 230. In one embodiment, the heat sink 200 may extend over a fiber array units assembly 300. For example, a semiconductor support plate 324', a distal support plate 324, or a capping support plate 326 of a fiber array units assembly 300 may be attached to a bottom surface of the heat sink 200 through the TIM layer 230. Generally, a support plate overlying, and contacting, a row of optical fibers 340 may be attached to a bottom surface of the heat sink 200 through the TIM layer 230. Further, a sidewall of the support plate may be attached to the heat sink 200 through an optical glue portion 130. Any of the previously described composite dies 780 may be used. An optical deflector 760 may be provided within a PIC die 700, or may be provided within an embedded optical connector die 400.

Figure 18B:
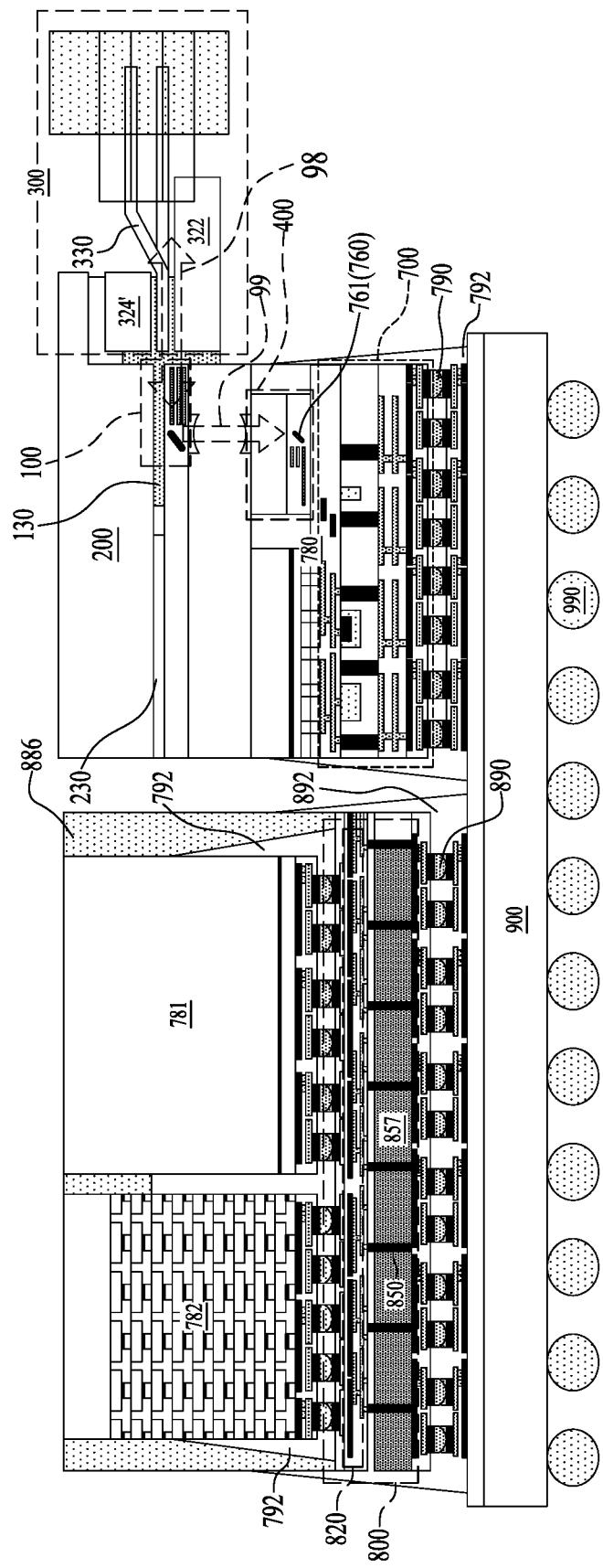

Referring to FIG. 18B, a second configuration of the fourteenth embodiment structure may be derived from the eighteenth configuration of the sixth embodiment structure illustrated in FIG. 9R by attaching a fiber array units assembly 300 to the embedded optical connector unit 100D, and by attaching a heat sink 200 to a top surface of the composite die 780 and to a top surface of the fiber array units assembly 300, such as a top surface of a spacer plate using a TIM layer 230.

Figure 18C:
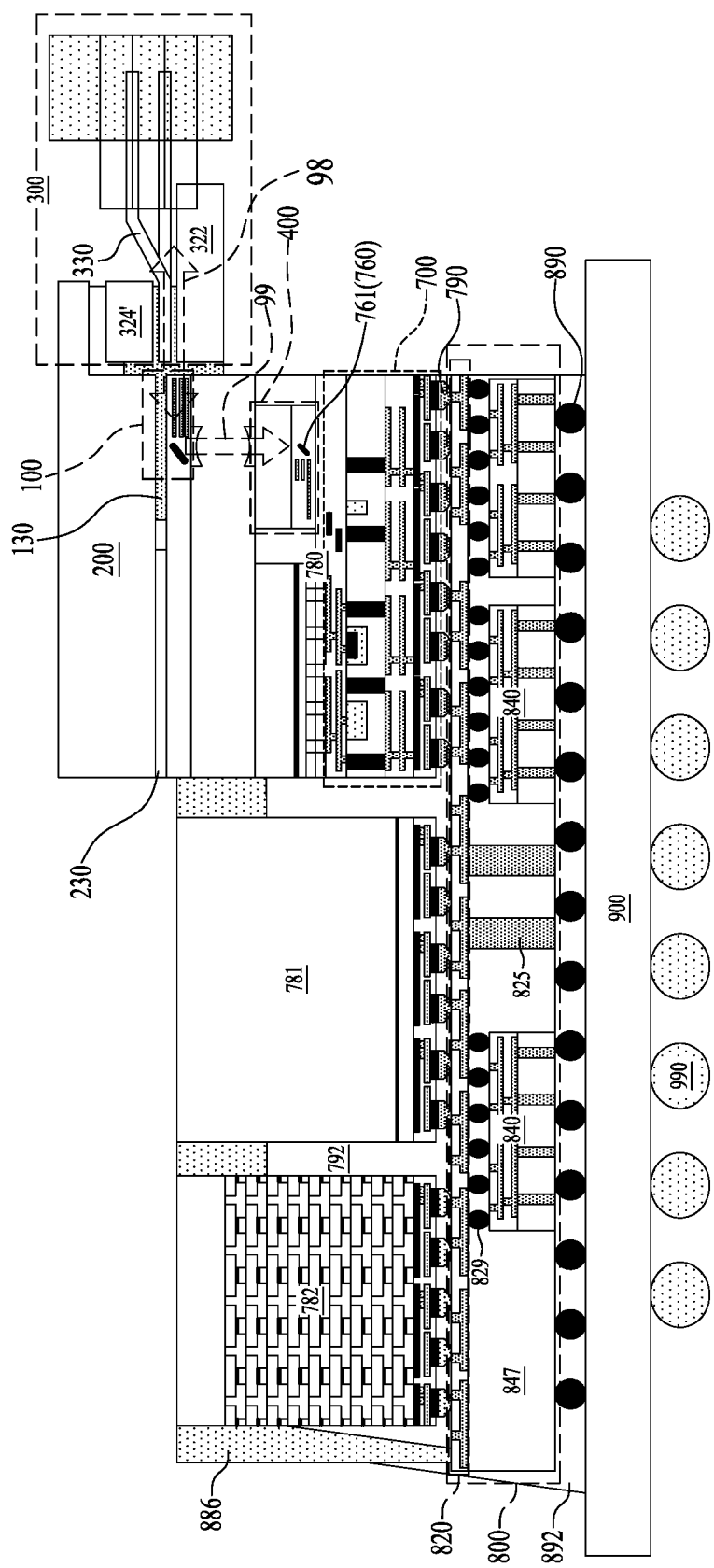

Referring to FIG. 18C, a third configuration of the fourteenth embodiment structure may be derived from the nineteenth configuration of the sixth embodiment structure illustrated in FIG. 9S by attaching a fiber array units assembly 300 to the embedded optical connector unit 100D, and by attaching a heat sink 200 to a top surface of the composite die 780 and to a top surface of the fiber array units assembly 300, such as a top surface of a spacer plate using a TIM layer 230.

Figure 18D:
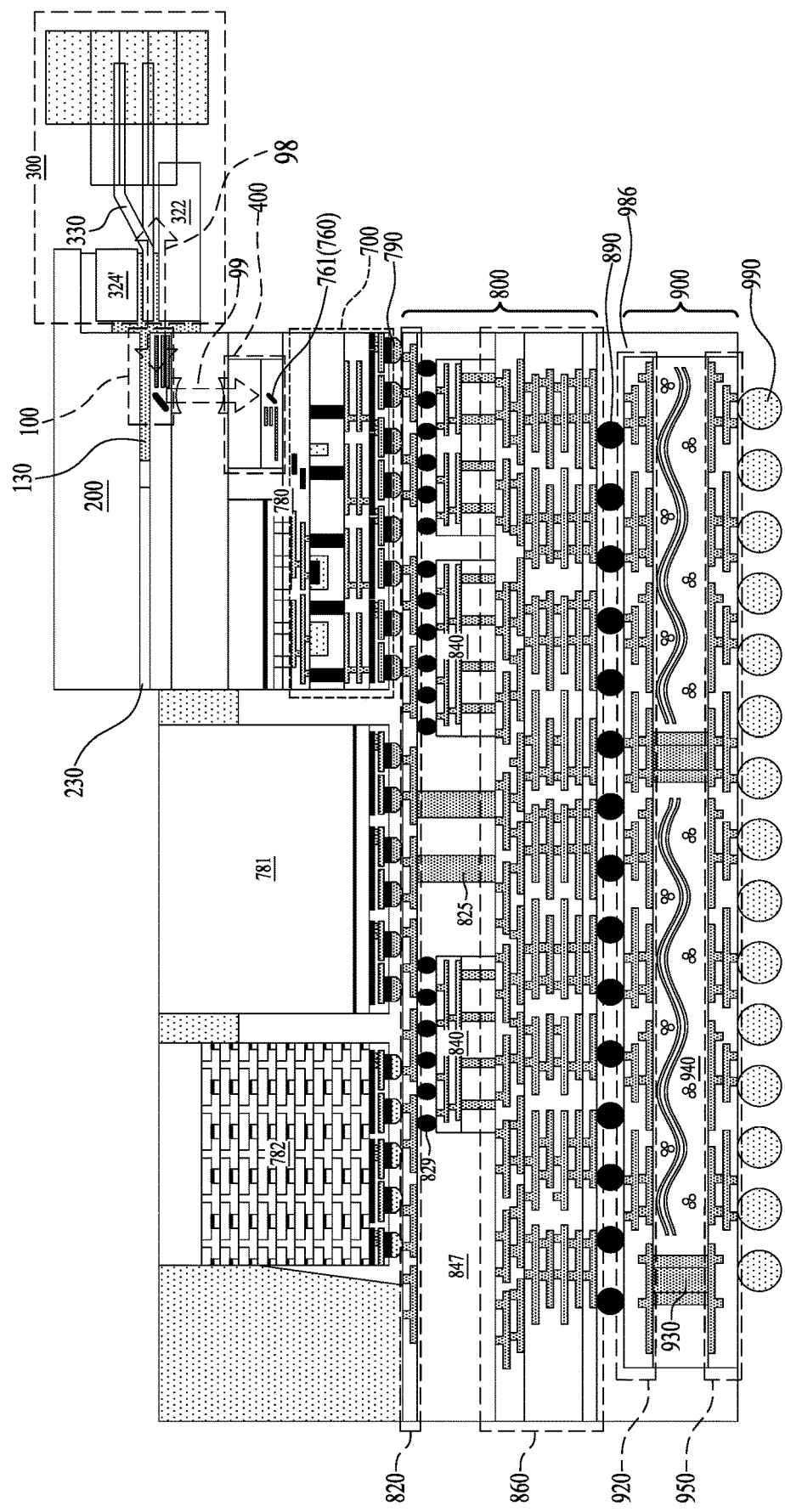

Referring to FIG. 18D, a fourth configuration of the fourteenth embodiment structure may be derived from the twentieth configuration of the sixth embodiment structure illustrated in FIG. 9T by attaching a fiber array units assembly 300 to the embedded optical connector unit 100D, and by attaching a heat sink 200 to a top surface of the composite die 780 and to a top surface of the fiber array units assembly 300, such as a top surface of a spacer plate using a TIM layer 230.

Figure 18E:
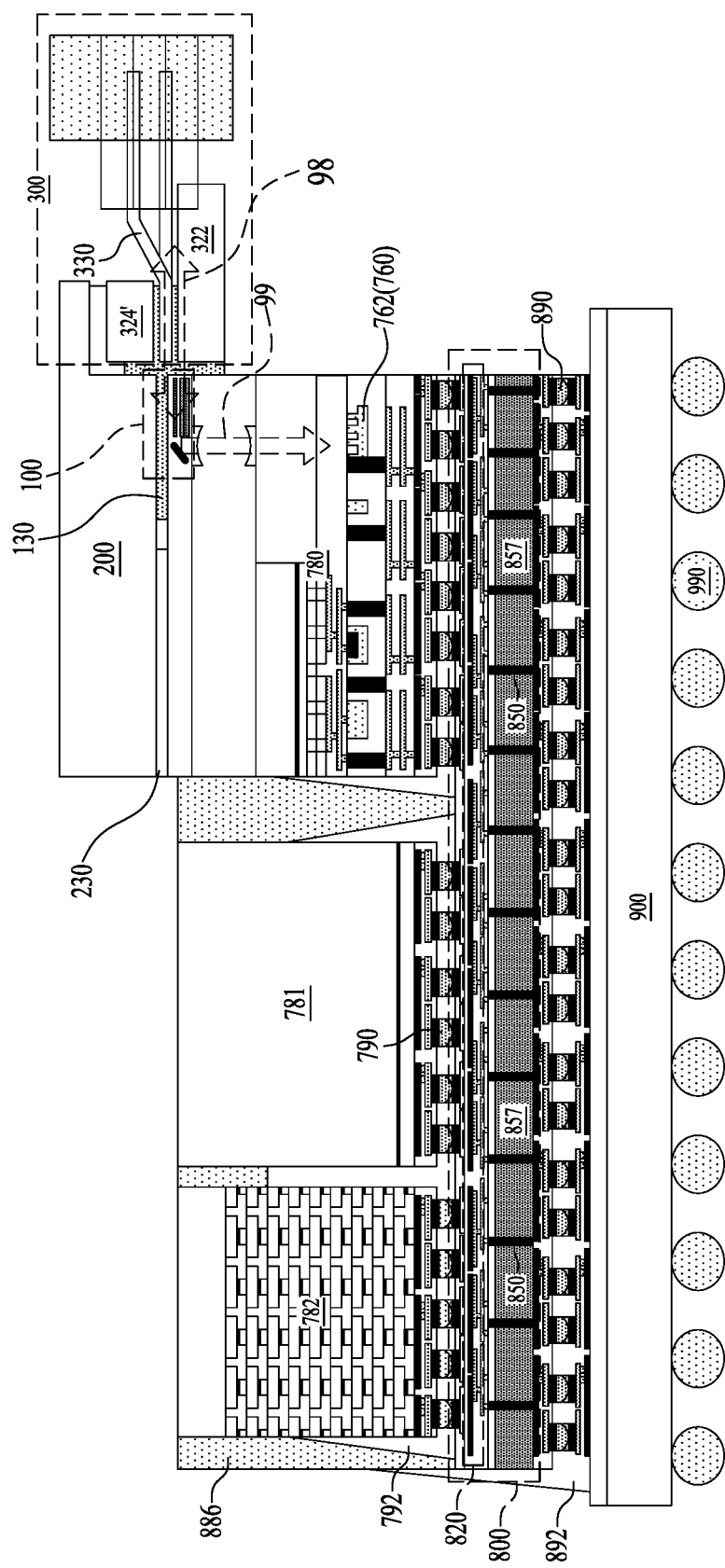

Referring to FIG. 18E, a fifth configuration of the fourteenth embodiment structure may be derived from the twenty-first configuration of the sixth embodiment structure illustrated in FIG. 9U by attaching a heat sink 200 to a top surface of the composite die 780 and to a top surface of a fiber array units assembly 300, such as a top surface of a spacer plate using a TIM layer 230.

Figure 18F:
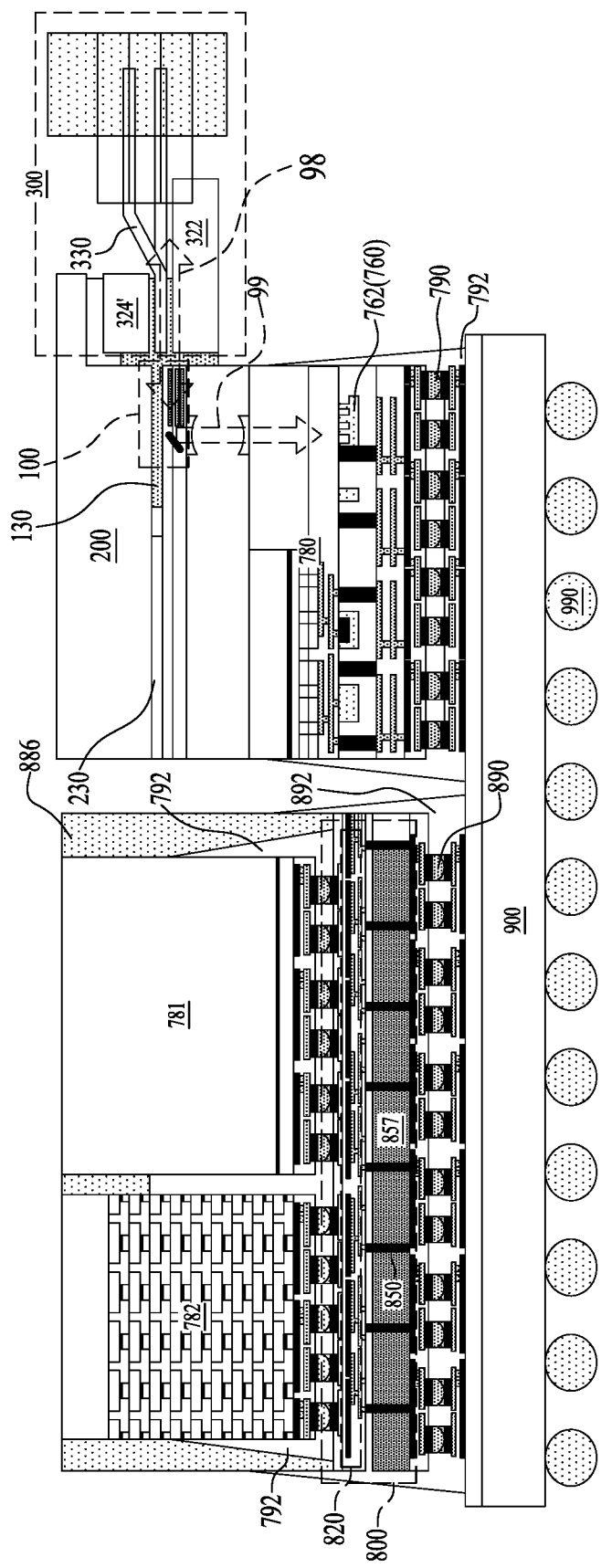

Referring to FIG. 18F, a sixth configuration of the fourteenth embodiment structure may be derived from the twenty-second configuration of the sixth embodiment structure illustrated in FIG. 9V by attaching a heat sink 200 to a top surface of the composite die 780 and to a top surface of a fiber array units assembly 300, such as a top surface of a spacer plate using a TIM layer 230.

Figure 18G:
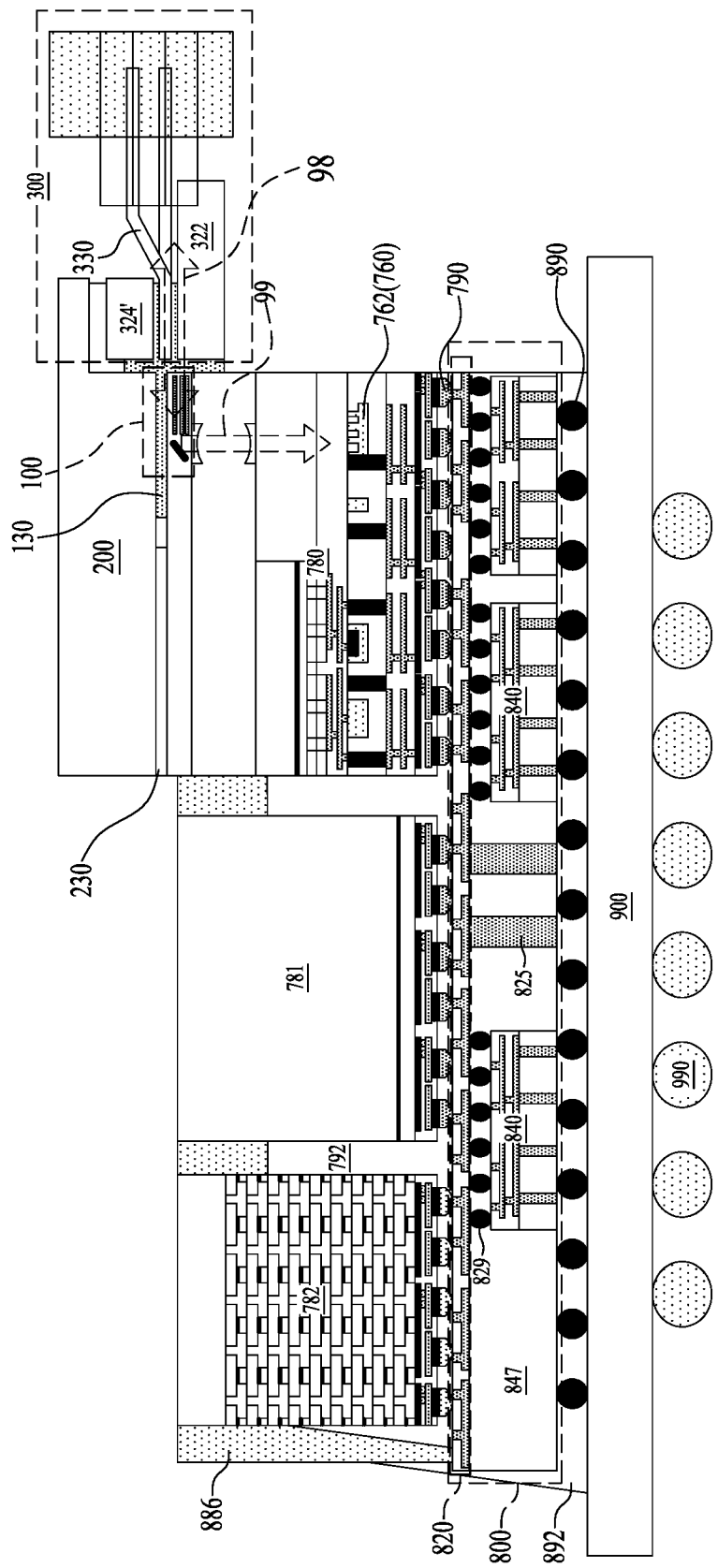

Referring to FIG. 18G, a seventh configuration of the fourteenth embodiment structure may be derived from the twenty-third configuration of the sixth embodiment structure illustrated in FIG. 9W by attaching a heat sink 200 to a top surface of the composite die 780 and to a top surface of a fiber array units assembly 300, such as a top surface of a spacer plate using a TIM layer 230.

Figure 18H:
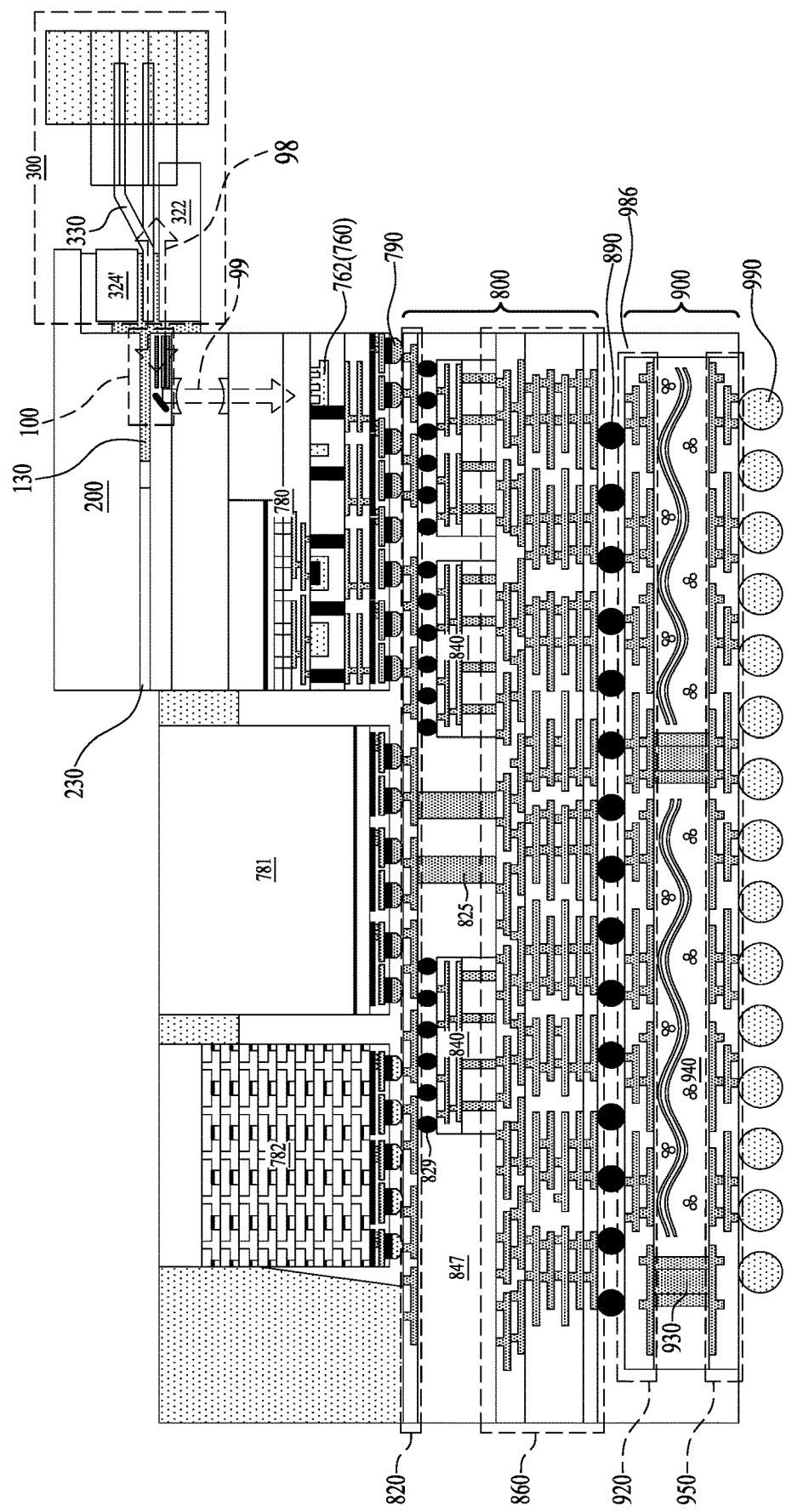

Referring to FIG. 18H, an eighth configuration of the fourteenth embodiment structure may be derived from the twenty-fourth configuration of the sixth embodiment structure illustrated in FIG. 9X by attaching a heat sink 200 to a top surface of the composite die 780 and to a top surface of a fiber array units assembly 300, such as a top surface of a spacer plate using a TIM layer 230.

FIGS. 19A-19H are vertical cross-sectional views of various configurations of a fifteenth embodiment structure according to an aspect of the present disclosure.

Figure 19A:
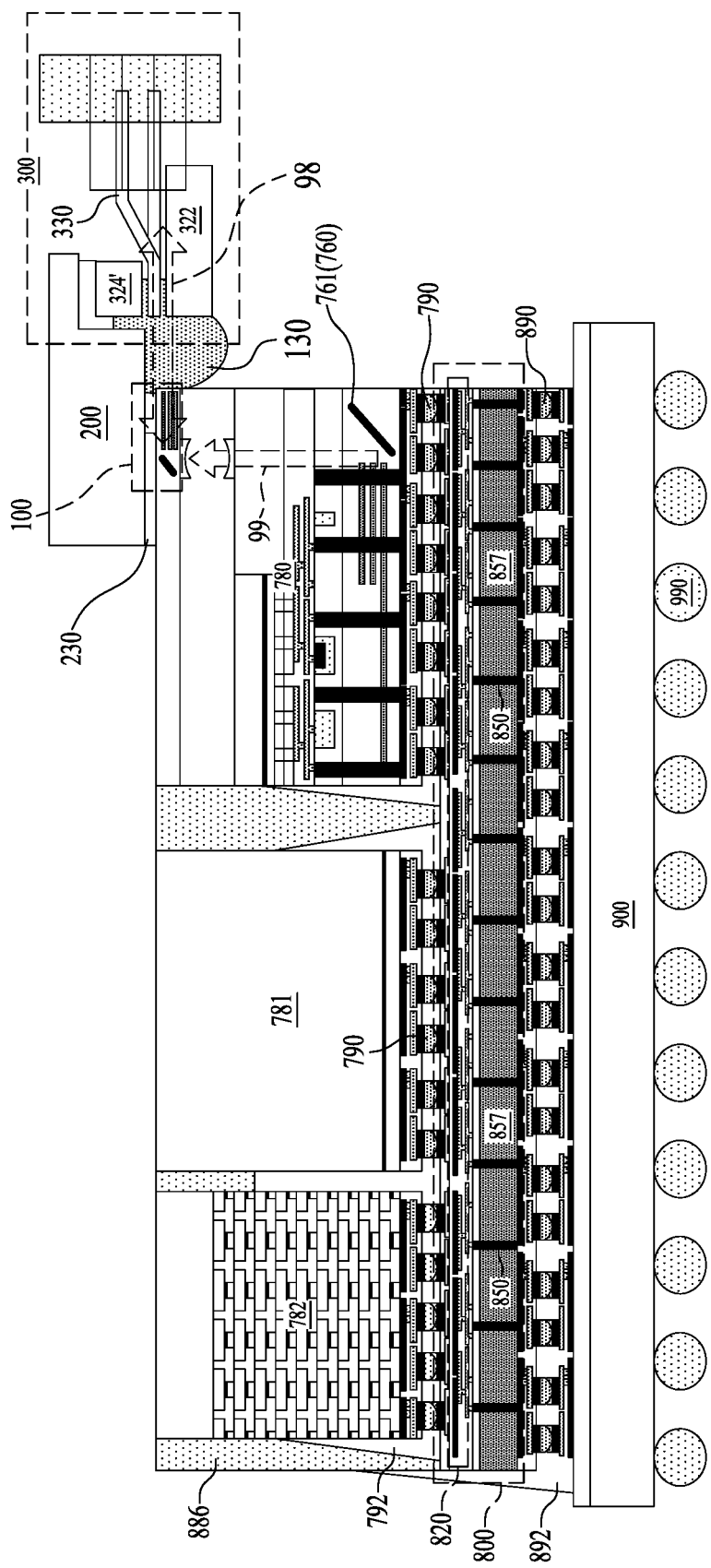
FIGS. 19A-19H are vertical cross-sectional views of various configurations of a fifteenth embodiment structure according to an aspect of the present disclosure.

Referring to FIG. 19A, a first configuration of the fifteenth embodiment structure may be derived from the first configuration of the fourteenth embodiment structure illustrated in FIG. 18A by increasing the thickness of a region of the optical glue portion 130 between a sidewall of the composite die 780 and a sidewall of a fiber array units assembly 300 (such as a sidewall of a proximal support plate 322). In this embodiment, the lateral spacing between the sidewall of the composite die 780 and the sidewall of a fiber array units assembly 300 (which may equal the thickness of the region of the optical glue portion 130) may be in a range from 50 microns to 1 mm, such as from 100 microns to 500 microns. The horizontally-extending optical path 98 includes a region of the optical glue portion 130.

Figure 19B:
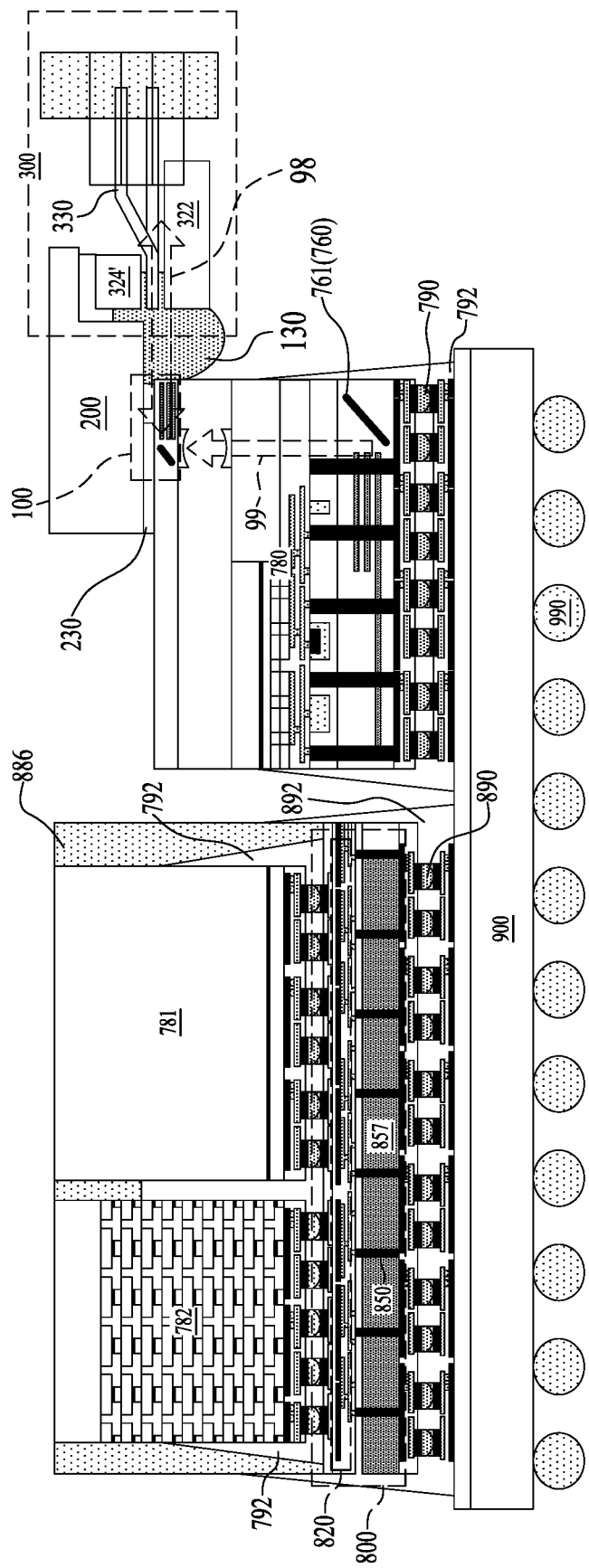

Referring to FIG. 19B, a second configuration of the fifteenth embodiment structure may be derived from the second configuration of the fourteenth embodiment structure illustrated in FIG. 18B by increasing the thickness of a region of the optical glue portion 130 between a sidewall of the composite die 780 and a sidewall of a fiber array units assembly 300.

Figure 19C:
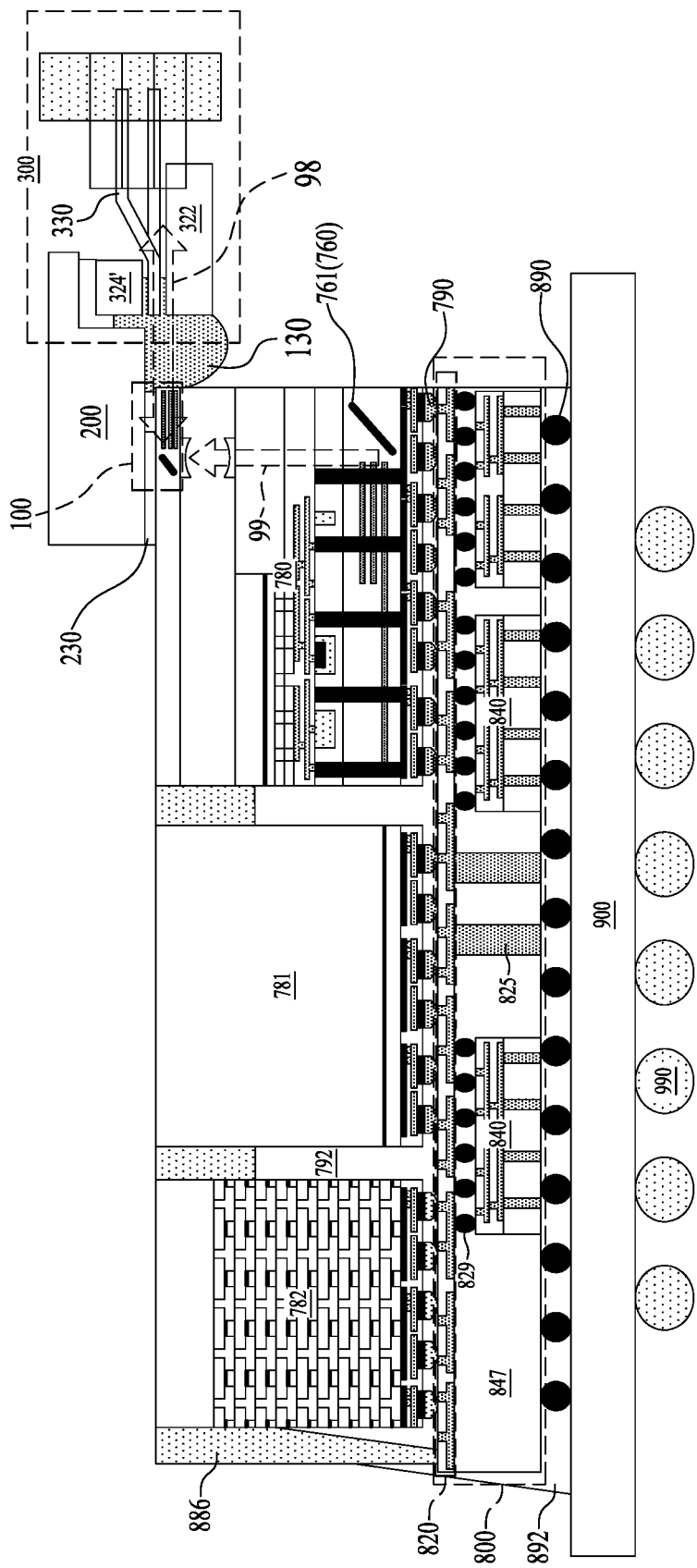

Referring to FIG. 19C, a third configuration of the fifteenth embodiment structure may be derived from the third configuration of the fourteenth embodiment structure illustrated in FIG. 18C by increasing the thickness of a region of the optical glue portion 130 between a sidewall of the composite die 780 and a sidewall of a fiber array units assembly 300.

Figure 19D:
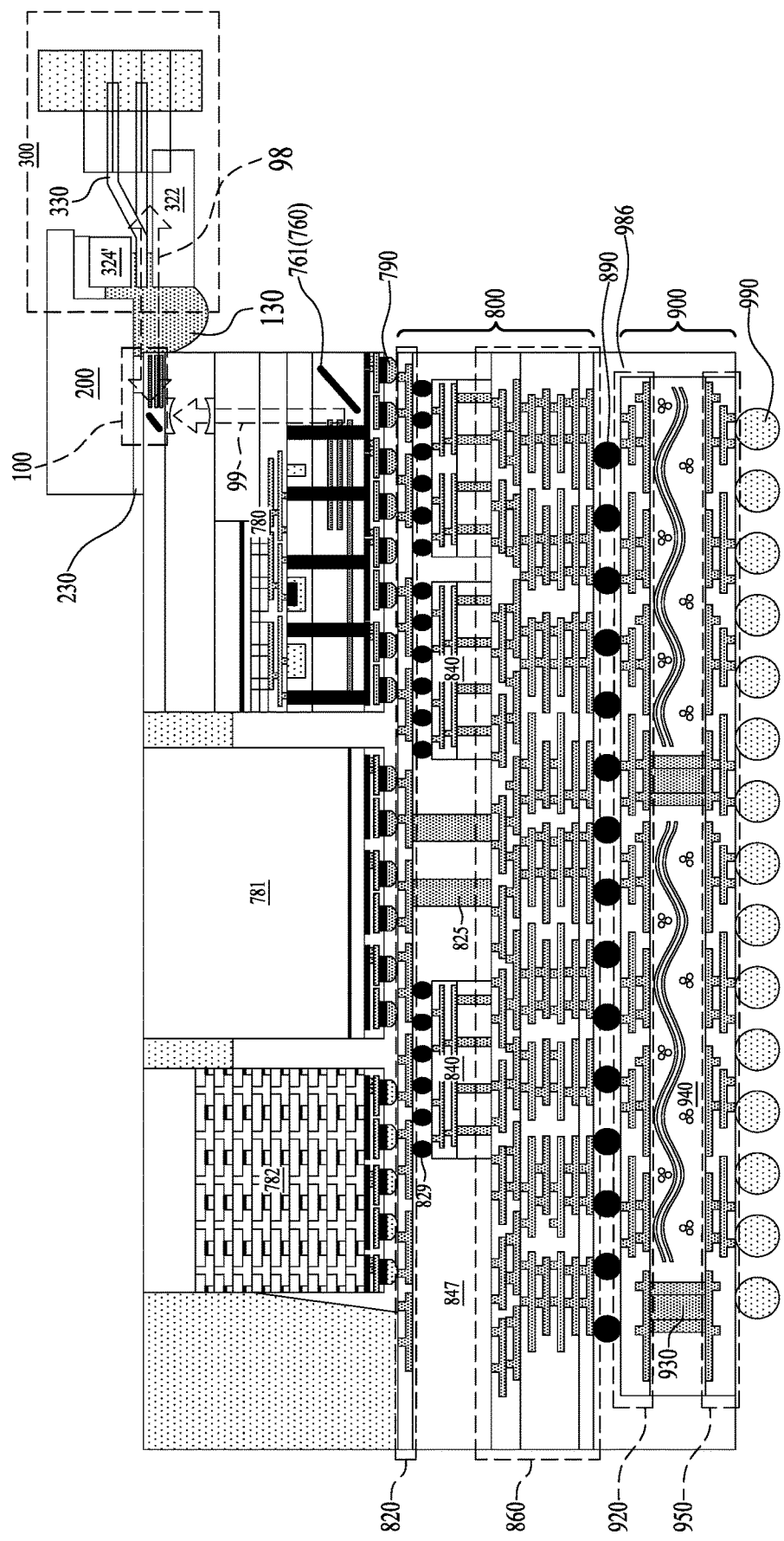

Referring to FIG. 19D, a fourth configuration of the fifteenth embodiment structure may be derived from the fourth configuration of the fourteenth embodiment structure illustrated in FIG. 18D by increasing the thickness of a region of the optical glue portion 130 between a sidewall of the composite die 780 and a sidewall of a fiber array units assembly 300.

Figure 19E:
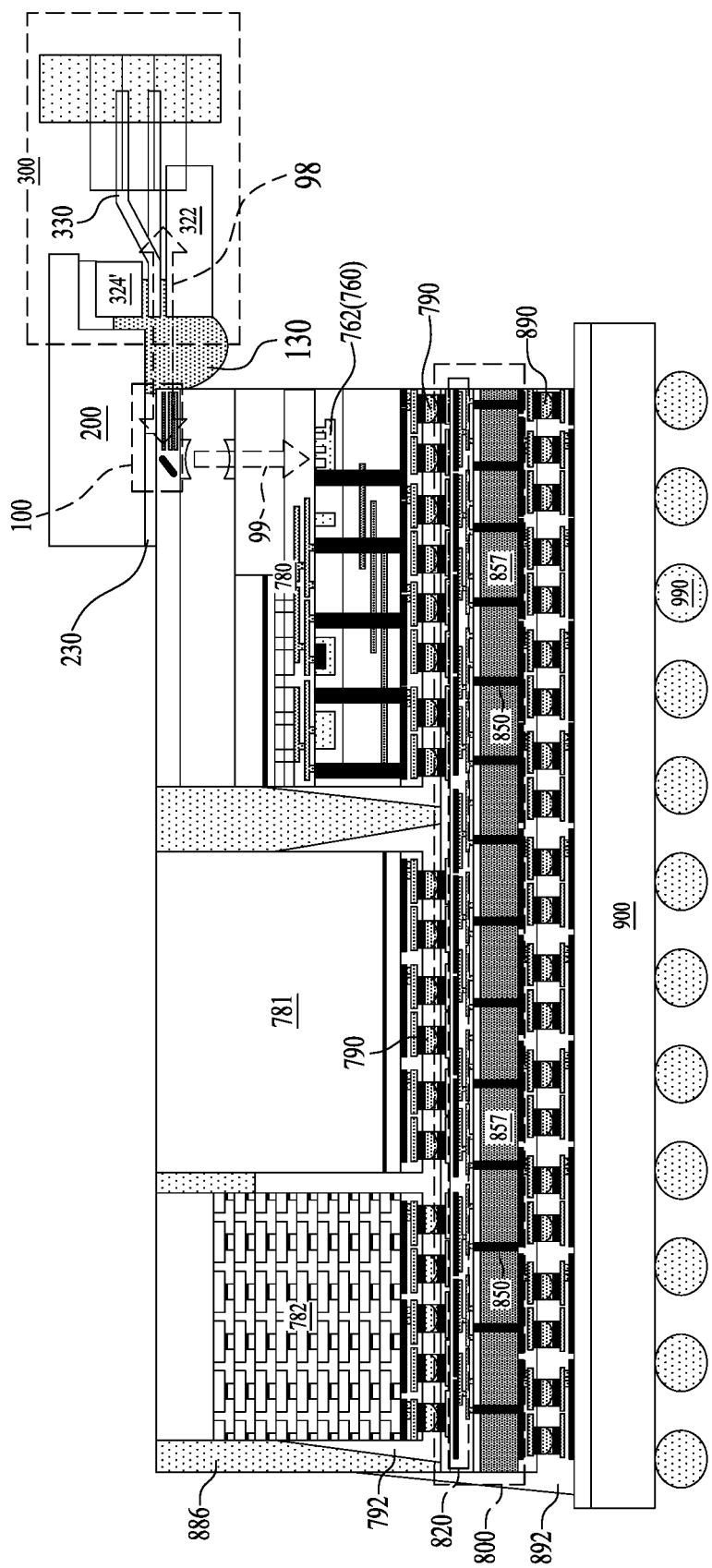

Referring to FIG. 19E, a fifth configuration of the fifteenth embodiment structure may be derived from the fifth configuration of the fourteenth embodiment structure illustrated in FIG. 18E by increasing the thickness of a region of the optical glue portion 130 between a sidewall of the composite die 780 and a sidewall of a fiber array units assembly 300.

Figure 19F:
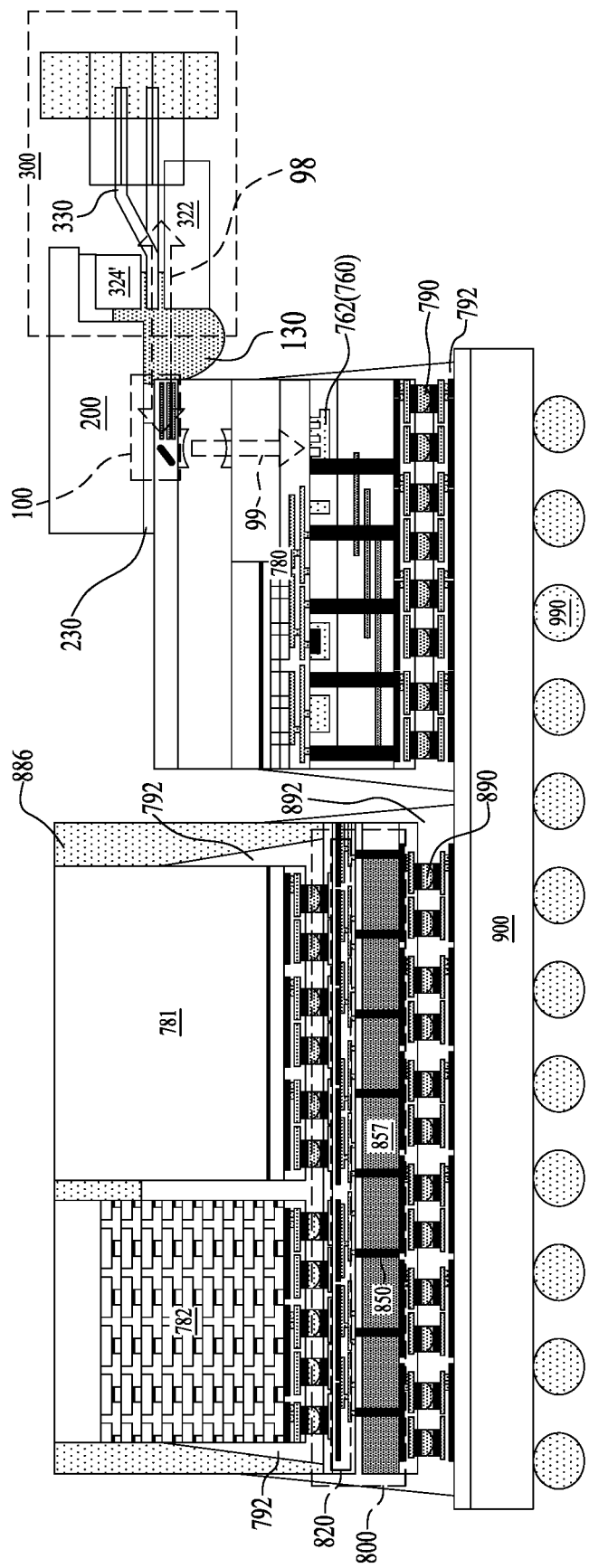

Referring to FIG. 19F, a sixth configuration of the fifteenth embodiment structure may be derived from the sixth configuration of the fourteenth embodiment structure illustrated in FIG. 18F by increasing the thickness of a region of the optical glue portion 130 between a sidewall of the composite die 780 and a sidewall of a fiber array units assembly 300.

Figure 19G:
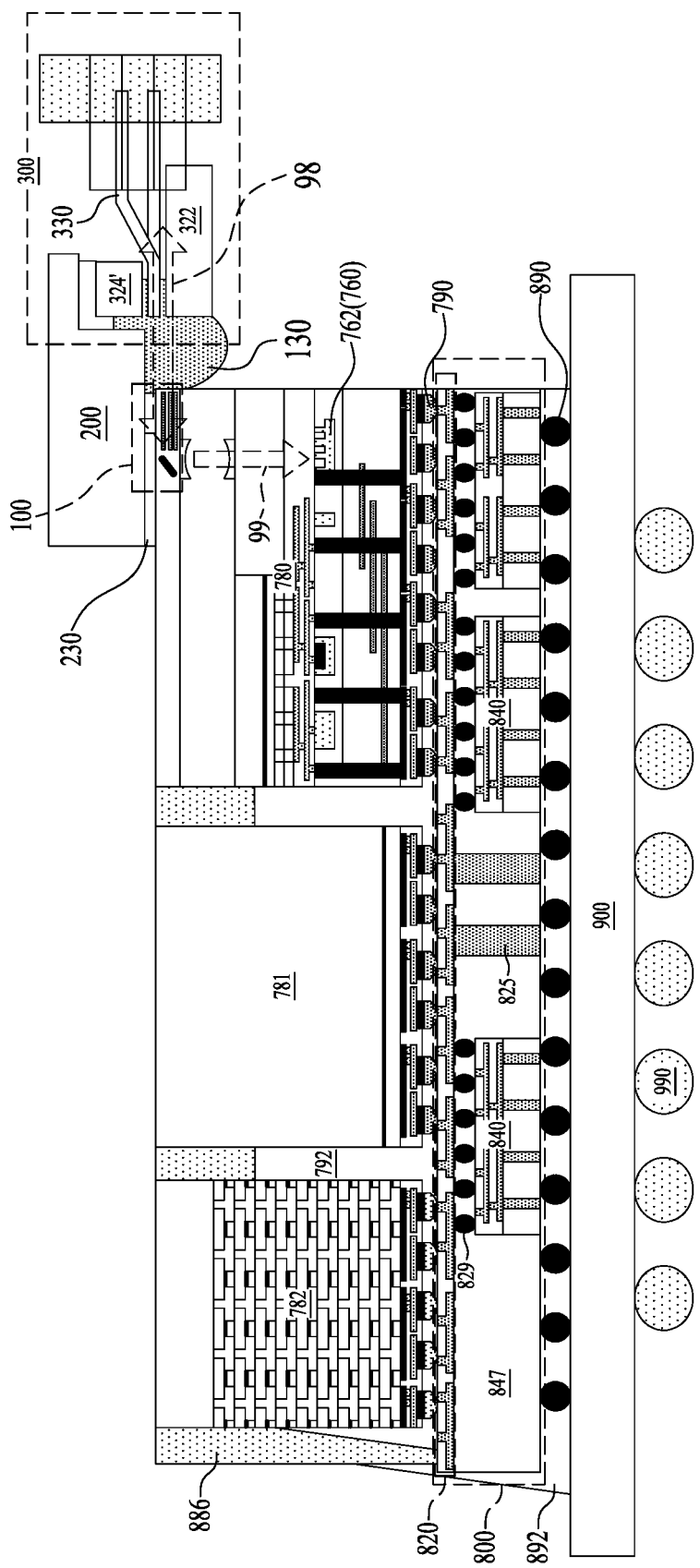

Referring to FIG. 19G, a seventh configuration of the fifteenth embodiment structure may be derived from the seventh configuration of the fourteenth embodiment structure illustrated in FIG. 18G by increasing the thickness of a region of the optical glue portion 130 between a sidewall of the composite die 780 and a sidewall of a fiber array units assembly 300.

Figure 19H:
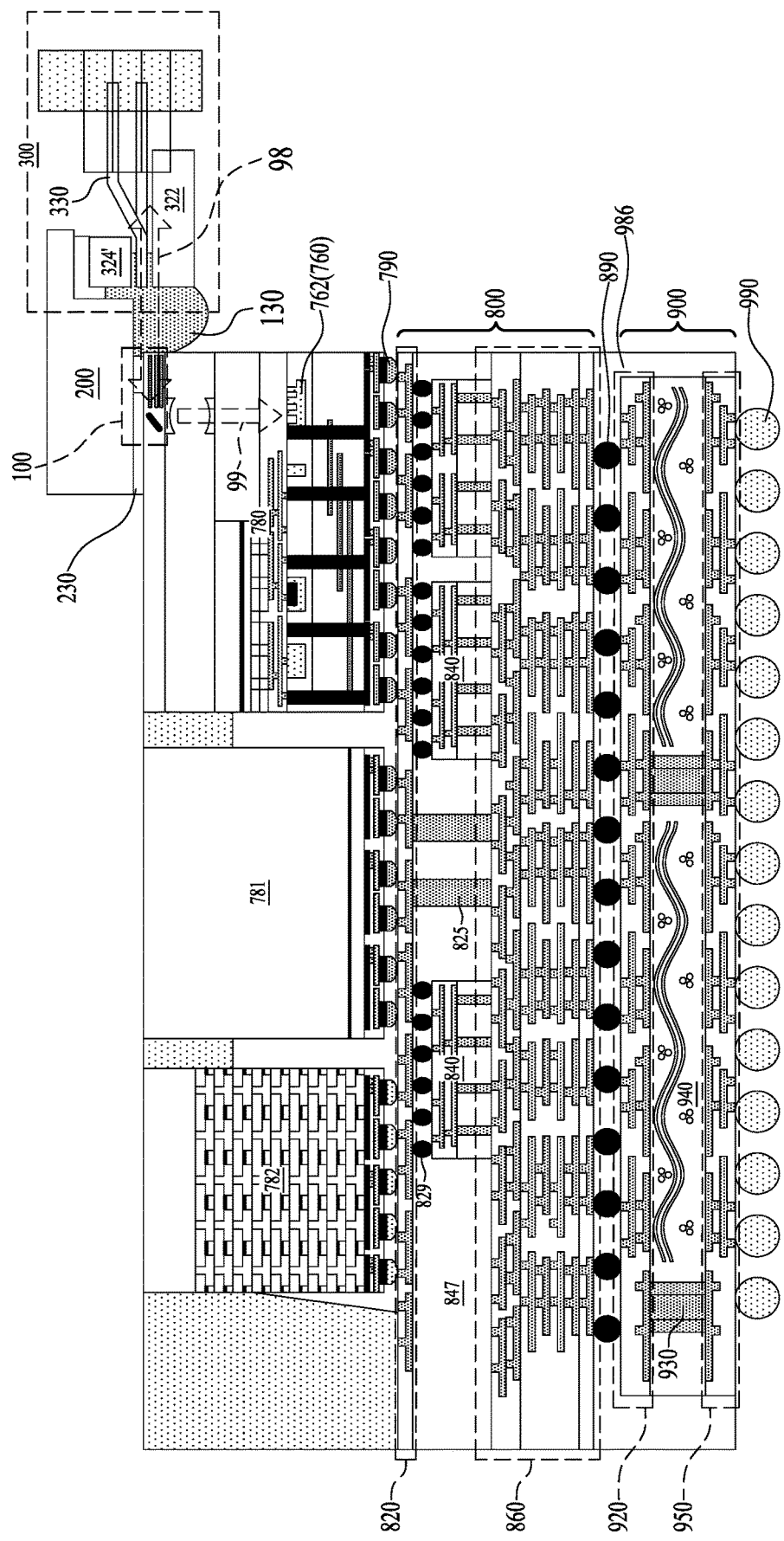

Referring to FIG. 19H, an eighth configuration of the fifteenth embodiment structure may be derived from the eighth configuration of the fourteenth embodiment structure illustrated in FIG. 18H by increasing the thickness of a region of the optical glue portion 130 between a sidewall of the composite die 780 and a sidewall of a fiber array units assembly 300.

Referring collectively to FIGS. 16A-19H, a heat sink 200 may be attached to the composite die 780 and an optical connector unit 100. In some embodiment, the heat sink 200 covers an entire area of the optical connector unit 100 upon attachment to the optical connector unit 100. The various embodiment structures of FIGS. 16A-19H comprises a photonic assembly including a composite die 780, an optical connector unit 100, and a heat sink 200. The composite die 780 includes a photonic integrated circuits (PIC) die 700 and an electronic integrated circuits (EIC) die 600. The PIC die 700 comprises waveguides 740 and photonic devices 750 therein, and the EIC die 600 comprises semiconductor devices 620 therein. The optical connector unit 100 comprises a first connector-side mirror reflector 160 and a first transition edge coupler 140. The first connector-side mirror reflector 160 is configured to change a beam direction between a vertically-extending beam path 99 through the composite die 780 and a horizontally-extending beam path 98 through the first transition edge coupler 140. The heat sink overlies the composite die 780, and is attached to the composite die 780.

In one embodiment, the composite die 780 comprises an optically transparent dielectric layer 580 overlying a top surface of the support semiconductor substrate 510. The optical connector unit 100 is located over the optically transparent dielectric layer 580. In one embodiment, the optical connector unit 100 comprises an optical connector die (100A, 100B, 100C) that is attached to a top surface of the composite die 780. In one embodiment, the composite die 780 comprises a support semiconductor substrate 510 interposed between the PIC die 700 and the optical connector unit 100, and an optically transparent dielectric layer 580 overlying a top surface of the support semiconductor substrate 510. In one embodiment, the optical connector unit 100 is embedded within the optically transparent dielectric layer 580.

In one embodiment, the heat sink 200 covers an entire area of the first connector-side mirror reflector 160. In one embodiment, the photonic assembly comprises a fiber array units assembly 300 attached to a sidewall of the optical connector unit 100. In one embodiment, the heat sink 200 overlies an edge portion of the fiber array units assembly 300. In one embodiment, the heat sink 200 is attached to the fiber array units assembly 300 through at least one of a thermal interface material layer 230 and an optical glue portion 130.

Figure 20A:
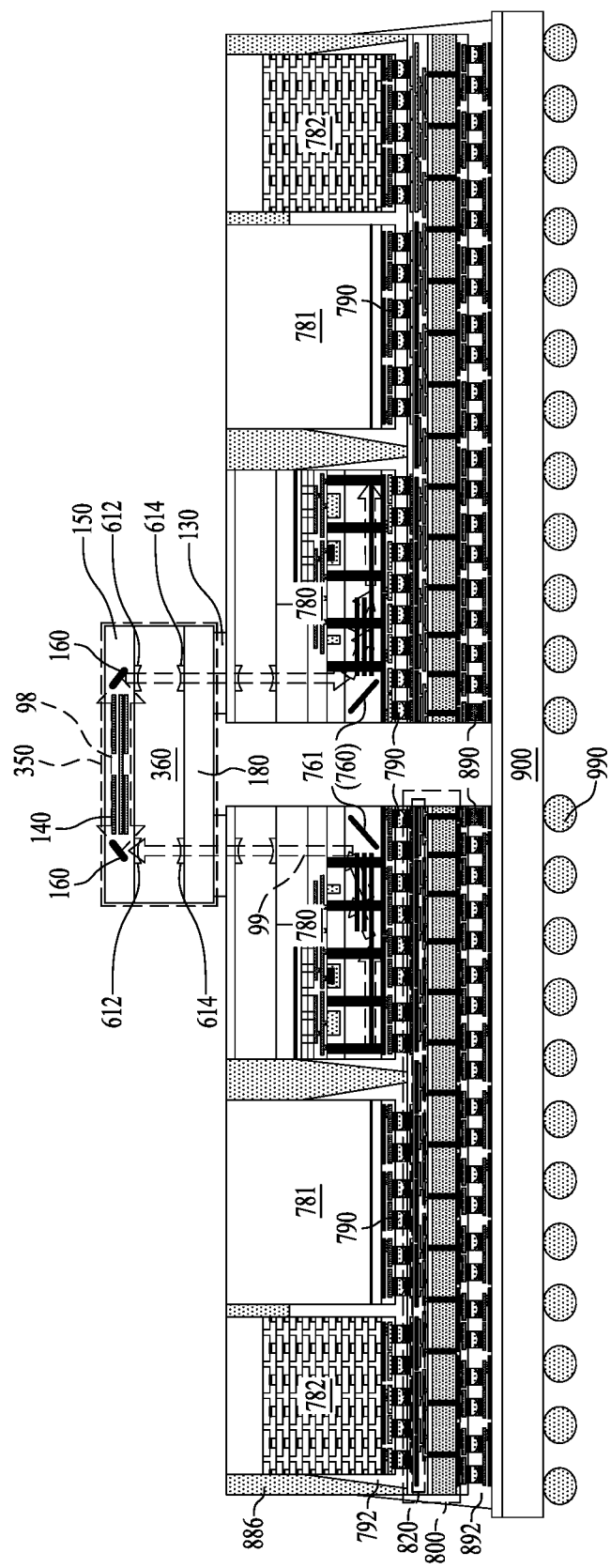
FIG. 20A is a vertical cross-sectional view of a sixteenth embodiment structure according to an aspect of the present disclosure.
Figure 20B:
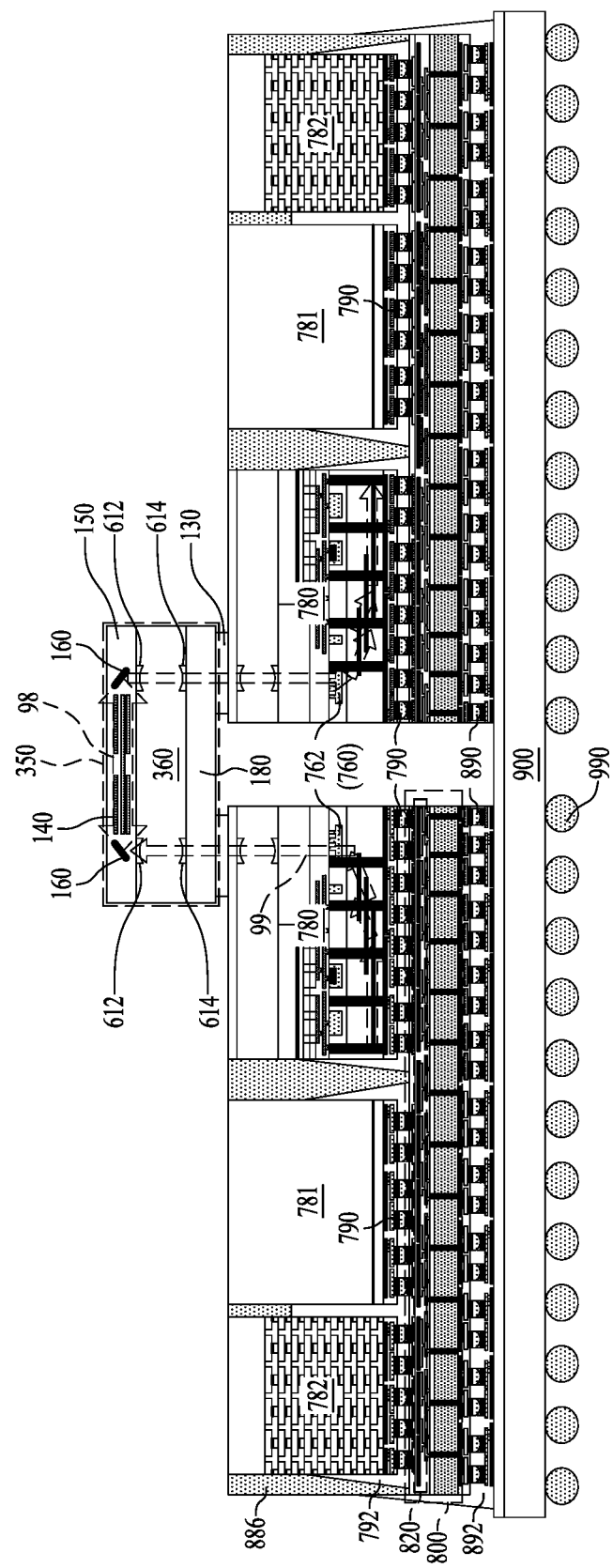
FIG. 20B is a vertical cross-sectional view of an alternative configuration of the sixteenth embodiment structure according to an embodiment of the present disclosure.

FIG. 20A is a vertical cross-sectional view of a sixteenth embodiment structure according to an aspect of the present disclosure. FIG. 20B is a vertical cross-sectional view of an alternative configuration of the sixteenth embodiment structure according to an embodiment of the present disclosure.

Referring to FIGS. 20A and 20B, the sixteenth embodiment structure of its alternative configuration may be formed by proving two photonic assemblies each comprising an interposer 800 and a set of semiconductor dies (780, 781, 782). Each set of semiconductor dies (780, 781, 782) may comprise a composite die 780 and at least one semiconductor die (such as at least one ASIC die 781 and/or at least one memory die 782) that are attached to the interposer 800. For example, each photonic assembly may be derived from the embodiment structure illustrated in FIG. 9A as modified by removing the packaging substrate 900 and the solder joints 990. The two photonic assemblies may be bonded to a packaging substrate 900, which has a sufficient area for bonding the two photonic assemblies. The two composite dies 780 may be positioned adjacent to each other, and a first underfill material portion 792 may fill the gap therebetween.

According to an aspect of the present disclosure, an optical bridge die 350 may be attached to the top surfaces of the two composite dies 780 using optical glue portions 130. In one embodiment, the optical bridge die 350 comprises a bridge substrate 360, which may comprise a silicon substrate. A dielectric matrix layer 150 embedding first connector-side mirror reflector 160, a second connector-side mirror reflector 160, and transition edge couplers 140 may be formed on one side of the bridge substrate 360. A backside transparent layer 180 may be formed on an opposite side of the bridge substrate 360. The first connector-side mirror reflector 160 is positioned such that the first connector-side mirror reflector 160 intersects a first vertically-extending beam path 99 of a first composite die 780 of the two composite dies 780. The second connector-side mirror reflector 160 is positioned such that the second connector-side mirror reflector 160 intersects a second vertically-extending beam path 99 of a second composite die 780 of the two composite dies 780. Substrate lenses (612, 614) may be formed on surfaces of the bridge substrate 360 at the vertically-extending beam paths 99 such that optical beams traveling along the vertically-extending beam paths 99 are re-focused by the substrate lenses (612, 614).

A continuous beam path is provided between photonic devices in the first composite die 780 and photonic devices in the second composite die 780. The continuous beam path comprises a horizontally-extending beam path extending between photonic devices and a first optical deflector 760 (which may comprise an in-die mirror 761 as in FIG. 20A or as a grating coupler 762 as in FIG. 20B) within the first composite die 780, a first vertically-extending beam path from the first optical deflector 760 to a first connector-side mirror reflector 160, a horizontally-extending beam path 98 that extends through the transition edge couplers 140, a second vertically-extending beam path from a second connector-side mirror reflector 160 to a second optical deflector 760 (which may comprise an in-die mirror 761 as in FIG. 20A or as a grating coupler 762 as in FIG. 20B), and a horizontally-extending beam path extending between a second optical deflector 760 (which may comprise an in-die mirror 761 as in FIG. 20A or as a grating coupler 762 as in FIG. 20B) and photonic devices within the second composite die 780. In one embodiment, the transition edge couplers 140 may comprise at least one waveguide that continuously extends between the first connector-side mirror reflector 160 and the second connector-side mirror reflector 160. The continuous beam path functions as an optical communication path between the two composite dies 780, and does not use any portion of the interposer 800.

Figure 21A:
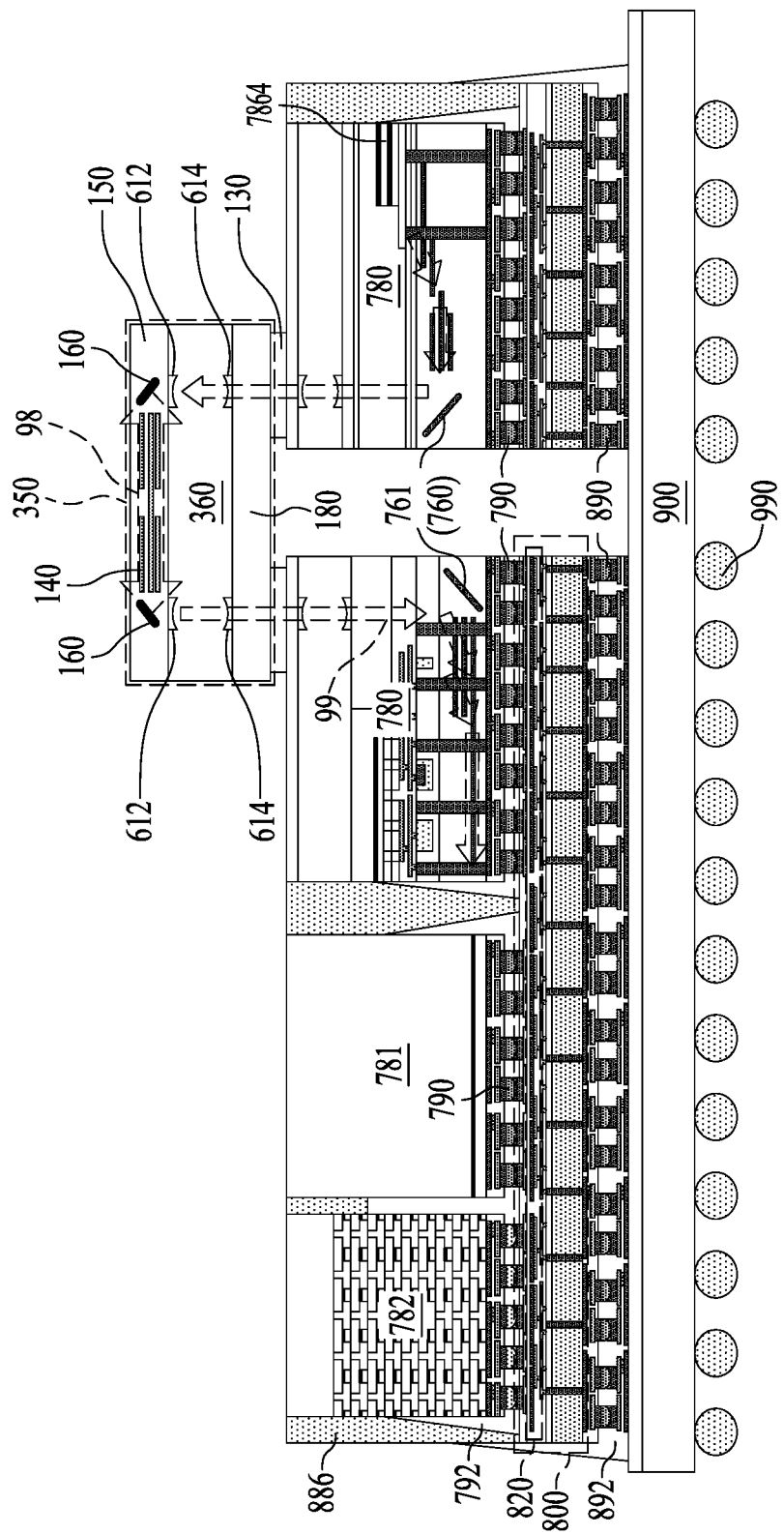
FIG. 21A is a vertical cross-sectional view of a seventeenth embodiment structure according to an aspect of the present disclosure.
Figure 21B:
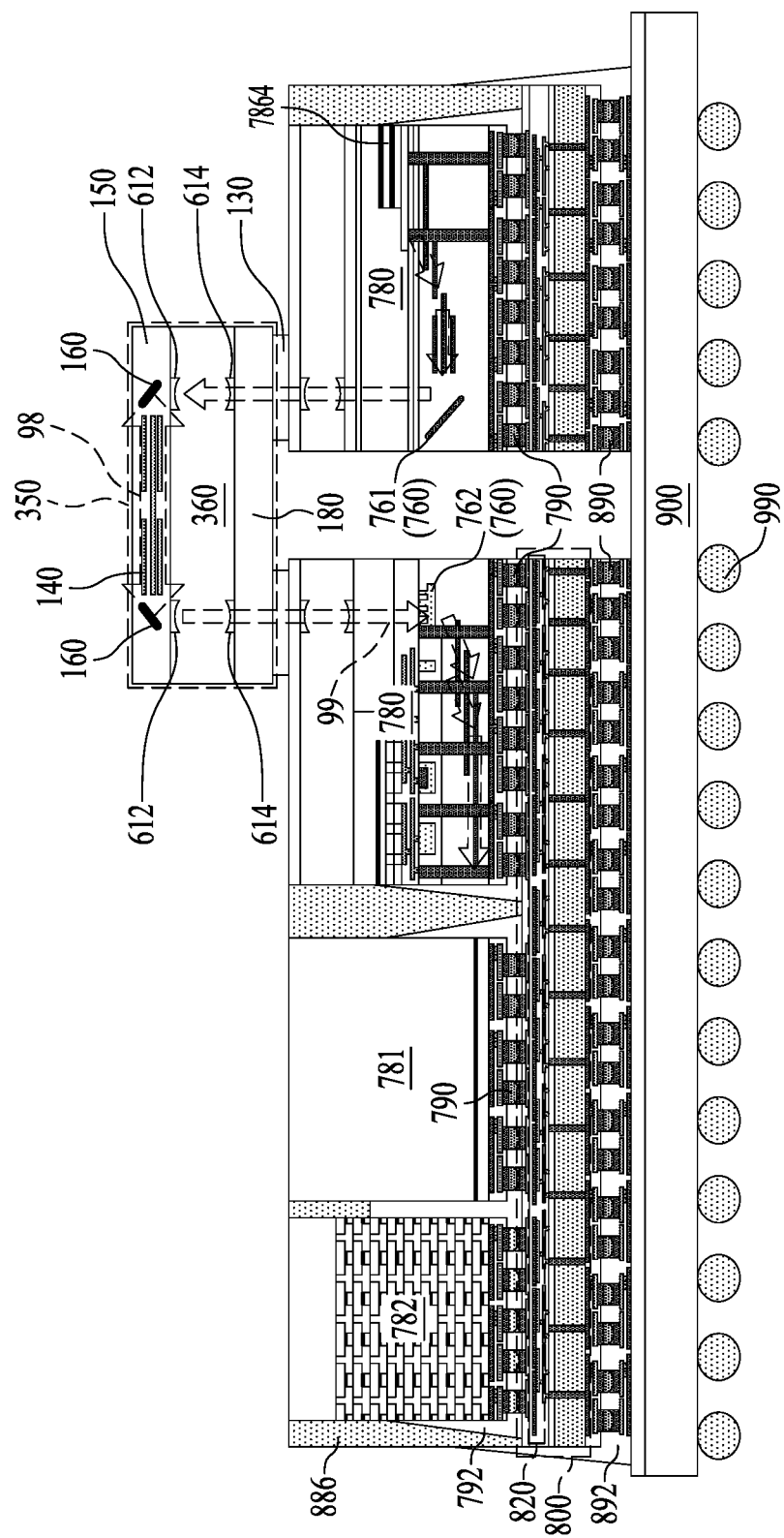
FIG. 21B is a vertical cross-sectional view of an alternative configuration of the seventeenth embodiment structure according to an embodiment of the present disclosure.

FIG. 21A is a vertical cross-sectional view of a seventeenth embodiment structure according to an aspect of the present disclosure. FIG. 21B is a vertical cross-sectional view of an alternative configuration of the seventeenth embodiment structure according to an embodiment of the present disclosure.

Referring to FIGS. 21A and 21B, the seventeenth embodiment structure and its alternative configuration may be derived from the sixteenth embodiment structure and/or its alternative configuration by using a single interposer 800 in lieu of two interposers 800 in the sixteenth embodiment structure (or its alternative configuration). In this embodiment, the optical bridge die 350 may be attached to the first composite die 780, the second composite die 780, and the molding compound die frame 886. In some embodiments, at least one of the composite dies 780 may comprise least one light emitting element 7864 (such as a laser element) that is optically coupled to a subset of the waveguides. Generally, an optical communication path comprising a continuous beam path may be provided between the two composite dies 780.

Figure 22:
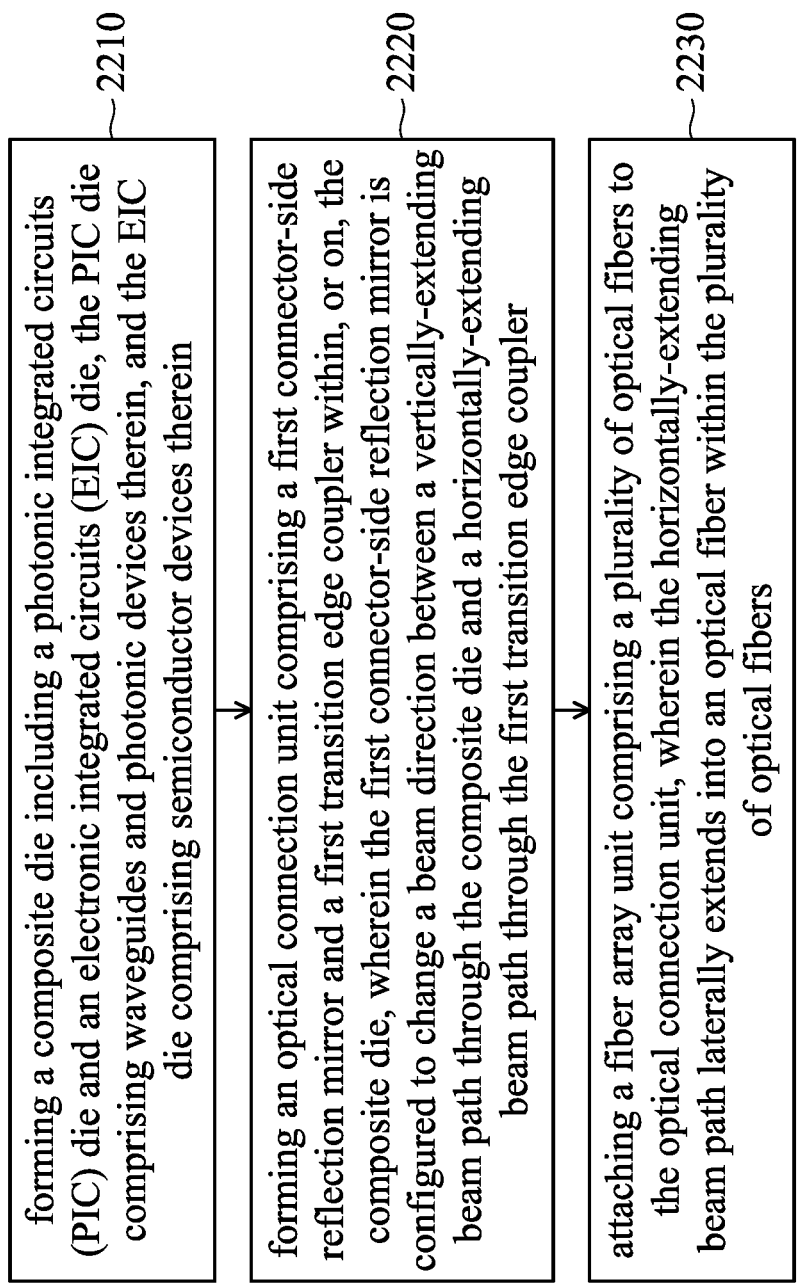
FIG. 22 is a first flowchart illustrating general processing steps for forming a photonic assembly of the present disclosure.

FIG. 22 is a first flowchart illustrating general processing steps for forming a photonic assembly of the present disclosure.

Referring to step 2210 and FIGS. 1A-15B, a composite die 780 including a photonic integrated circuits (PIC) die 700 and an electronic integrated circuits (EIC) die 600 may be formed. The PIC die 700 comprises waveguides 740 and photonic devices 750 therein, and the EIC die 600 comprises semiconductor devices 620 therein.

Referring to step 2220 and FIGS. 1A-15B, an optical connector unit 100 comprising a first connector-side mirror reflector 160 and a first transition edge coupler 140 is formed within, or on, the composite die 780. The first connector-side mirror reflector 160 is configured to change a beam direction between a vertically-extending beam path 99 through the composite die 780 and a horizontally-extending beam path 98 through the first transition edge coupler 140.

Referring to step 2230 and FIGS. 1A-15B, a fiber array units assembly 300 comprising a plurality of optical fibers 340 may be attached to the optical connector unit 100, wherein the horizontally-extending beam path 98 laterally extends into an optical fiber within the plurality of optical fibers 340.

Figure 23:
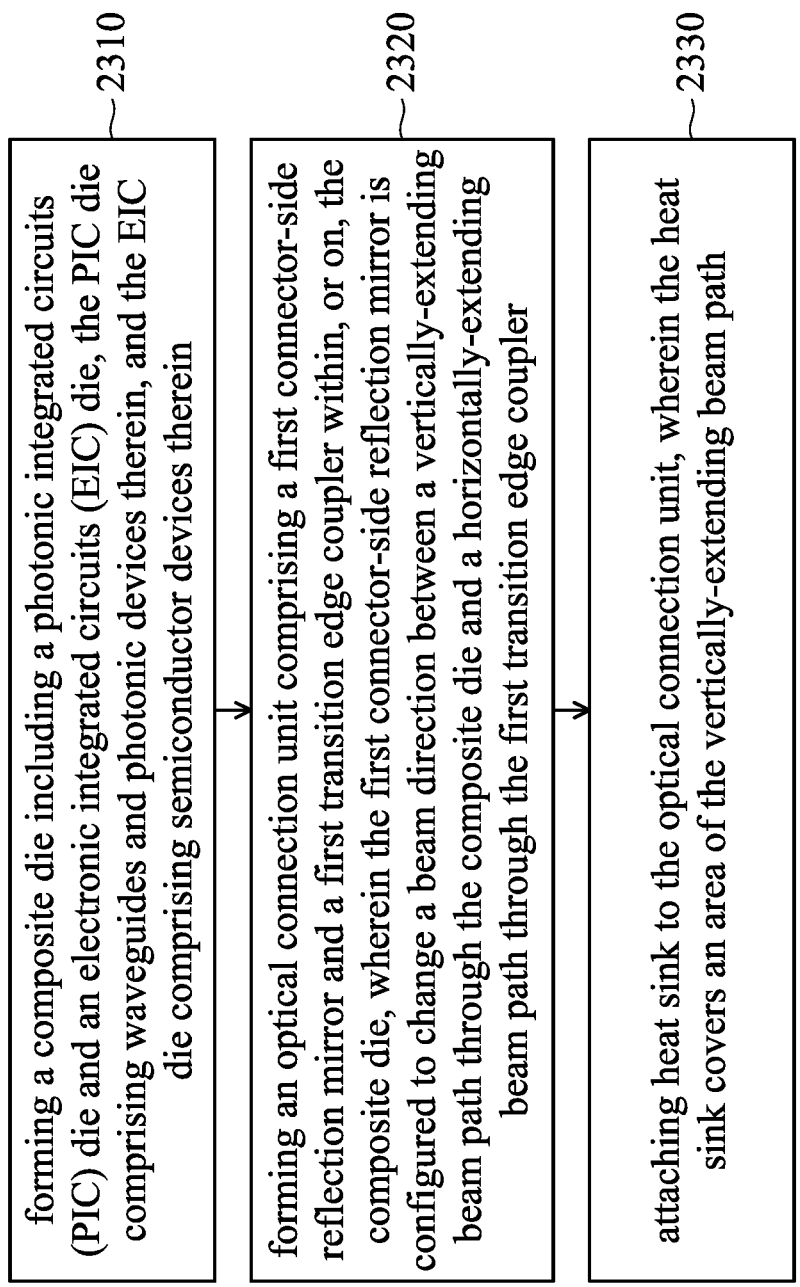
FIG. 23 is a second flowchart illustrating general processing steps for forming a photonic assembly of the present disclosure.

FIG. 23 is a second flowchart illustrating general processing steps for forming a photonic assembly of the present disclosure.

Referring to step 2310 and FIGS. 1A-10 and 16A-19H, a composite die 780 including a photonic integrated circuits (PIC) die 700 and an electronic integrated circuits (EIC) die 600 may be formed. The PIC die 700 comprises waveguides 740 and photonic devices 750 therein, and the EIC die 600 comprises semiconductor devices 620 therein.

Referring to step 2320 and FIGS. 1A-10 and 16A-19H, an optical connector unit 100 comprising a first connector-side mirror reflector 160 and a first transition edge coupler 140 is formed within, or on, the composite die 780. The first connector-side mirror reflector 160 is configured to change a beam direction between a vertically-extending beam path 99 through the composite die 780 and a horizontally-extending beam path 98 through the first transition edge coupler 140.

Referring to step 2330 and FIGS. 1A-10 and 16A-19H, a heat sink 200 is attached to the optical connector unit 100. The heat sink 200 convers an area of vertically-extending beam path.

Figure 24:
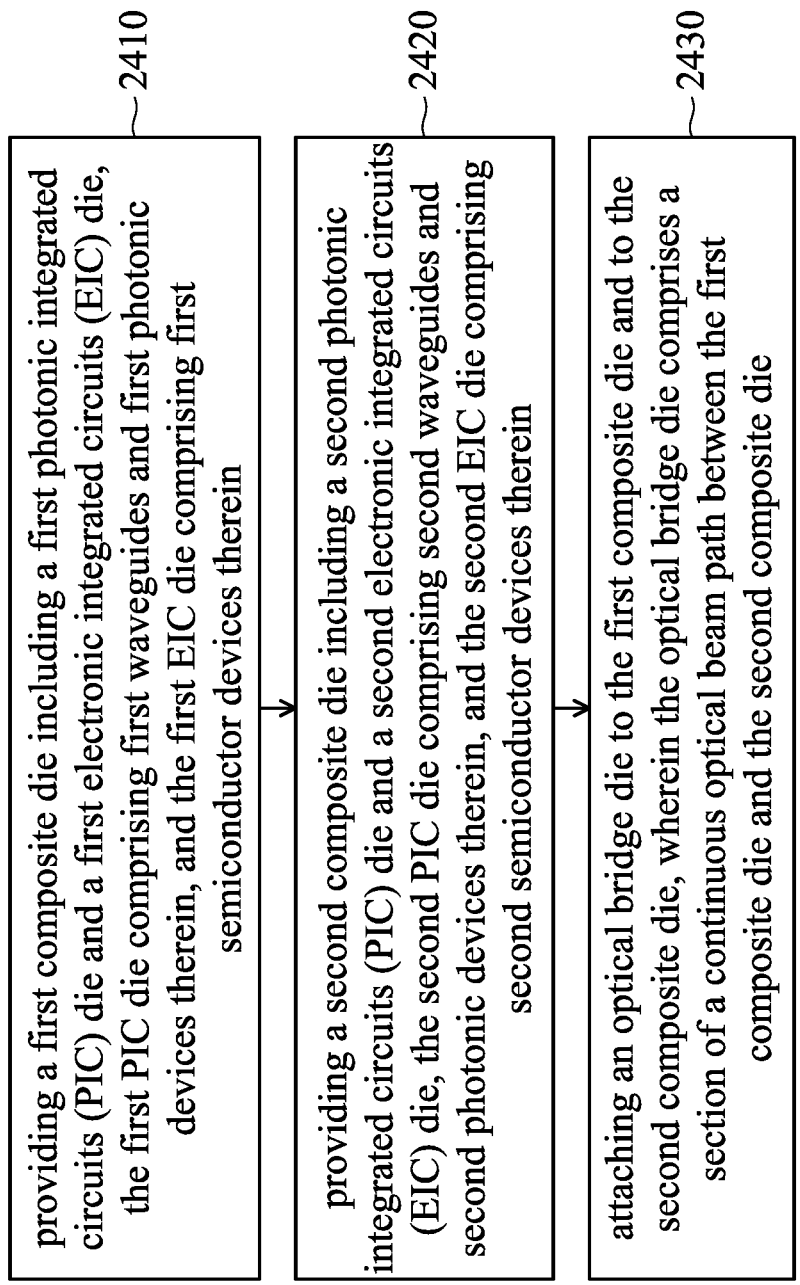
FIG. 24 is a third flowchart illustrating general processing steps for forming a photonic assembly of the present disclosure.

FIG. 24 is a third flowchart illustrating general processing steps for forming a photonic assembly of the present disclosure.

Referring to step 2410 and FIGS. 1A-9X and 20A-21B, a first composite die 780 including a first photonic integrated circuits (PIC) die 700 and a first electronic integrated circuits (EIC) die 600 may be provided. The first PIC die 700 comprises first waveguides 740 and first photonic devices 750 therein, and the first EIC die 600 comprises first semiconductor devices 620 therein.

Referring to step 2420 and FIGS. 1A-9X and 20A-21B, a second composite die 780 including a second photonic integrated circuits (PIC) die 700 and a second electronic integrated circuits (EIC) die 600 may be provided. The second PIC die 700 comprises second waveguides 740 and second photonic devices 750 therein, and the second EIC die 600 comprises second semiconductor devices 620 therein.

Referring to step 2430 and FIGS. 1A-9X and 20A-21B, an optical bridge die 350 may be attached to the first composite die 780 and to the second composite die 780. The optical bridge die 350 comprises a section of a continuous optical beam path between the first composite die 780 and the second composite die 780.

Referring to all drawings and according to various embodiments of the present disclosure, a photonic assembly is provided, which comprises: a composite die 780 including a photonic integrated circuits (PIC) die 700 and an electronic integrated circuits (EIC) die 600, the PIC die 700 comprising waveguides 740 and photonic devices 750 therein, and the EIC die 600 comprising semiconductor devices 620 therein; an optical connector unit 100 comprising a first connector-side mirror reflector 160 and a first transition edge coupler 140 and attached to a top surface of the composite die 780, wherein the first connector-side mirror reflector 160 is configured to change a beam direction between a vertically-extending beam path 99 through the composite die 780 and a horizontally-extending beam path 98 through the first transition edge coupler 140; and a fiber array units assembly 300 attached to a sidewall of the optical connector unit 100.

In one embodiment, the photonic assembly comprises an encapsulation cover 120 having a horizontally-extending portion overlying the optical connector unit 100 and a portion of the fiber array units assembly 300 and a vertically-extending portion that is attached to a sidewall of the optical connector unit 100 through the optical glue portion 130. In one embodiment, the composite die 780 comprises a support semiconductor substrate 510 interposed between the PIC die 700 and the optical connector unit 100; and the vertically-extending beam path 99 vertically extends through the support semiconductor substrate 510. In one embodiment, the composite die 780 comprises an optically transparent dielectric layer 580 overlying a top surface of the support semiconductor substrate 510, wherein the optical connector unit 100 is located over the optically transparent dielectric layer 580.

In one embodiment, the optical connector unit 100 comprises: a dielectric matrix layer 150 embedding the first connector-side mirror reflector 160 and the first transition edge coupler 140; a first spacer plate 111 located over the first connector-side mirror reflector 160 and more distal from the composite die 780 than the first connector-side mirror reflector 160 is from the composite die 780; and a second spacer plate 112 interposed between the composite die 780 and the dielectric matrix layer 150. In one embodiment, the fiber array units assembly 300 comprises: a proximal support plate 322; a distal support plate (324, 324') overlying the proximal support plate 322; and optical fibers 340 located between the proximal support plate 322 and the distal support plate (324, 324'); and a fiber sheath laterally surrounding the optical fibers 340 and laterally spaced from the proximal support plate 322 and the distal support plate (324, 324').

In one embodiment, the fiber sheaths comprises first sheaths and second sheaths that are vertically spaced from each other; a first subset of the optical fibers 340 extends into the first sheaths; and a second subset of the optical fibers 340 extends into the second sheaths. In one embodiment, the proximal support plate 322 and the distal support plate (324, 324') are attached to the optical connector unit 100 through an optical glue portion 130; and the proximal support plate 322 laterally protrudes farther outward from the optical glue portion 130 than the distal support plate (324, 324') does from the optical glue portion 130. In one embodiment, the optical connector unit 100 comprises a second connector-side mirror reflector 160 and a second transition edge coupler 140 that are more distal from the top surface of the composite die 780 than the first connector-side mirror reflector 160 is from the top surface of the composite die 780, wherein the second connector-side mirror reflector 160 is laterally offset from the first connector-side mirror reflector 160 along a horizontal direction.

According to another aspect of the present disclosure, a photonic assembly is provided, which comprises: a composite die 780 including a photonic integrated circuits (PIC) die 700 and an electronic integrated circuits (EIC) die 600, the PIC die 700 comprising waveguides 740 and photonic devices 750 therein, and the EIC die 600 comprising semiconductor devices 620 therein; an optical connector unit 100 comprising a first connector-side mirror reflector 160 and a first transition edge coupler 140, wherein the first connector-side mirror reflector 160 is configured to change a beam direction between a vertically-extending beam path 99 through the composite die 780 and a horizontally-extending beam path 98 through the first transition edge coupler 140; and a heat sink 200 overlying the composite die 780 and attached to the composite die 780.

In one embodiment, the optical connector unit 100 comprises an optical connector die (100A, 100B, 100C) that is attached to a top surface of the composite die 780. In one embodiment, the composite die 780 comprises a support semiconductor substrate 510 interposed between the PIC die 700 and the optical connector unit 100, and an optically transparent dielectric layer 580 overlying a top surface of the support semiconductor substrate 510; and the optical connector unit 100 is embedded within the optically transparent dielectric layer 580.

In one embodiment, the heat sink 200 covers an entire area of the first connector-side mirror reflector 160. In one embodiment, the photonic assembly comprises a fiber array units assembly 300 attached to a sidewall of the optical connector unit 100, wherein the heat sink 200 overlies an edge portion of the fiber array units assembly 300. In one embodiment, the heat sink 200 is attached to the fiber array units assembly 300 through at least one of a thermal interface material layer and an optical glue portion 130.

The various embodiments of the present disclosure may be used to provide photonic assemblies in which an optical path is deflected by an optical connector unit comprising a connector-side mirror reflector that is configured to change the optical path by 90 degrees. The various embodiments of the present disclosure may be used compact optical interfaces with optical fibers aligned along a horizontal direction for various COUPE structures.

The foregoing outlines features of several embodiments so that those skilled in the art may better understand the aspects of the present disclosure. Each embodiment described using the term "comprises" also inherently discloses additional embodiments in which the term "comprises" is replaced with "consists essentially of" or with the term "consists of," unless expressly disclosed otherwise herein. Whenever two or more elements are listed as alternatives in a same paragraph of in different paragraphs, a Markush group including a listing of the two or more elements is also impliedly disclosed. Whenever the auxiliary verb "may" is used in this disclosure to describe formation of an element or performance of a processing step, an embodiment in which such an element or such a processing step is not performed is also expressly contemplated, provided that the resulting apparatus or device may provide an equivalent result. As such, the auxiliary verb "may" as applied to formation of an element or performance of a processing step should also be interpreted as "may" or as "may, or may not" whenever omission of formation of such an element or such a processing step is capable of providing the same result or equivalent results, the equivalent results including somewhat superior results and somewhat inferior results. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:
1. A photonic assembly comprising:
   a composite die including a photonic integrated circuits (PIC) die and an electronic integrated circuits (EIC) die, the PIC die comprising waveguides and photonic devices therein, and the EIC die comprising semiconductor devices therein;
   an optical connector unit comprising a first connector-side mirror reflector and a first transition edge coupler and attached to a top surface of the composite die, wherein the first connector-side mirror reflector is configured to change a beam direction between a vertically-extend- ing beam path through the composite die and a horizontally-extending beam path through the first transition edge coupler; and
a fiber array units assembly attached to a sidewall of the optical connector unit.

2. The photonic assembly of claim 1, further comprising an encapsulation cover having a horizontally-extending portion overlying the optical connector unit and a portion of the fiber array units assembly and a vertically-extending portion that is attached to a sidewall of the optical connector unit through an optical glue portion.

3. The photonic assembly of claim 1, wherein:
the composite die comprises a support semiconductor substrate interposed between the PIC die and the optical connector unit; and
the vertically-extending beam path vertically extends through the support semiconductor substrate,
wherein the composite die comprises an optically transparent dielectric layer overlying a top surface of the support semiconductor substrate, wherein the optical connector unit is located over the optically transparent dielectric layer.

4. The photonic assembly of claim 1, further comprising a packaging substrate that is attached to the composite die through an array of solder material portions, wherein the PIC die is more proximal to the packaging substrate than the EIC die is to the packaging substrate.

5. The photonic assembly of claim 1, wherein the optical connector unit comprises:
a dielectric matrix layer embedding the first connector-side mirror reflector and the first transition edge coupler;
a first spacer plate located over the first connector-side mirror reflector and more distal from the composite die than the first connector-side mirror reflector is from the composite die; and
a second spacer plate interposed between the composite die and the dielectric matrix layer.

6. The photonic assembly of claim 1, wherein the fiber array units assembly comprises:
a proximal support plate;
a distal support plate overlying the proximal support plate;
optical fibers located between the proximal support plate and the distal support plate; and
a fiber array matrix comprising fiber sheaths laterally surrounding the optical fibers and laterally spaced from the proximal support plate and the distal support plate.

7. The photonic assembly of claim 6, wherein:
the fiber sheaths comprises first sheaths and second sheaths that are vertically spaced from each other;
a first subset of the optical fibers extends into the first sheaths; and
a second subset of the optical fibers extends into the second sheaths.

8. The photonic assembly of claim 6, wherein:
the proximal support plate and the distal support plate are attached to the optical connector unit through an optical glue portion; and
the proximal support plate laterally protrudes farther outward from the optical glue portion than the distal support plate does from the optical glue portion.

9. The photonic assembly of claim 1, wherein the optical connector unit comprises a second connector-side mirror reflector and a second transition edge coupler that are more distal from the top surface of the composite die than the first connector-side mirror reflector is from the top surface of the composite die, wherein the second connector-side mirror reflector is laterally offset from the first connector-side mirror reflector along a horizontal direction.

10. A photonic assembly comprising:
a composite die including a photonic integrated circuits (PIC) die and an electronic integrated circuits (EIC) die, the PIC die comprising waveguides and photonic devices therein, and the EIC die comprising semiconductor devices therein;
an optical connector unit comprising a first connector-side mirror reflector and a first transition edge coupler, wherein the first connector-side mirror reflector is configured to change a beam direction between a vertically-extending beam path through the composite die and a horizontally-extending beam path through the first transition edge coupler; and
a heat sink overlying the composite die and attached to the composite die.

11. The photonic assembly of claim 10, wherein the optical connector unit comprises an optical connector die that is attached to a top surface of the composite die.

12. The photonic assembly of claim 10, wherein:
the composite die comprises a support semiconductor substrate interposed between the PIC die and the optical connector unit, and an optically transparent dielectric layer overlying a top surface of the support semiconductor substrate; and
the optical connector unit is embedded within the optically transparent dielectric layer.

13. The photonic assembly of claim 10, wherein the heat sink covers an entire area of the first connector-side mirror reflector.

14. The photonic assembly of claim 10, further comprising a fiber array units assembly attached to a sidewall of the optical connector unit, wherein the heat sink overlies an edge portion of the fiber array units assembly.

15. The photonic assembly of claim 14, wherein the heat sink is attached to the fiber array units assembly through at least one of a thermal interface material layer and an optical glue portion.

16. A method of forming a photonic assembly, the method comprising:
forming a composite die including a photonic integrated circuits (PIC) die and an electronic integrated circuits (EIC) die, the PIC die comprising waveguides and photonic devices therein, and the EIC die comprising semiconductor devices therein;
forming an optical connector unit comprising a first connector-side mirror reflector and a first transition edge coupler within, or on, the composite die, wherein the first connector-side mirror reflector is configured to change a beam direction between a vertically-extending beam path through the composite die and a horizontally-extending beam path through the first transition edge coupler; and
attaching a fiber array units assembly comprising a plurality of optical fibers to the optical connector unit, wherein the horizontally-extending beam path laterally extends into an optical fiber within the plurality of optical fibers.

17. The method of claim 16, wherein the optical connector unit comprises an optical connector die that is attached to a top surface of the composite die.

18. The method of claim 17, further comprising attaching a heat sink to the composite die and the optical connector unit.

19. The method of claim 18, wherein the heat sink covers an entire area of the optical connector unit upon attachment to the optical connector unit.

20. The method of claim 16, wherein:
- the fiber array units assembly comprises a proximal support plate, a distal support plate overlying the proximal support plate and having a lesser lateral extent than the proximal support plate, and optical fibers located between the proximal support plate and the distal support plate; and
- the fiber array units assembly is attached to the optical connector unit through an optical glue portion.

\* \* \* \* \*